United States Patent [19]
Kimura et al.

[11] Patent Number: 5,913,078
[45] Date of Patent: *Jun. 15, 1999

[54] CAMERA UTILIZING A SATELLITE POSITIONING SYSTEM

[75] Inventors: Yoshiaki Kimura; Masanori Kawai; Yoshinori Mochizuki; Haruhiko Momose, all of Hino, Japan

[73] Assignee: Konica Corporation, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/912,015

[22] Filed: Aug. 15, 1997

Related U.S. Application Data

[63] Continuation of application No. 08/548,471, Oct. 26, 1995, abandoned.

[30] Foreign Application Priority Data

| Nov. 1, 1994 | [JP] | Japan | 6-269017 |
| Dec. 28, 1994 | [JP] | Japan | 6-328963 |
| Dec. 28, 1994 | [JP] | Japan | 6-328964 |
| Dec. 28, 1994 | [JP] | Japan | 6-328965 |
| Dec. 28, 1994 | [JP] | Japan | 6-328966 |
| Jan. 11, 1995 | [JP] | Japan | 7-002760 |
| Mar. 3, 1995 | [JP] | Japan | 7-044538 |

[51] Int. Cl.[6] ............ G03B 17/24; G03B 29/00
[52] U.S. Cl. ............ 396/50; 396/310; 396/319
[58] Field of Search ............ 354/106, 76; 396/50, 396/310, 319

[56] References Cited

U.S. PATENT DOCUMENTS

| D. 289,869 | 5/1987 | Wooley | D14/72 |
| 5,258,795 | 11/1993 | Lucas | 354/289.12 |
| 5,296,884 | 3/1994 | Honda et al. | 354/106 |
| 5,335,072 | 8/1994 | Tanaka et al. | 354/232 |
| 5,365,290 | 11/1994 | Suzuki et al. | 354/64 |
| 5,488,558 | 1/1996 | Ohki | 364/449 |
| 5,506,644 | 4/1996 | Suzuki et al. | 354/106 |
| 5,508,736 | 4/1996 | Cooper | 348/144 |
| 5,675,524 | 10/1997 | Bernard | 364/705.05 |

*Primary Examiner*—Safet Metjahic
*Assistant Examiner*—Michael Dalakis
*Attorney, Agent, or Firm*—Jordan B. Bierman; Bierman, Muserlian and Lucas

[57] ABSTRACT

In a camera for receiving an electric wave including position information from a satellite of Global Positioning System and for recording a photographing position together with a photographed image, wherein a photographing attitude of the camera is arbitrarily changed in accordance with an image to be photographed, the camera comprises an enabling device to make the receiving of the electric wave through an antenna possible regardless of the photographing attitude of the camera.

29 Claims, 59 Drawing Sheets

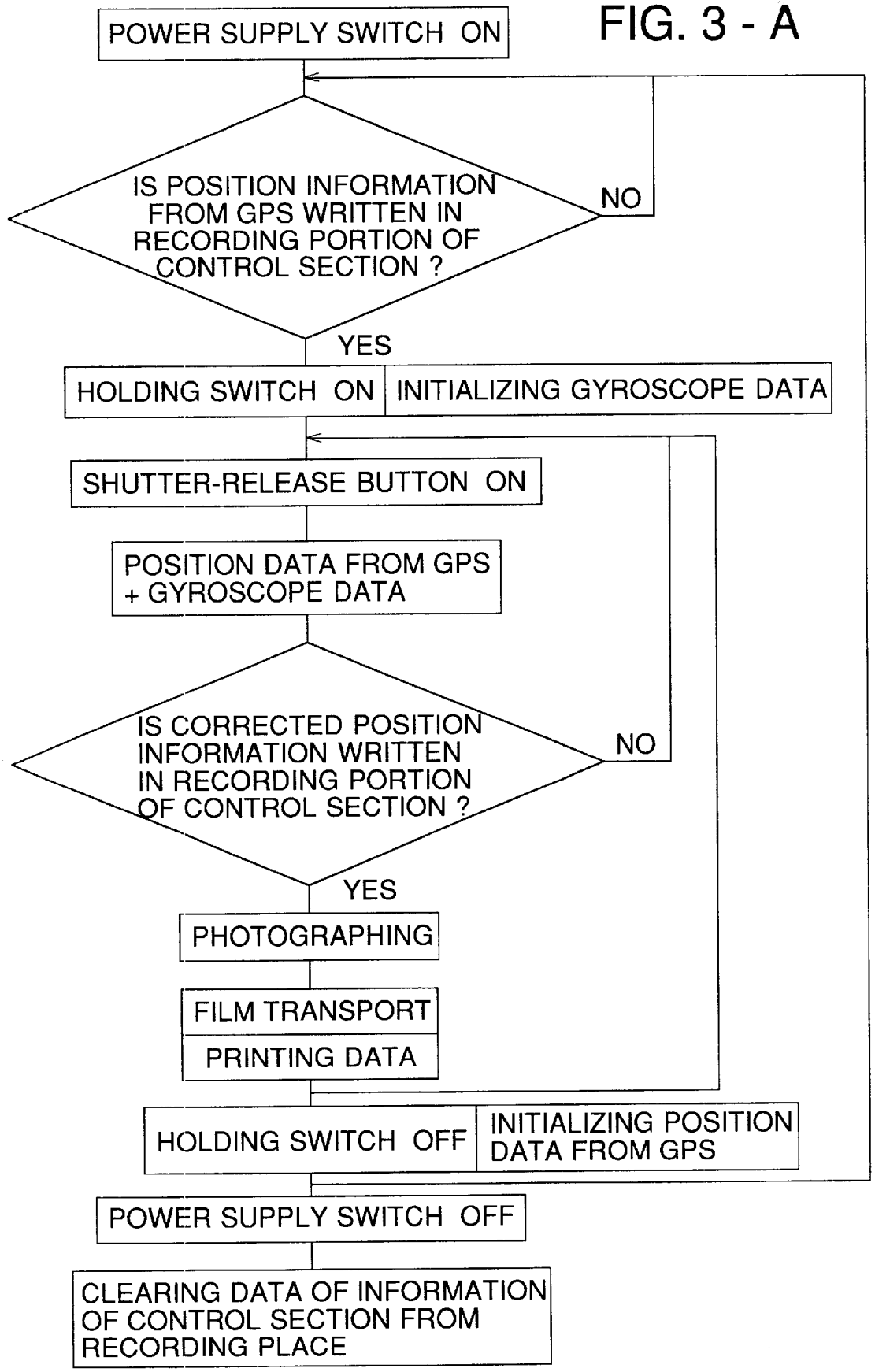
FIG. 3 - A

FIG. 3 - B
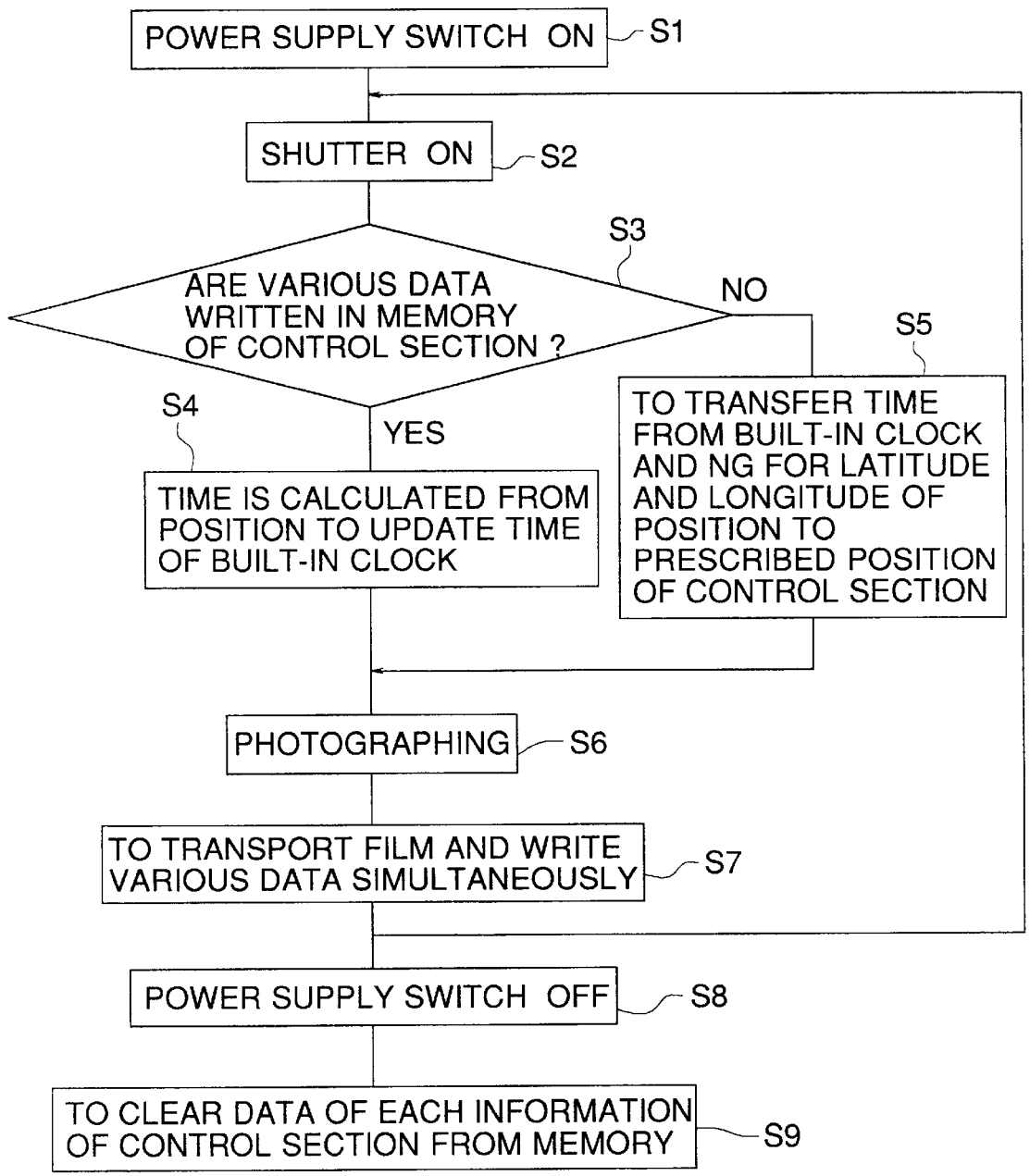

FIG. 11 - A
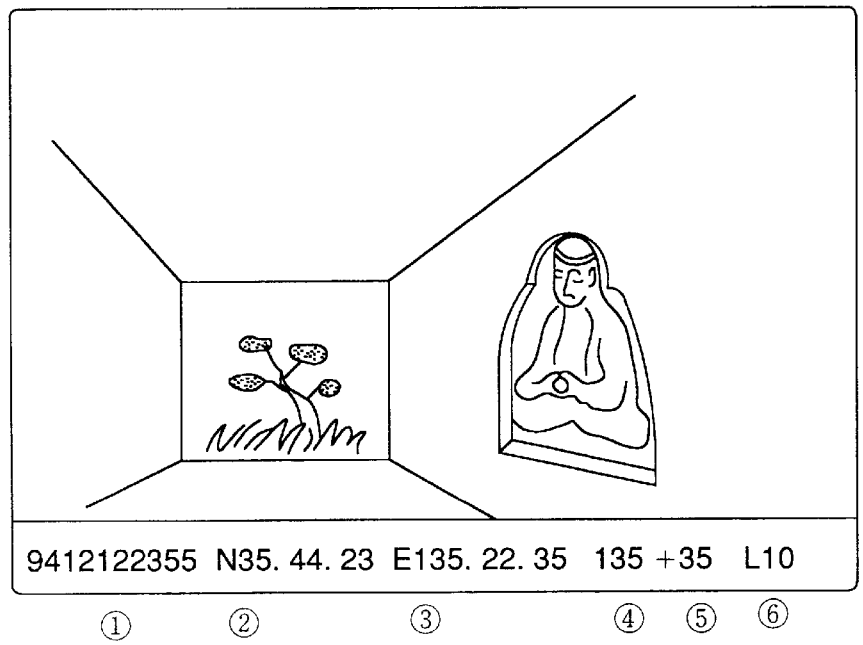
FIG. 11 - B
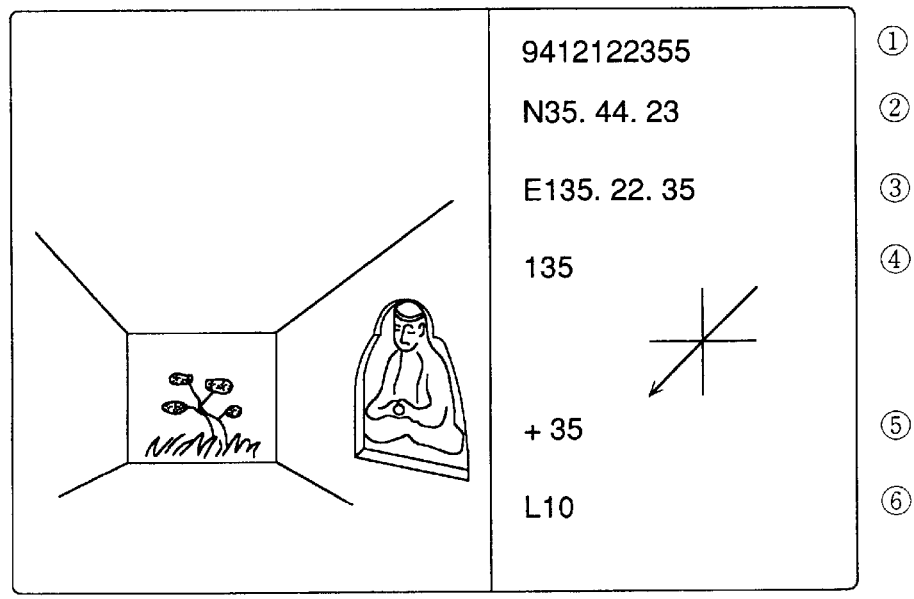

FIG. 11 - C

| N35. 44. 23  E135. 22. 35 |
| 9412122355   135  + 35  L10 |

FIG. 15 - A
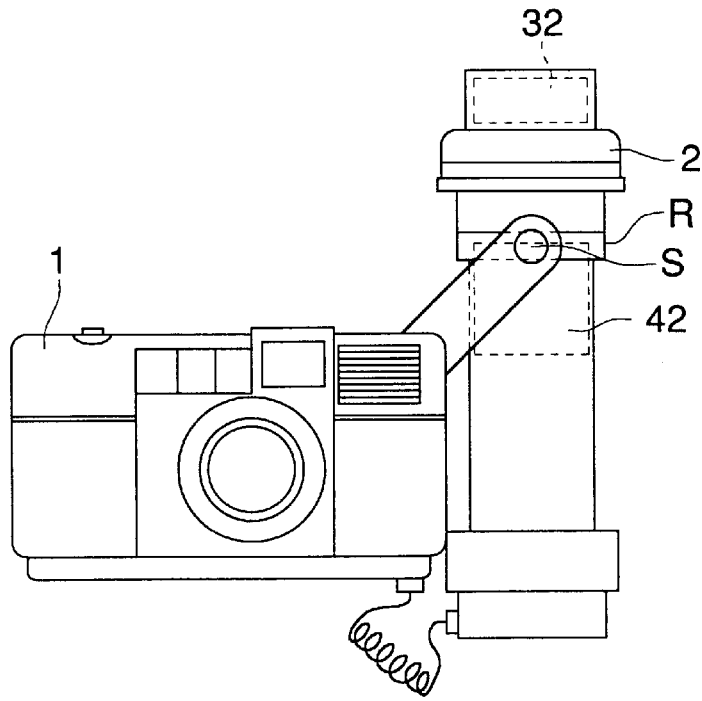
FIG. 15 - B
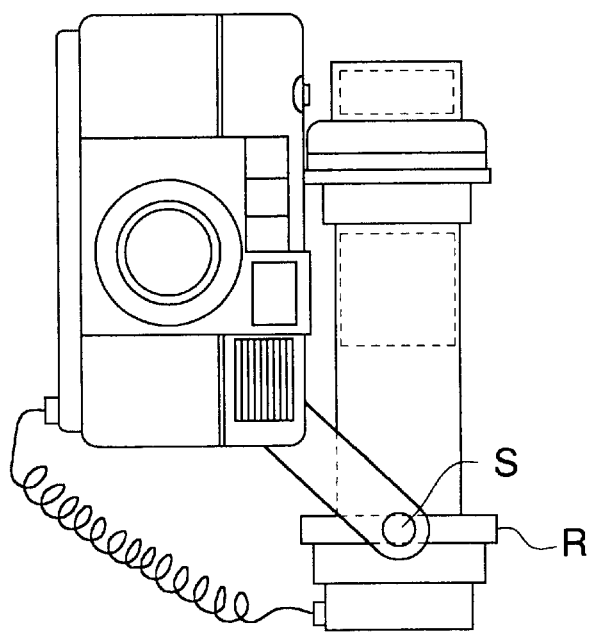

FIG. 15 - C
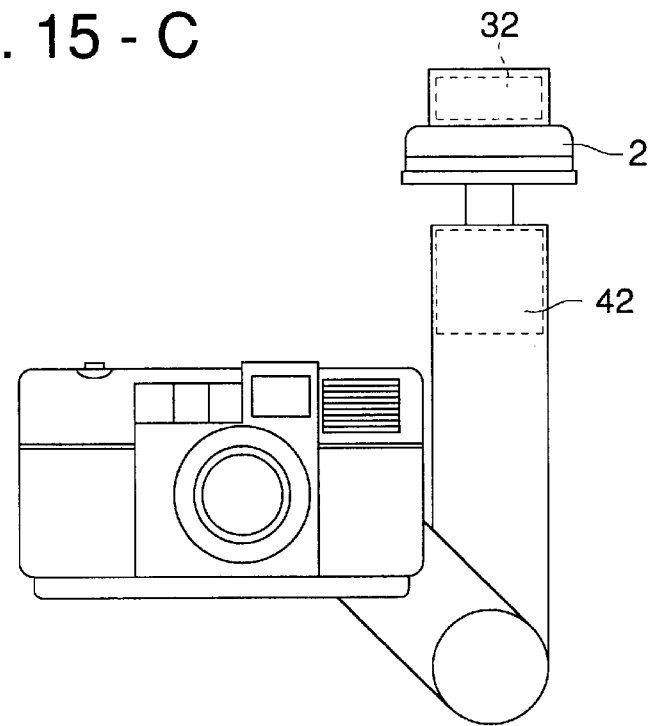
FIG. 15 - D
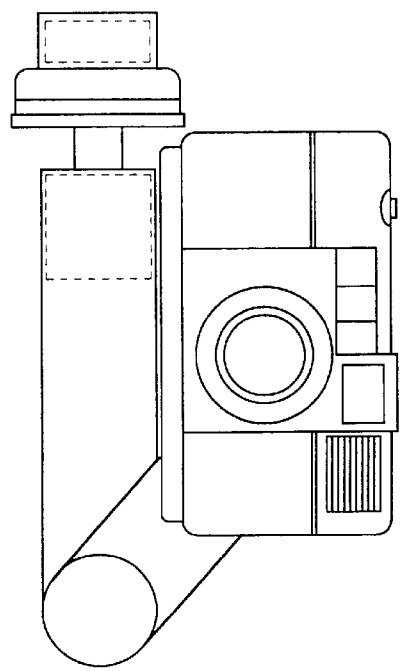

FIG. 16 - A
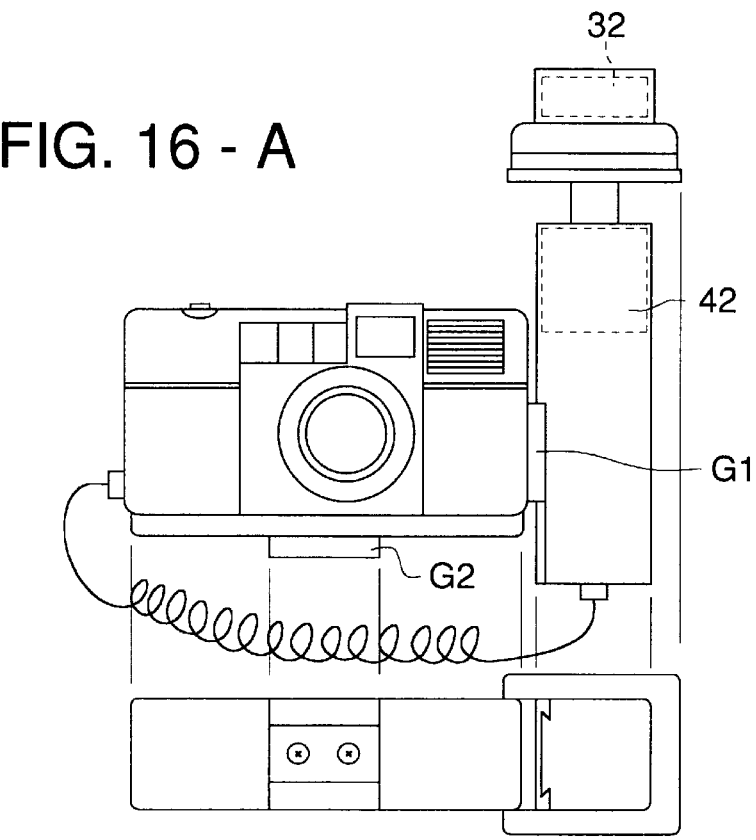
FIG. 16 - B
FIG. 16 - C
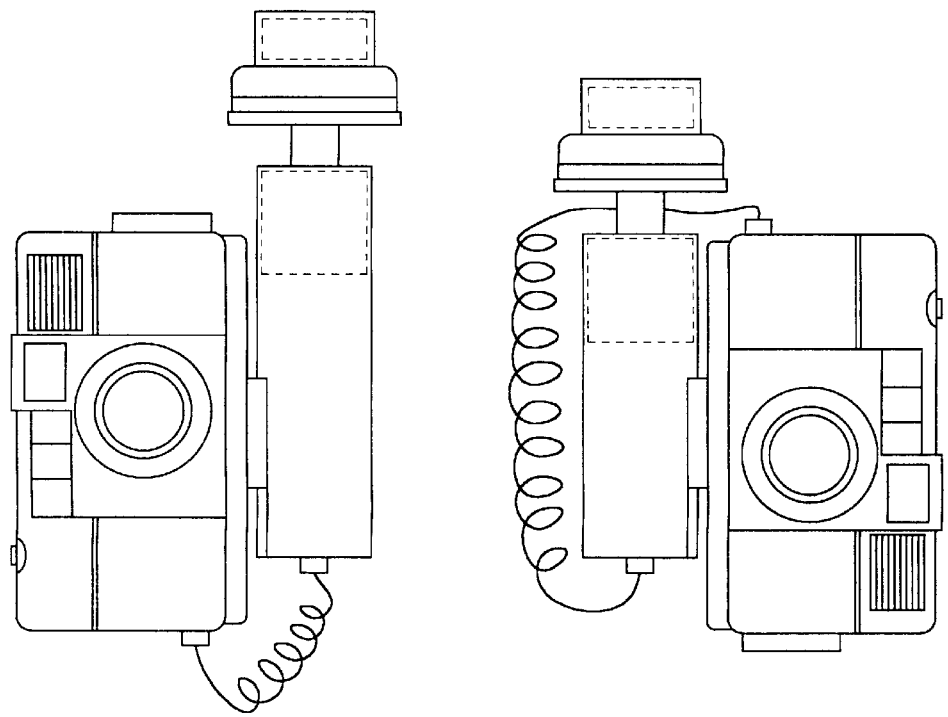

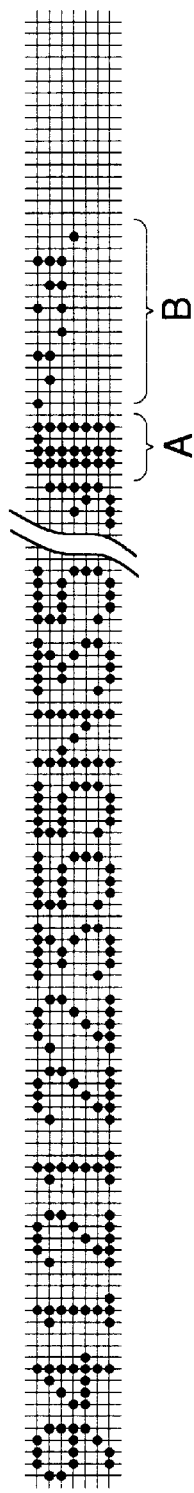
FIG. 22 - A
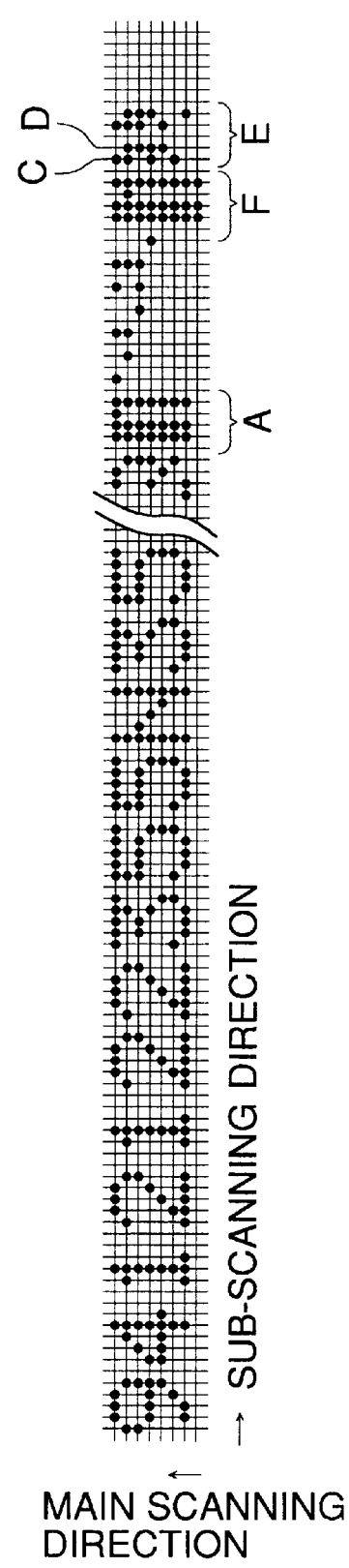
FIG. 22 - B
← MAIN SCANNING DIRECTION
→ SUB-SCANNING DIRECTION

FIG. 43

| | MEASURING POINT | OBJECT |
|---|---|---|
| TIME | 1994 DECEMBER 24TH 15 HOUR 23 MINUTE 55 SECOND | |
| LATITUDE | 39° 40' 00" NORTH LATITUDE | 39° 40' 01" NORTH LATITUDE |
| LONGITUDE | 139° 22' 30" EAST LONGITUDE | 139° 22' 29" EAST LONGITUDE |
| AZIMUTH | 113° FROM THE NORTH | |
| INCLINATION ANGLE | +1° | |
| DISTANCE | | 25 m |
| INTERVAL | | HEIGHT 33 m |

| LATITUDE | LONGITUDE | PLACE |
|----------|-----------|--------|
| K1 | Q1 | HAKONE |
| K2 | Q2 | IZU |
| | | |

FIG. 61
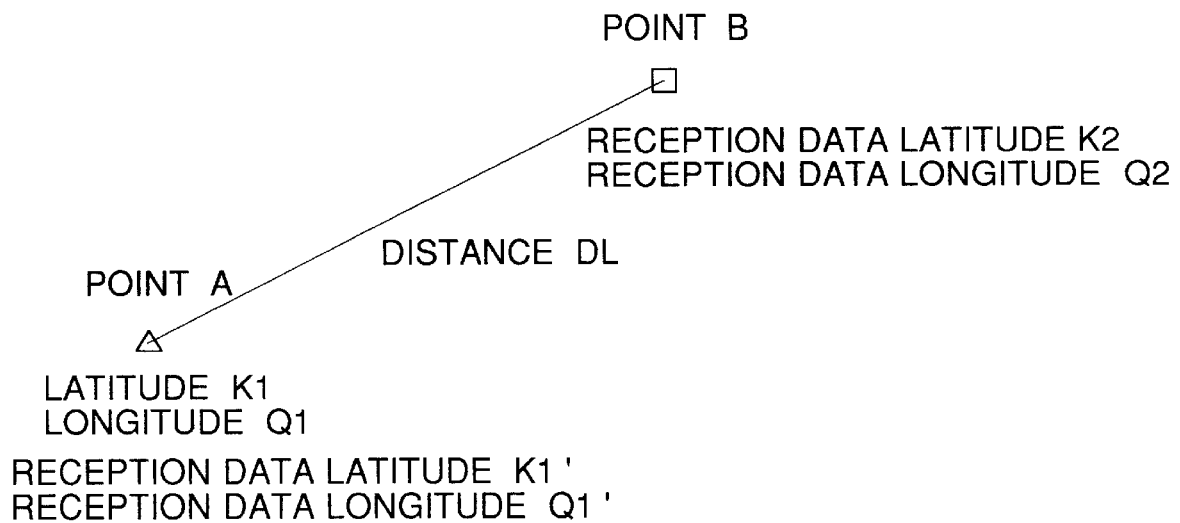
FIG. 62 - A
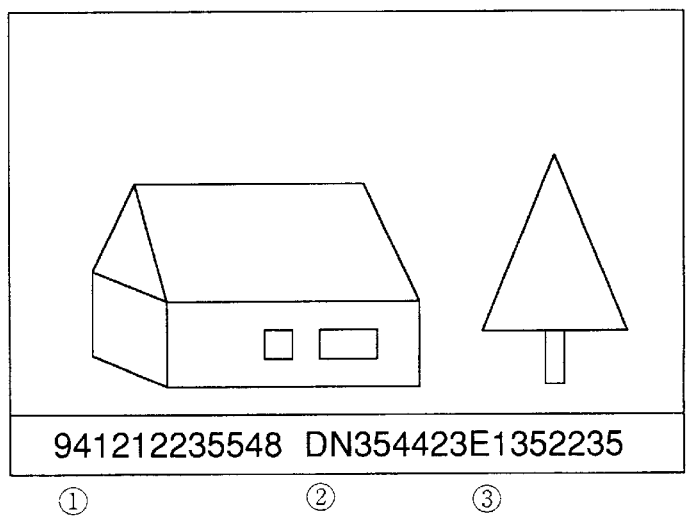

FIG. 62 - B
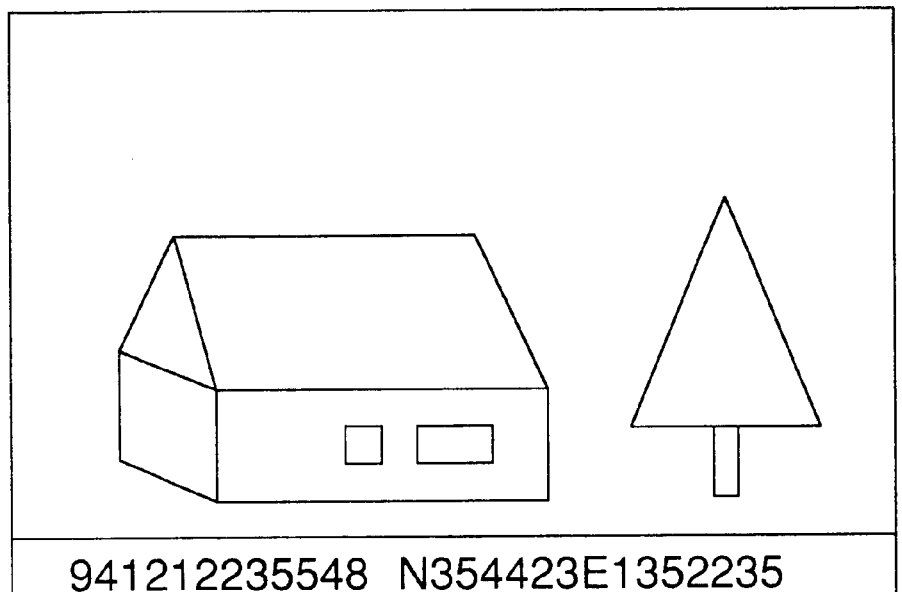

CAMERA UTILIZING A SATELLITE POSITIONING SYSTEM

This application is a continuation of application Ser. No. 08/548,471, filed Oct. 26, 1995, now abandoned.

BACKGROUND OF THE INVENTION

The present invention relates to a camera capable of recording photographing information of the camera together with photographed images, and more particularly, to a camera capable of recording also information about photographing position of the camera utilizing a satellite positioning system typified by GPS (Global Positioning System).

Recently, there have been increased opportunities wherein various cameras are used by an individual, a traveler and a cameraman. Further, development of apparatuses handling GPS data (position information) has been accelerated by popularization of car navigation.

In addition, there have been proposed various cameras each being capable of recording information about photographing position of the camera utilizing a satellite positioning system based on GPS.

For satisfying a demand for recording a photographing position of a camera together with photographed images, various proposals have been made so far. For position information from the current GPS receiver, however, it is naturally necessary to be capable of receiving electric waves from a GPS satellite. However, electric waves can not reach the places in a room, in a "valley" between tall buildings or in a tunnel, and thereby a photographing position can not be traced, making it impossible to print position information on images.

Even if it is possible to print, position information from the current GPS receiver has an error which is considerably big, which do not satisfy the object to observe accurately and other objects.

Though various proposals have been made for satisfying a demand for recording photographing information of a camera together with photographed images, all information are not necessarily recorded. Therefore, there are some cases wherein such recorded information are not sufficient when considering to do other different processing.

In some cases, information can be obtained accurately but in other cases they can not be obtained accurately, depending on the photographing direction or the photographing attitude of a camera (the attitude in scenery and the attitude in a portrait of a person), because sensitivity of a sensor that senses photographing information varies depending on the direction photographing attitude of the camera. In this case, a scenery in the photographing attitude for a scenery means that the longitudinal direction of a film is made to be horizontal for photographing and the photographing attitude for a portrait of a person means that the lateral direction of a film is made to be horizontal for photographing.

Since photographing information of a camera is recorded together with photographed images, when characters are superposed on recorded images, the characters are sometimes difficult to be recognized when images are bright.

A condition for a handy camera is not that photographing information can be recognized after development of a film following photographing, but is that the photographing information are displayed on a display section and can be recognized from the outside of a camera in the course of photographing.

The invention has been achieved for solving the problems mentioned above. Namely, a first object of the invention is to offer a camera capable of recording necessary photographing information including a photographing position of a camera clearly and accurately together with photographed images.

In the conventional apparatus, there has been a problem that a position can not be traced if the position is away, even slightly, from a location where a GPS receiver is installed though a position in that location can be traced. Further, there have been made various proposals for satisfying a demand for recording a position of an object to be photographed together with photographed images in photographing with a camera. However, there currently is a distance from a photographing position to an object to be photographed, and there is no way to correct this.

The invention has been achieved in view of these problems awaiting solution, and its second object is to offer a position measurement apparatus capable of tracing a position of an object being away from a GPS receiver, and to offer a camera equipped with a function of recording information capable of tracing a position of an object to be photographed and recording it on images.

In the aforesaid camera equipped with a function of recording information, there is a problem of how to control photographed images. The more the number of frames of photographed images is, the more difficult the control and retrieval of photographed photographs are.

The invention has been achieved in view of these problems awaiting solution, and its third object is to offer a filing device for photographic images wherein control and retrieval of photographed photographs are easy.

SUMMARY OF THE INVENTION

The aforementioned first object of the invention for recording necessary photographing information clearly and accurately can be attained when a camera capable of recording photographing information is equipped with the following structural elements.

(a) Antenna (b) GPS receiving means for receiving with the aforesaid antenna and outputting photographing position information of a camera (c) Image pickup means (d) Recording means for recording the aforesaid photographing position information (e) Means for enabling the aforesaid GPS receiving means to receive independently of the photographing attitude or the photographing direction of a camera In the aforesaid means for making reception possible, the direction of an antenna can be changed depending on the photographing attitude of a camera.

The aforesaid antenna can be changed in terms of its direction by 90° or 270°.

The aforesaid means capable of receiving is a switching means that changes at least two antennas in accordance with the photographing attitude of a camera.

The aforesaid means capable of receiving is a means that holds the aforesaid GPS receiving section separably.

The aforementioned first object of the invention can be attained by a camera capable of recording photographing information equipped with a GPS receiver outputting photographing position information of the camera wherein a gyroscope for measuring a movement distance and direction is provided and position information from the GPS receiver is corrected by information from the gyroscope so that the position information from the GPS receiver may be recorded as photographing position information.

In the camera mentioned above, it is preferable that a second receiver is provided and position information from GPS receiver is corrected by information from the second receiver to be recorded as photographing information.

The first object of the invention can be attained by a camera capable of recording photographing information equipped with a GPS receiver outputting photographing information of the camera and equipped further with an azimuth sensor outputting information showing the photographing direction of the camera and/or an inclination sensor outputting inclination information of the camera wherein position information and/or azimuth information and/or inclination information can be recorded together with images.

In the camera mentioned above, it is preferable that the direction of an antenna can be changed by 90° or 270° depending on the photographing direction of the camera.

The aforesaid object can be attained by the aforesaid camera capable of recording photographing information wherein the direction of the azimuth sensor mentioned above can be changed by 90° or 270° depending on the photographing direction of the camera.

It is preferable in the aforesaid camera that the direction of an inclination sensor can be changed by 90° or 270° depending on the photographing direction of the camera.

It is preferable in the aforesaid camera that a portion where the aforesaid various information are recorded is shielded from photographing light from a lens.

The aforesaid object can be attained by the aforesaid camera capable of recording photographing information wherein there is provided a display section for position information and/or azimuth information and/or inclination information all received or measured.

In a camera with a function of recording information structured to be capable of recording character information together with images and structured to record character information on a film in the course of transporting the film, it is preferable to provide a means which rewinds a film automatically when a display of film counter recording the number of exposures shows the number of a prescribed exposure number of a film plus one.

In this case, it is preferable to provide a means which outputs signals when a display of the aforesaid film counter shows the number of a prescribed exposure number of a film plus one, on the point of telling that no information can be recorded on the next frame at all.

In the camera mentioned above, it is preferable that a means for prewinding a film is provided.

In a camera with a function of recording information structured to be capable of recording character information together with images in the course of photographing and structured to record characters by means of a row of many point emission elements arranged in the primary scanning direction, it is preferable to record while causing a row of plural dots arranged in the primary scanning direction to correspond to one character.

In this case, it is preferable to record while causing many rows each being composed of plural dots arranged in the primary scanning direction to correspond to one character, on the point of recording information of a Chinese character and others.

On the point of increasing an amount of information to be recorded through a two-way recording method including an ordinary recording method for information of urgent need and a compression recording method for information not needed urgently, it is preferable to realize a mixed recording method including an ordinary marking character recording method and another recording method wherein a row of plural dots in the primary scanning direction corresponds to a character.

Further, it is preferable to record a prescribed symbol for discriminating the recording methods between the ordinary marking character record and the record wherein a row of plural dots in the primary scanning direction corresponds to a character, on the point of discriminating a boundary between the two different recording methods.

In a camera with a function of recording information structured to be capable of recording character information together with images in the course of photographing and structured to record information of a clock built in the camera as time information, it is preferable to provide a means which amends the time of the built-in clock by correcting the time received from a GPS with reception position information and records the time of the built-in clock as the photographing time.

In this case, when information of the time can not be received from a GPS, it is preferable to record the time of the built-in clock in the camera as photographing time on the point of recording time information surely.

In the camera mentioned above, it is preferable that a measuring section for measuring at least one physical information and/or a character information making section are structured to be connected to a camera main body on a interchangeable basis, and there are provided a means for recording a part of information of the aforesaid measuring section as character information together with images and a means for recording the remaining information on a data recording device provided separately.

In this case, it is preferable that each measuring section and character information making section have their own ID codes so that connected measuring section and/or character information making section can be discriminated on a part of a camera, and a storage section for recording information measured in advance and character information is provided, on the point of enabling each measurement data to be discriminated and maintaining these measurement information and character information.

Further, on the point of making various kinds of measurement possible and of recording character information, it is preferable that the aforesaid measuring section is provided with at least one measurement function for measurement of position, altitude and time by means of a GPS receiver, measurement of azimuth, elevation angle and rotation angle around the lens center by means of an angle sensor, measurement of temperature by means of a temperature sensor, measurement of humidity by means of a humidity sensor, measurement of distance to an object by means of a distance measuring section, measurement of air pressure by means of an air pressure sensor and measurement of concentration of at least one kind of gas, and the character information making section is provided with function of a word processor and/or a personal computer.

When the aforesaid character information making section only is connected, it is preferable, on the point of recording much character information, that character data can be recorded on all the storage section other than that for the time.

On the point of causing frame images recorded on a part of a camera and various information recorded on a data recording device to be corresponded each other, it is preferable to provide a means for recording information identical to photographed frame discrimination information recorded on a part of a camera on the aforesaid data recording device together with other information.

For the purpose of making the constitution on a part of a camera main body to be compact and of recording various information, it is preferable that the aforesaid data recording device is provided separately from the camera main body, a second measuring section for measuring at least one physical information is provided separately from the camera main body, and a means for recording measurement data of the second measuring section on the aforesaid data recording device through trigger signals from a control section provided on the camera main body is provided. Incidentally, sending and receiving of data between the camera main body and the second measuring section may be performed either through the wire system or through the radio system.

It is preferable, for the reason of no necessity for making trigger signals specially, that the aforesaid trigger signals are the signals accompanying photographing caused by shutter operations on a part of a camera.

In the camera mentioned above, it is preferable that a measuring section for measuring at least one physical information and/or a character information making section are structured to be connected to a camera main body on a interchangeable basis, and there are provided a means for recording information of the aforesaid measuring section as character information together with images and a means for outputting trigger signals which actuate a second measuring section provided separately in the course of photographing.

The second object of the invention for offering a position measuring device capable of tracing a position of an object being a way from a GPS receiver can be attained by providing a GPS receiving section for measuring a position of a measurement point, a distance measuring device for measuring a distance from a measuring point to an object, an azimuth sensor for obtaining azimuth of a measuring device when the measuring device is directed to an object, an inclination sensor for obtaining an elevation angle of a measuring device when the measuring device is directed to an object, and a means wherein position information of a measuring point is obtained by the GPS receiving section, distance, azimuth and elevation angle of the object for the GPS receiving section are measured by the sensors, and the position information of the measuring point is subjected to correction calculation so that the position of the object may be traced.

In this case, for the purpose of measuring a distance to an object easily, it is preferable that the distance measuring unit mentioned above measures a distance from the measurement point to the object by means of a light wave.

For the purpose of obtaining position information which is more accurate, it is preferable that a second receiving section is further provided and position information from the aforesaid GPS receiver is corrected by position information from the second receiving section.

When each piece of information is not recorded at a prescribed recording position of the aforesaid memory, it is preferable, from the viewpoint of recording each piece of information surely, that a control section of an apparatus displays an instruction to be on a stand-by or to measure again on a built-in display section.

From the viewpoint of displaying various pieces of information on a different display section, it is preferable that an external outputting section for taking out display data is provided so that various pieces of information can be displayed also on a different display unit which is separate from the measuring unit.

It is further preferable that map information for displaying the map of a relevant area is stored in a memory and there is provided a means for displaying the position of a measurement point and/or the position of an object on the map displayed on a display section.

From the viewpoint of obtaining more information, it is preferable that a distance, an azimuth and an inclination angle are measured for objective two points and a distance between the two points (height and width) are displayed.

The second object of the invention mentioned above can be attained by a camera with an information recording function structured to be capable of recording various pieces of information on images wherein there are provided a GPS receiving section for measuring a location of a measurement point, a distance measuring unit for measuring a distance from the measurement point to an object, an azimuth sensor for obtaining an azimuth of a camera directed to an object, an inclination sensor for obtaining an elevation angle of a camera directed to an object, and a means wherein position information of the measurement point is obtained by the aforesaid GPS receiving section, a distance to the GPS receiving section, an azimuth and an elevation angle of an object are measured by the various sensors mentioned above, a position of the object is traced, based on the aforesaid distance, azimuth and elevation angle, through correction calculation for position information of the aforesaid measurement point, and the results thereof are recorded on images as photographing position information.

In this case, for the purpose of measuring a distance to an object easily, it is preferable that the distance measuring unit mentioned above measures a distance from the measurement point to the object by means of a light wave.

Further, from the viewpoint of obtaining position information which is more accurate, it is preferable that an optical axis of the camera and a center axis of the projection system of the distance measuring section are arranged to be coaxial with each other.

When various pieces of information of the camera are not recorded at a prescribed recording place of the aforesaid memory, it is preferable, for sure recording of information, that the control section of the apparatus does not operate properly even when a shutter button is pressed for photographing.

For the purpose of obtaining position information which is more accurate, it is preferable that a second GPS receiving section is further provided and position information from the aforesaid first GPS receiver is corrected by position information from the second GPS receiver.

The second object of the invention mentioned above can be obtained by a camera with an information recording function structured to be capable of recording photographing position information on images wherein there are provided a receiving section that receives position information sent from a GPS receiver positioned in the vicinity of an object to be photographed through a communication means, a distance measuring unit for measuring a distance from the measurement point to an object, an azimuth sensor for obtaining an azimuth of a camera directed to an object, an inclination sensor for obtaining an elevation angle of a camera directed to an object, and a means in which position information of an object is obtained by the aforesaid receiving section, the distance to an object, azimuth and elevation angle are measured by the aforesaid various sensors, and position information of an object received by the aforesaid receiving section and output of each sensor are recorded on images.

In this case, it is preferable, for transmitting information through no communication line, that the aforesaid communication means is light communication.

For sure transmission of information, it is preferable that the aforesaid communication means is one employing communication lines.

For transmitting information through no communication lines, it is preferable that the aforesaid communication means is of a radio system.

The third object of the invention for offering a filing device of photographic images wherein care and retrieval of photographs are easy can be attained by providing an image reading section for reading image information from photographic images and/or films composed of an image recording portion and a character recording portion, an image discriminating section for discriminating images from the images read by the image reading section, a character recognizing section for recognizing characters from images read by the image reading section, and a file for separating images recognized by the image discriminating section from characters recognized by the character recognizing section for storage.

In this case, it is preferable, for easy retrieval of objective images from a character group, that a means for using a recognized character group as a key word of the image is provided.

For the purpose of using a key word of various characters for retrieval of the same image, it is preferable to provide a means for cutting from the recognized character group under the rule established in advance and filing the cut one as a key word together with photographs.

For easier retrieval of the objective image, it is preferable to provide a means wherein one key word is selected from a combination of key words of two kinds or more and that key word is filed together with photographs.

The third object of the invention mentioned above can be attained by a camera with an information recording function structured to be capable of recording character information together with images and structured to be capable of recording character information on a film while the film is conveyed wherein there is provided a means for putting a discrimination symbol for discriminating these character information separately from time information and/or position information. This discrimination symbol includes characters, numerals, symbols and spaces.

In this case, it is preferable, for confirming the kind of the displayed character information, that there is provided a means wherein a display section for displaying character information is arranged for displaying character information with discrimination symbol for discriminating character information mentioned above.

For the purpose of clarifying time information and photographing environment, it is preferable that contents of the character information for discrimination represent GPS receiving time and time of each country, when the contents are time information, and represent a geodetic system, position accuracy and photographing conditions, when the contents are position information.

It is preferable that the aforesaid filing device is provided with a means that stores time information to be stored at the aforesaid character recording portion after putting thereon discrimination symbols in accordance with a kind of the time information, and a calculation means that calculates objective time by calculating a time difference of a photographing location from position information when recognizing the kind of the time information from a discriminating symbol given to the aforesaid time information.

In this case, when there is a time difference between time calculated by the aforesaid calculation means and stored time information, it is preferable to provide a means for storing the time difference at a storage portion as a key word from the view point of retrieval of photographic images conducted with the time difference as a key word.

When the discrimination symbol put on the stored time information indicates that the stored time information is not GPS time, it is preferable that the aforesaid calculation means calculates GPS time from the stored time difference, for unifying all photographic images with GPS time for filing.

In the aforesaid filing device, when position information recorded together with images in the course of photographing is not corrected by data that correct GPS data, it is preferable to provide a means wherein position information is corrected by data for correcting GPS recorded separately through collating confirmation, and the corrected position information is stored at a storage portion after being given discrimination symbol established in advance.

BRIEF DESCRIPTION OF THE DRAWINGS

FIGS. 3A and 3B represent an operation flow chart of a camera in Example 1-1 based on the invention.

FIGS. 11-A, 11-B and 11-C represent examples of images photographed by a camera in Example 1-3 based on the invention.

FIGS. 15-A–15-D represent sketch drawings of other situations of a camera in Example 1-4 based on the invention.

FIGS. 16-A–16-C represent sketch drawings of other situations of a camera in Example 1-4 based on the invention.

FIGS. 22-A and 22-B are diagrams showing examples of writing information on film frames in Example 1-5 based on the invention.

FIG. 43 is a diagram showing details of each measurement data displayed on a map.

FIG. 61 is an illustration of position correction.

FIGS. 62-A and 62-B represent diagrams showing examples of file images in the invention of Example 3-3.

DETAILED DESCRIPTION OF THE PREFERRED EMBODIMENT

Example 1-1

Figure 1:
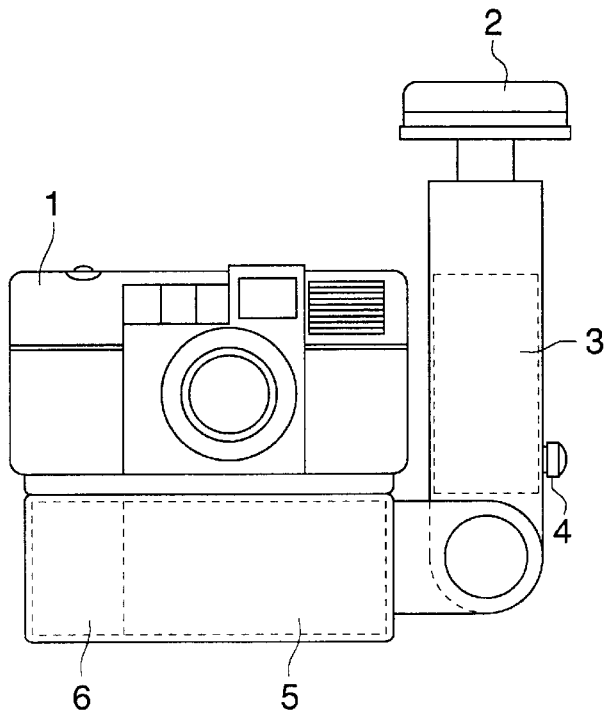
FIG. 1 is a sketch drawing of a camera in Example 1-1 based on the invention.

The present invention will be explained more accurately as follows, referring to the drawings.

FIG. 1 shows an appearance of a camera in Example 1-1 of the invention for attaining the first object of offering a camera capable of recording information of photographing position together with photographed images accurately and clearly. The numeral 1 in the figure is a camera main body, 2 is a GPS receiver which is a GPS receiving section, 3 is a gyroscope, 4 is a holding switch, 5 is a control section and 6 is a battery.

Figure 2:
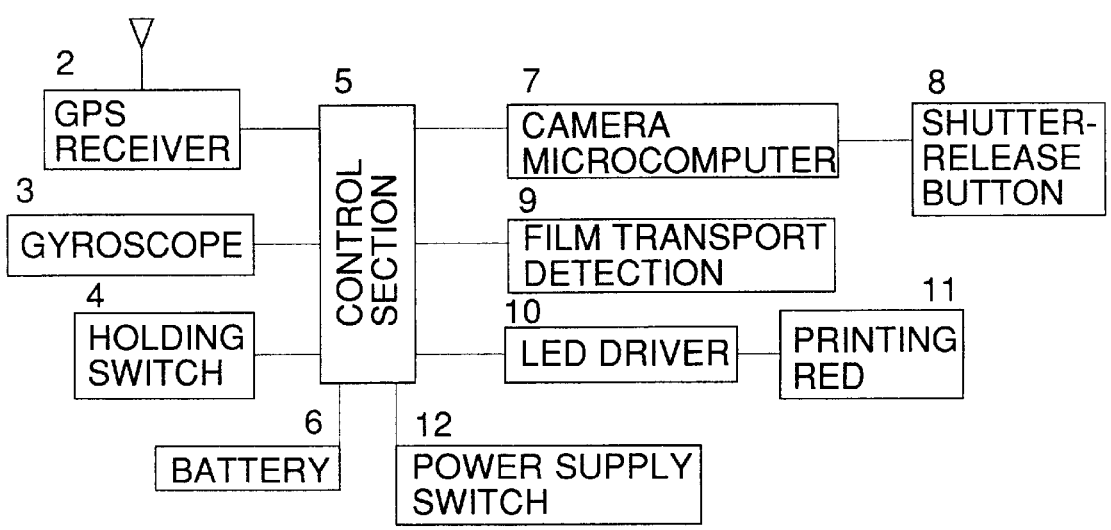
FIG. 2 is a block diagram of a camera in Example 1-1 based on the invention.

FIG. 2 is a block diagram of the invention, and the numeral 2 is a GPS receiver, 3 is a gyroscope, 4 is a holding switch, 5 is a control section, 6 is a battery, 7 is a camera microcomputer, 8 is a shutter-release button, 9 is film transport detection, 10 is an LED driver, 11 is a printing LED and 12 is a power supply switch.

FIG. 3 is a flow chart for operations. Power supply switch 12 provided on a camera main body is turned ON before photographing. In the arrangement, after the power supply switch is turned ON, power source is supplied to GPS receiver 2 and gyroscope 3 so that each operation may be started, and when information of a position from GPS is detected, it is recorded at a predetermined position on control section 5. Under such condition, green LED is lit. In particular, information of a position from GPS receiver 2 takes a longer time to be detected.

Photographing position information at locations such as those in rooms where electric waves from a GPS satellite do not arrive or hardly arrive, in a "valley" between tall buildings or in tunnels, can be held at a predetermined position on the control section 5, by obtaining, at the position where electric waves can be received normally, the position information from GPS satellite and by turning holding switch 4 ON for that position information. Simultaneously with the foregoing, data of recording the data from gyroscope 3 at a predetermined position on control section 5 are initialized. When moving from this location to the photographing position while holding that camera, data of the distance for that movement and of directions thereof are recorded, from gyroscope 3, on relevant predetermined positions on the control section 5, based on the movement.

Shutter-release button 8 of a camera of the invention is of a 2-step action type wherein the first half of a stroke of the shutter-release button is a first step action in which the state for photographing is confirmed, and the second half of the stroke is a second step action in which the camera enters the photographing mode. When the shutter-release button 8 is pressed to cover the first half of its stroke in photographing, various data recorded at the prescribed location of control section 5 are confirmed, and if these data are not recorded, the camera is controlled not to enter the photographing mode.

For showing this state to a photographer in this case, it is effective that a red lamp is lit or a buzzer sounds when various pieces of information are not recorded on the control section 5. (This is not illustrated in the drawings.)

When these data are recorded on the prescribed location of the control section 5, the camera enters the photographing action. When advancing a film after each photographing, an amount of the film advancement is detected by film transport detecting section 9 an LED driver 10 drives printing LED 11 to emit light each time the film is advanced by the amount established in advance so that characters are written on the film.

One method for detecting an amount of film advancement has its constitution wherein an encoder is affixed on a sprocket shaft and an output from the encoder is used in control section 5 to determine light-emitting timing of an LED, and driving signals of LED driver are outputted to form characters on a film.

As a substitute for the character, a specific writing section is necessary, and writing by means of a bar code is effective.

In the constitution, when writing characters and others, the speed of a film used can be set automatically or manually, and an amount of LED light-emission driven by LED driver can be adjusted (which is not illustrated in the figure, in particular).

When utilizing position data from the same GPS in continuation of photographing, the above-mentioned operations are repeated after returning to ON of shutter-release button 8. Even if a small change is made on the location for photographing, data from gyroscope 3 are changed, resulting naturally in a change of the photographing position, and the data are recorded together with images. When photographing after changing the position data from GPS, a holding switch is turned OFF once. Through this operation, position data from GPS recorded on a prescribed position on control section 5 are initialized, and the position data from GPS are renewed on a prescribed position on control section 5 at constant internals in terms of time and recorded.

Figure 4:
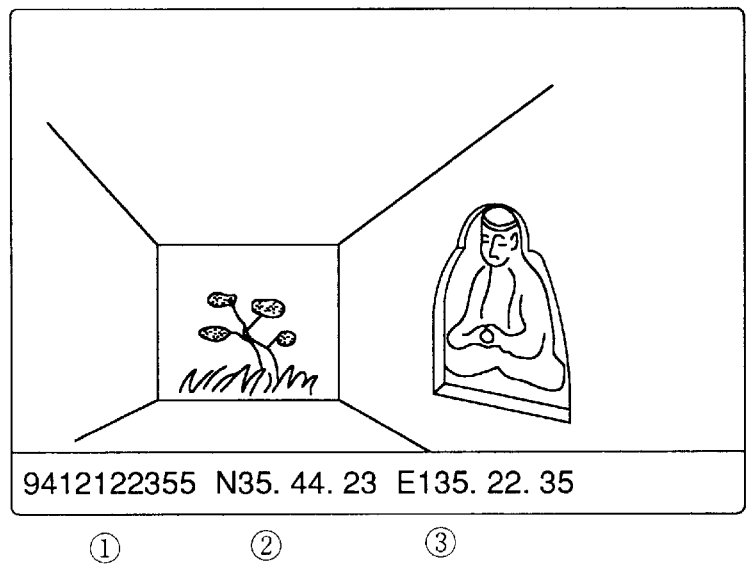
FIG. 4 is an example of an image photographed by a camera in Example 1-1 based on the invention.

FIG. 4 shows an example of a display of data written in a photographed image plane.

Images are displayed on the upper part of the photographed image plane and data are displayed on the lower part thereof.

Data ① represent a year, a month, a day, an hour and a minute of photographing, ② represents a latitude of a photographing position, and ③ represents a longitude.

As stated above, a camera of the invention is equipped with both a GPS receiver and a measuring instrument for a distance and the direction of movement such as a gyroscope. From the data of the both items mentioned above, therefore, a photographing position can be specified even at the location at which electric waves from a GPS satellite do not arrive. Accordingly, a photographing position can always be recorded accurately together with images, which is extremely effective.

Incidentally, there is an occasion wherein no value of a gyroscope is available and only data at a position of holding GPS data are still of value for reference sufficiently. In this case, it is also possible to cause the data at the timing of holding GPS data to be recorded for photographing.

In the invention, position information as well as time information are received by GPS receiver 2. The time information is very accurate because an atomic clock is used. So, the time received from GPS is corrected by received position information to amend the time of a built-in clock so that the time of the built-in clock may be recorded as photographing time. Owing to this, it is possible to record accurate photographing time for each frame image. In this case, when it is not possible to receive time information from GPS, the time of a built-in clock in a camera is recorded as photographing time. Thus, the photographing time can be recorded surely.

FIG. 3B is a flow chart showing operations procedures of the invention. This example shows an occasion where photographing operations are made possible even when data from GPS receiver 2 can not be received (for example, in a place where electric waves do not arrive, such as in a tunnel).

Power supply switch 12 provided on camera main body 1 is turned on before photographing (S1). When the power supply is turned on, GPS receiver 2 and sensors 3 and 4 are supplied with electricity to start operations, and when information is detected, it is recorded in memory 13 in control section 5.

As stated above, shutter 8 of a camera of the invention is of a type capable of doing 2-step switch operations, and when the shutter is pressed, the state is confirmed in the first step of the switching operation, and then, photographing mode is set in the second step. When the shutter 8 is pressed to cover the first step in the course of photographing (S2), control section 5 confirms whether various data are recorded in memory 13 or not (S3). When they are recorded, the control section 5 recognizes a photographing position based on position information recorded in memory 13, then obtains the time of the photographing position by correcting time data with a position, and thereby amends (updates) the time of a built-in clock (S4). Thus, it is possible to record extremely accurate time information.

When data from GPS are not recorded in memory 13, control section 5 writes the time of a built-in clock in memory 13 regarding time and writes NG regarding position because of no record of time and position (S5). After that, operations of photographing are started for photographing (S6). When a film is advanced after photographing, an amount of film transport is detected by film transport detecting section 9, and printing LED 11 is caused by LED driver 10 to emit light for each amount of film transport established in advance so that characters are written on a film (S7). Photographing operations are repeated for necessary cycles. After photographing operations are finished, power supply switch 12 is turned off (S8), and data on memory 13 in control section 5 are erased (S9).

In the example, when data from GPS can be received, time data is corrected based on the received data and is written on a frame together with position information. When data from GPS can not be received, the time of a built-in clock is written in. Therefore, even when data from GPS can not be received, data of the built-in clock can be written in as time information. Time data in this case is not accurate when it is compared with time corrected based on data from GPS. However, time information can be recorded surely at accuracy of a built-in clock at the lowest.

Example 1-2

Figure 5:
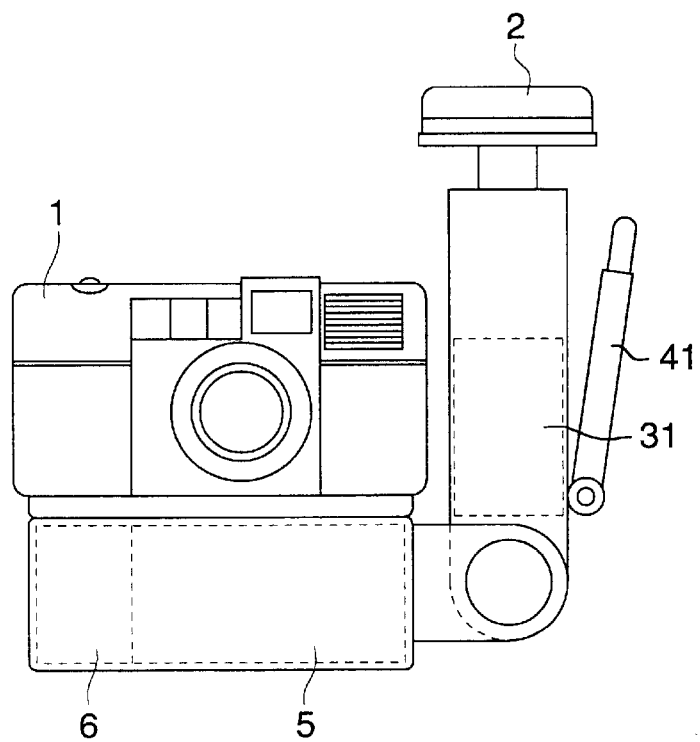
FIG. 5 is a sketch drawing of a camera in Example 1-2 based on the invention.

FIG. 5 shows an appearance of a camera in Example 1-2 of the invention for attaining the first object. The numeral 1 is a camera main body, 2 is a GPS receiver that is a GPS receiving section, 31 is a second receiver that is a second receiving section, 41 is an antenna of the second receiver, 5 is a control section and 6 is a battery.

Figure 6:
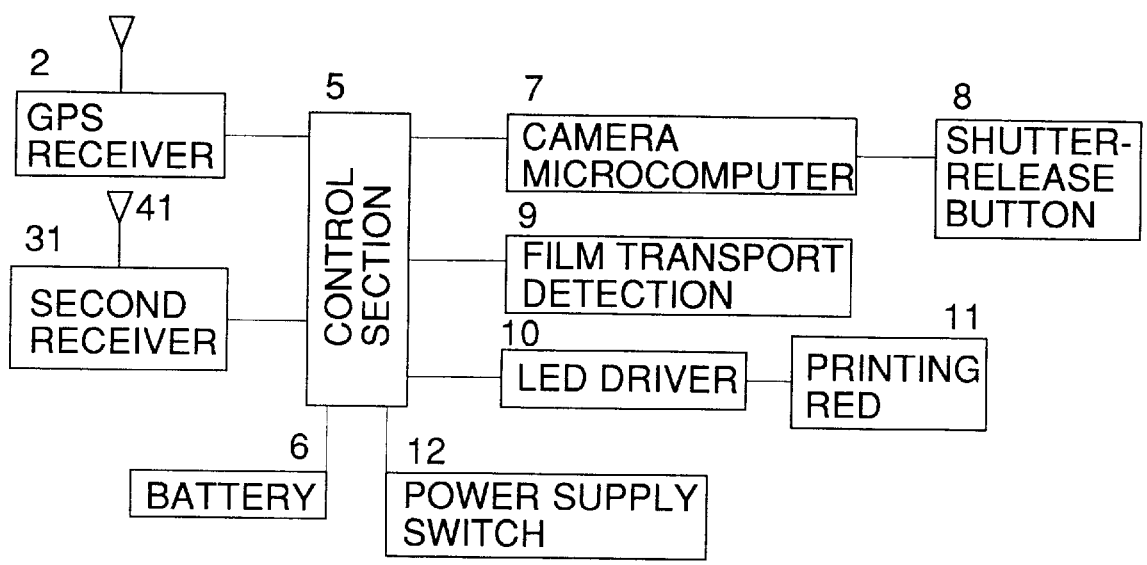
FIG. 6 is a block diagram of a camera in Example 1-2 based on the invention.

FIG. 6 is a block diagram of the invention wherein the numeral 2 is a GPS receiver, 31 is a second receiver, 41 is an antenna of the second receiver, 5 is a control section, 8 is a shutter-release button, 9 is a film-transport detection, 10 is an LED driver, 11 is a printing LED and 12 is a power supply switch.

Figure 7:
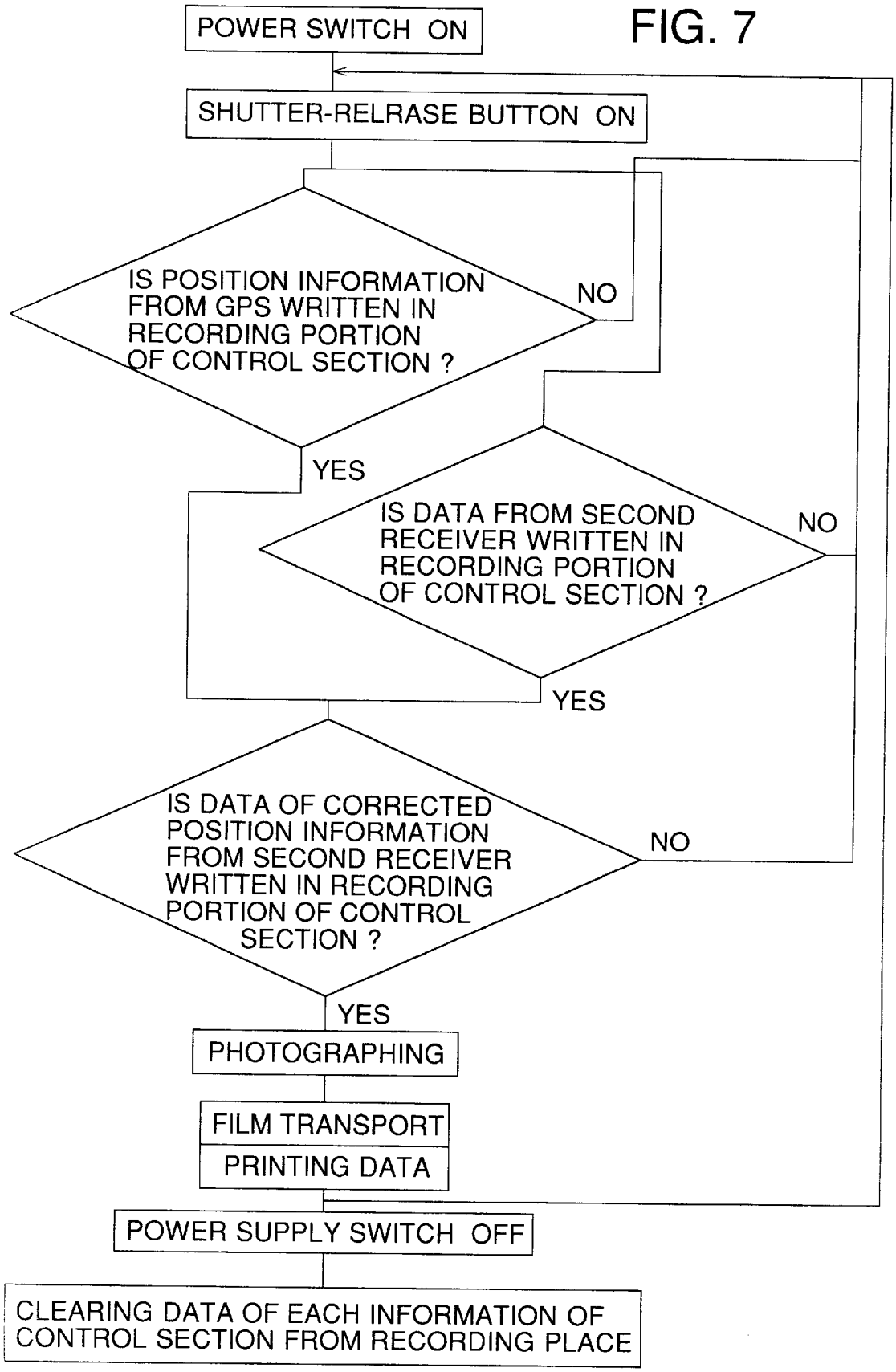
FIG. 7 is an operation flow chart of a camera in Example 1-2 based on the invention.

FIG. 7 is a flow chart of operations. Power supply switch 12 provided on a camera main body is turned ON before photographing. In the arrangement, after the power supply switch is turned ON, power source is supplied to GPS receiver 2 and to second receiver 31 so that each operation may be started, and when information is detected, it is recorded at a prescribed position on the control section 5.

Position information from GPS recorded at a prescribed position on the control section 5 has the maximum error of 100 m. When a difference between latitude/longitude at the location known accurately and latitude/longitude as position information from GPS for that location is calculated in advance, and that difference is used for the purpose of correcting position information, it is possible to enhance position accuracy of the measurement location extremely. For the purpose of receiving the correction data, a second receiver is used.

The correction data to be received by the second receiver can be sent to any measurement location by the use of various electric waves. As an example, an FM receiver receiving FM electric waves from a broadcasting station (FM broadcasting and others), a device or equipment employing communication lines (movable telephone, portable telephone, satellite communication telephone, pocket-telephone, etc.), or a receiver employing a radio system (radio telephone or the like) is given.

It is necessary to build transmitting stations depending on distances covered by various electric waves.

When these data are recorded at the prescribed position on the control section 5, a camera enters photographing operation, which is the same as a camera in Example 1. In the present example, when a film is advanced after each photographing, film transport detecting section 9 detects the amount of film advancement, and LED driver 10 makes printing LED 11 to emit light for each amount of advancement established in advance so that characters may be written on a film, as in FIG. 4.

As stated above, it is possible to make a measurement error small on a camera of the invention because it is possible to record on images the data in which a measurement error at the photographing position is corrected by information from the second receiver. This is very effective when processing data later based on the photographing location (for example, confirmation of the location on a map based on the position information, etc.).

Example 1-3

Figure 8:
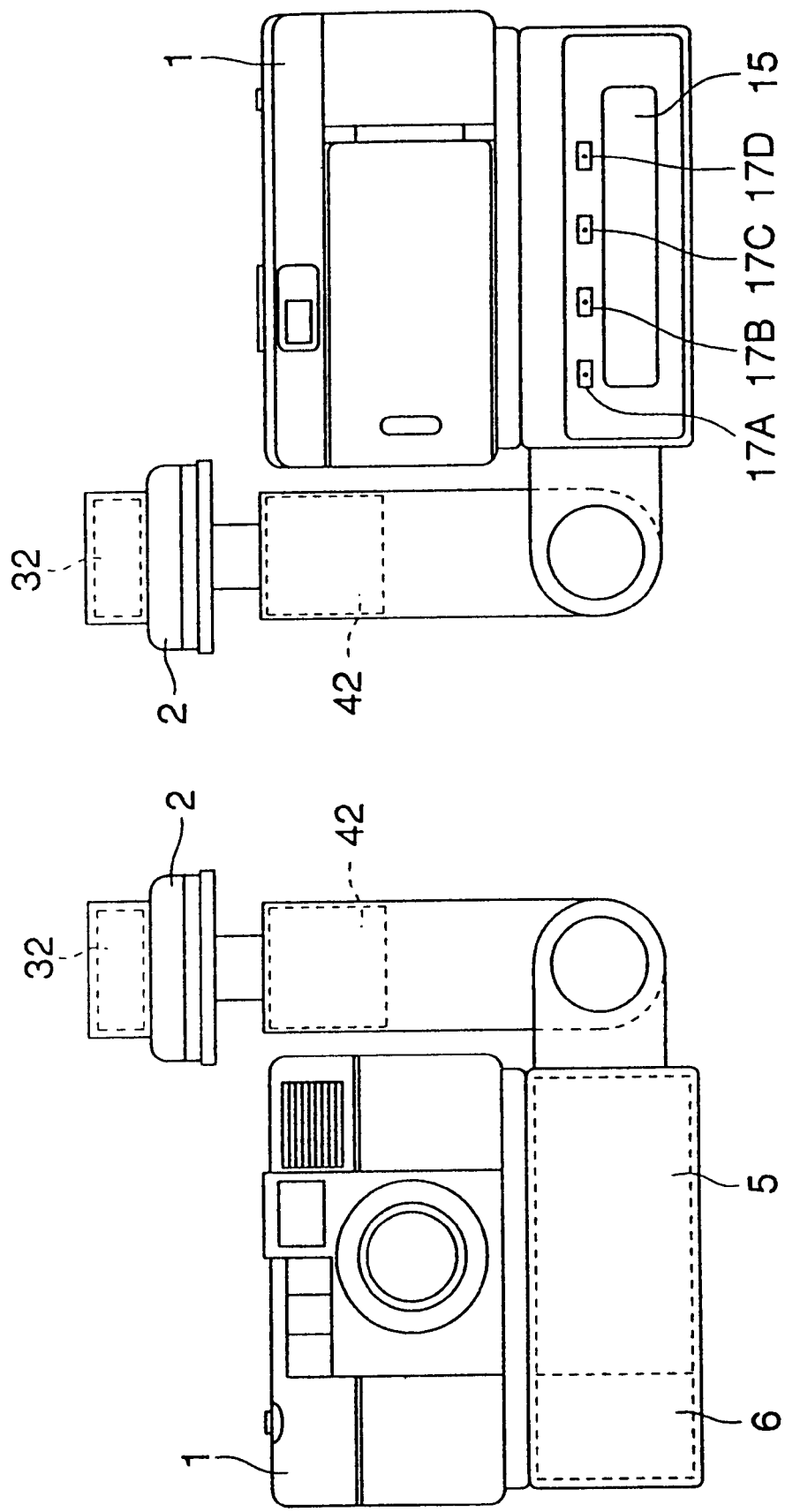
FIG. 8 is an example of an image photographed by a camera in Example 1-3 based on the invention.

FIG. 8 shows an appearance of a camera in Example 1-3 for attaining the first object of the invention. The numeral 1 is a camera main body, 2 is a GPS receiver (antenna) that is a GPS receiving section, 32 is a direction sensor, 42 is an inclination sensor, 5 is a control section, 6 is a battery, and 15 is a display section.

The inclination sensor 42 senses gravity and thereby measures inclinations in two directions including an elevation angle of a camera and a rotation angle around a lens axis both from the direction of gravity. Thus, together with a direction sensor, all photographing directions of the camera can be detected.

As direction sensor 32, a direction meter is used under the consideration that magnetic north is preferable as a reference for the horizontal direction. When necessary, however, it is possible to calculate true north based on the magnetic north, latitude and longitude and to record this true north together with images.

With regard to the direction sensor 32 which is provided on the upper portion of GPS receiving section 2, it is preferable to reduce, as far as possible, the number of metals which are located near the direction sensor 32 and are influenced by or have an influence on magnetism, because the direction sensor 32 senses terrestrial magnetism and thereby detects the direction of a camera. However, it does not happen that no metallic items exist in cameras and compositions at all. Therefore, it is necessary to keep the direction sensor 32 away from the metallic items as far as possible. For that purpose, it is effective that the direction sensor 32 is provided at the upper portion of GPS receiver 2.

Further, GPS receiver 2 (antenna), direction sensor 32 and inclination sensor 42 are usually positioned to be in parallel with the surface of the ground in a normal way for using them. Therefore, in the structure for these GPS receiver 2, direction sensor 32 and inclination sensor 42, they can also be rotated to follow the movement of a camera when the camera is rotated by 90 degrees depending on the direction of the camera (longitudinal, lateral) in photographing.

However, though sensitivity of the direction sensor 32 changes for an angle from the horizontal direction in the elevation angle direction, this can be corrected, when necessary, by an angle from the horizontal direction such as the direction of the elevation angle.

Figure 9:
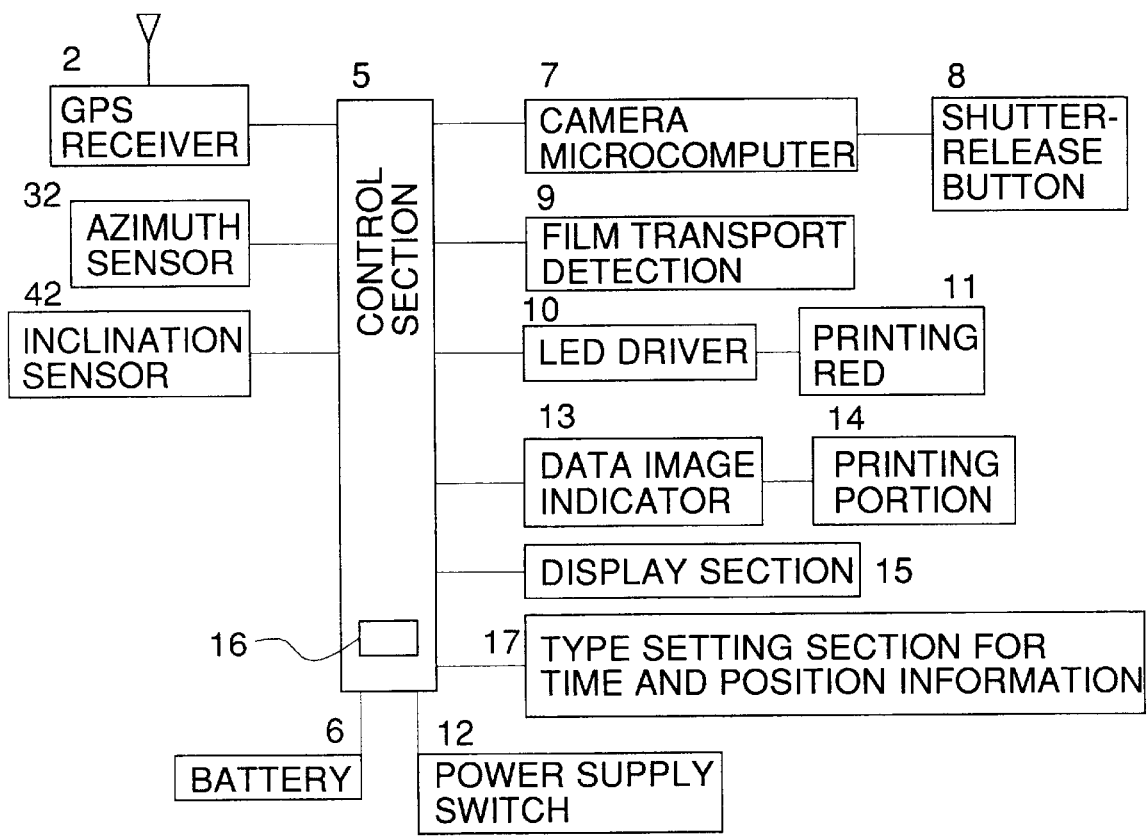
FIG. 9 is a sketch drawing of a camera in Example 1-3 based on the invention.

FIG. 9 is a block diagram of the invention wherein the numeral 2 is a GPS receiver, 32 is a direction sensor, 42 is an inclination sensor, 5 is a control section, 7 is a camera microcomputer, 8 is a shutter-release button, 9 is film transport detection, 10 is an LED driver, 11 is a printing LED and 12 is a power supply switch.

Figure 10:
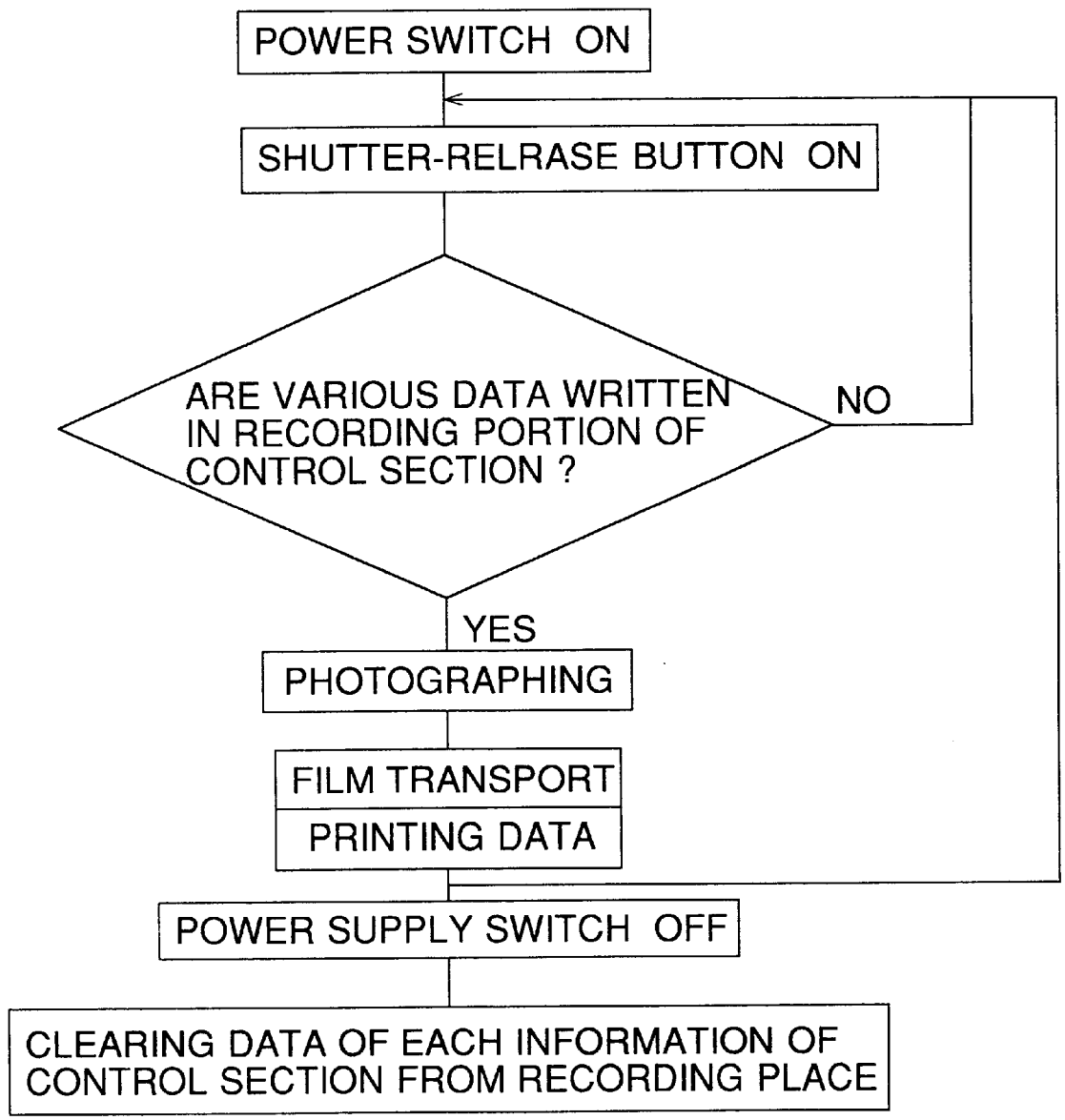
FIG. 10 is an operation flow chart of a camera in Example 1-3 based on the invention.

FIG. 10 is a flow chart of operations. Power supply switch 12 provided on a camera main body is turned ON before photographing. In the arrangement, after the power supply switch is turned ON, power source is supplied to GPS receiver 2 and sensors 32 and 42 so that each operation may be started, and when information is detected, it is recorded at a prescribed position on the control section 5. In particular, position information from the GPS receiver 2 takes time before it is detected.

FIG. 11-A shows an example of a display of data written on a photographing image plane.

Images are displayed on the upper part and data are displayed on the lower part.

Data ① represent a year, a month, a day, and hour and a minute of photographing, data ② represent a latitude of a photographing position, data ③ represent a longitude, data ④ represent the direction of a camera expressed by an angle from the north, data ⑤ represent an elevation angle of a camera and data ⑥ represent a rotation angle of a camera around a lens axis (L represents left-handed rotation and R represents right-handed rotation).

FIG. 11-B shows another example of a display of data written on a photographing image plane. Images are displayed on the left side and data are displayed on the right side. What is represented by each data is the same as that explained above.

With regard to the direction, in particular, among various data, FIG. 11-B shows an example wherein the north direction is displayed by an image of an arrow, in addition to the display by means of the numerical value. This is based on the consideration that visual confirmation is easier. In this case, an image displaying device itself is printed (for example, a direction meter itself is built in and is printed, or a liquid crystal displaying device is built in and what is displayed by it is printed). These are not illustrated as figures, in particular.

A camera in the present example of the invention is structured so that photographing state such as direction and inclination can be recorded on images in the course of photographing, the photographing state can be confirmed from each frame afterwards, position information from a GPS receiver can be recorded further, position information at higher accuracy can be recorded through a second receiver provided, and all photographing information on a camera can be recorded on images. Accordingly, identification of the photographed image is easy.

It is also possible to improve accuracy of the direction based on the data mentioned above, when it is necessary. Incidentally, in FIG. 8, the numeral 15 represents a display section. It is preferable that when each information is detected, contents of the detection are recorded at a prescribed position on control section 5 and each data is displayed on the display section 15 simultaneously.

When completing photographing, all data written at the recording position on the control section 5 are erased. In this case, though all data are erased on the display section 15, symbols or messages can be displayed when necessary. Incidentally, as power supply for the display section 15, a lithium battery is used separately from the camera mentioned above.

FIG. 11-C shows an example of indicating data displayed on the display section 15.

Latitude ② and longitude ③ are indicated on the upper portion, while a year, a month, a day and a minute ①, the direction of a camera expressed with an angle from the north ④, the elevation angle of a camera ⑤ and a rotation angle of a camera around a lens axis (L represents left-handed rotation and R represents right-handed rotation) ⑥.

By providing a display section on a camera of the invention, it is possible to make that camera to display various pieces of information which, however, are not recorded on a film.

Next, an example wherein the contents of display section 15 are changed and symbols of information types are established will be explained as follows.

In FIG. 9, the numeral 17 is a type setting section for setting types of time and position information to be recorded in the course of photographing. On the type setting section 17, there are provided item selection switch 17A, time setting switch 17B, numeral setting switch 17C and symbol setting switch 17D on the back of a camera.

Figure 12:
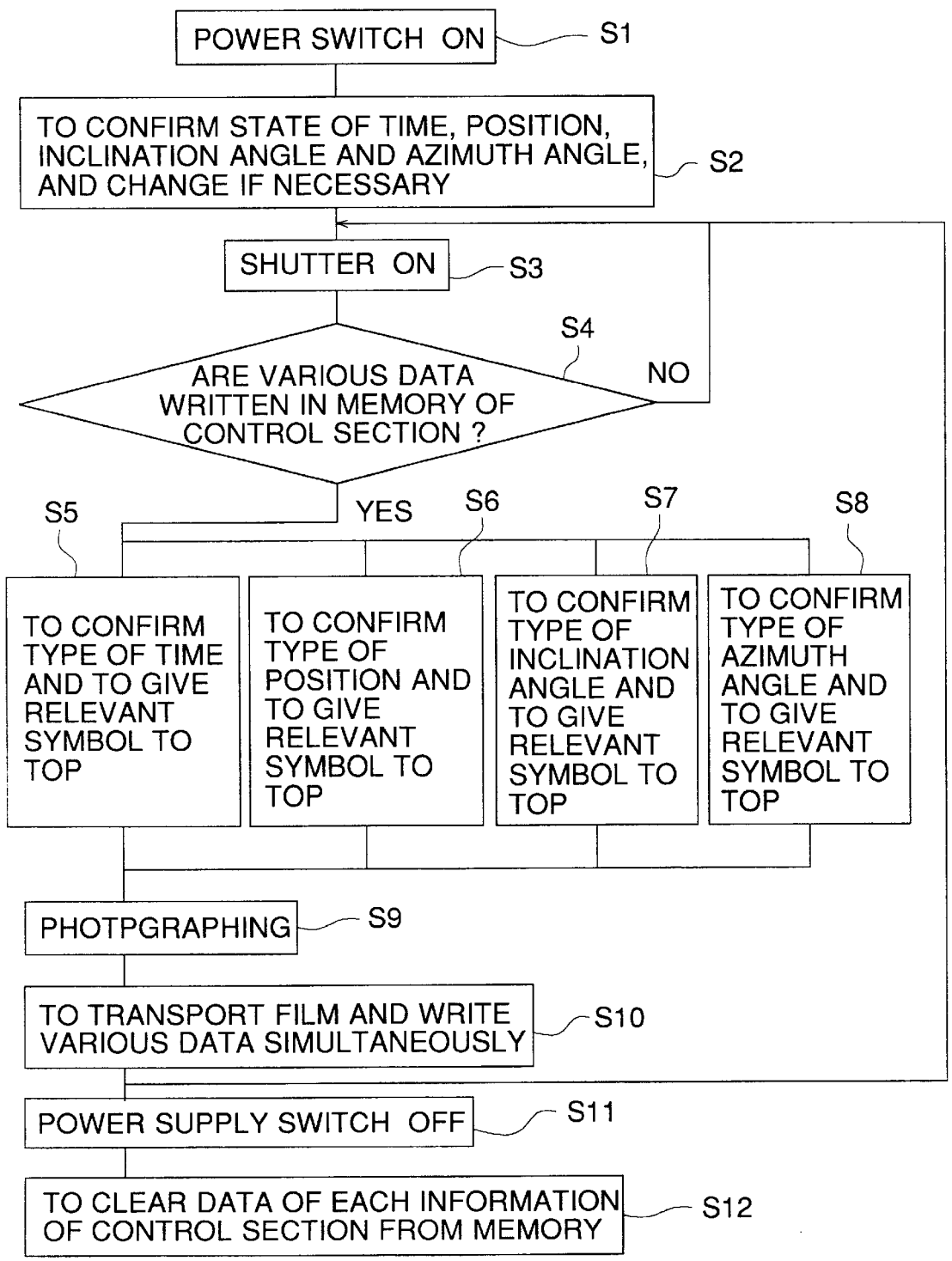
FIG. 12 is an operation flow chart of a camera having a switch for establishing symbols in Example 1-3 based on the invention.

FIG. 12 is a flow chart showing an example of operation procedures in the present example. Before photographing, power supply switch 12 provided on camera main body 1 is turned on (S1). Upon the turning on of power supply, GPS receiver 2, azimuth sensor 32 and inclination sensor 42 are supplied with electricity to start their operations. When information are detected from these sensors, these information are recorded in memory 16 of control section 5. After that, time, the states of position, inclination and azimuth angle displayed on display section 15 are confirmed before shutter 8 is pressed, and if necessary, contents of these displays are modified (S2). Next, how to modify display contents (operation for setting types of time/position information) will be explained as follows.

The symbol 17A represents an item selection switch, and when this switch 17A keeps being pressed, a cursor moves to the forefront position of time, the forefront position of position information, the forefront position of an inclination angle and the forefront position of an azimuth angle in this order on the display section to show the selection of each mode. The symbol 17B is a time setting switch, and when this switch is pressed, a year, a month, a day, an hour, a minute and a second can be set. In this case, also, the cursor moves by an increment of two digits on the display section when this switch is pressed. The symbol 17C is a numeral setting switch wherein each position of two digits has a switch, and when this switch is pressed once, the numeral is increased by one. The symbol 17D is a symbol setting switch, and when this switch is pressed, forefront symbols of time, a position, an inclination angle and an azimuth angle are displayed in succession. These can be confirmed on the display section 15. An example of operations will be shown below.

In the case of time, the switch 17A is used to select a time mode which can be confirmed by the cursor that is located at the forefront position of time display on the display section 15. For example, the time from GPS can be recorded by recording G, for example, at the forefront position. In the case of this mode, an electric wave from GPS is recorded when it is received. Therefore, an operation such as to set time by the standard time in advance is not necessary.

In the case of Japan time, J, for example, is recorded at the forefront position. When it is possible to receive GPS data in the course of photographing, the received data are corrected automatically by a time difference from the time from the positional forefront character J, and thereby the accurate time at a photographing place can be recorded easily. However, when electric waves from GPS can not be received, the time of a clock built in a camera is displayed. When a photographing place is changed, there is a possibility of a change of time. Therefore, it is possible to amend the displayed time.

In the case of a position, a position mode is selected by the switch 17A, and it is possible to set by displaying necessary symbols by pressing the switch 17D. For example, in the case of a geodetic survey in Tokyo in a geodetic system, J, for example, is given to the forefront position, and in the case of WGS84 system, a space, for example, is given to the forefront position. In the case of position accuracy, data corrected by signals for correcting GPS data is given D, for example. After that, as a type of the signal, D is given if from telephone, and F is given if from FM broadcasting. However, these can be given automatically from connected measuring instruments after discrimination of conditions.

In photographing conditions, when data at a place where reception is possible is latched and used in photographing at a place where reception is impossible, being resigned for inaccuracy of position information, L, for example, can be recorded, and when data from another position measuring instrument is used, A, for example, can be recorded. However, these can be given automatically from connected measuring instruments after discrimination of conditions, which is the same as in position accuracy.

In the case of an inclination angle, A, for example, is used for data from other sensors, R, for example, is used for a right-handed display angle in the case of an azimuth angle, L, for example, is used for a left-handed display angle, and A, for example, is used for data from other sensors.

When shutter 8 is pressed to cover the first step (half pressing) in the course of photographing (S3), control section 5 confirms that various data are recorded in memory 15 (S4), and when these data recorded in memory 15 of the control section 5, the control section 5 calculates the time from position data, and writes the time in the memory 15 of the control section. Simultaneously with the foregoing, the time of a clock arranged in the control section 5 is updated. Then, a type of the time is confirmed and relevant symbol is given to the forefront position (S5), a type of the position is confirmed and relevant symbol is given to the forefront position (S6), a type of the inclination is confirmed and relevant symbol is given to the forefront position (S7), and a type of the azimuth angle is confirmed and relevant symbol is given to the forefront position (S8), After these operations, the sequence moves to the photographing operation (S9). When transporting a film after photographing, an amount of film transport is detected by film transport detection section 10, and printing LED 12 is caused by LED driver 11 to emit light for each amount of transport established in advance so that character data are written on a film (S10).

Figure 13:
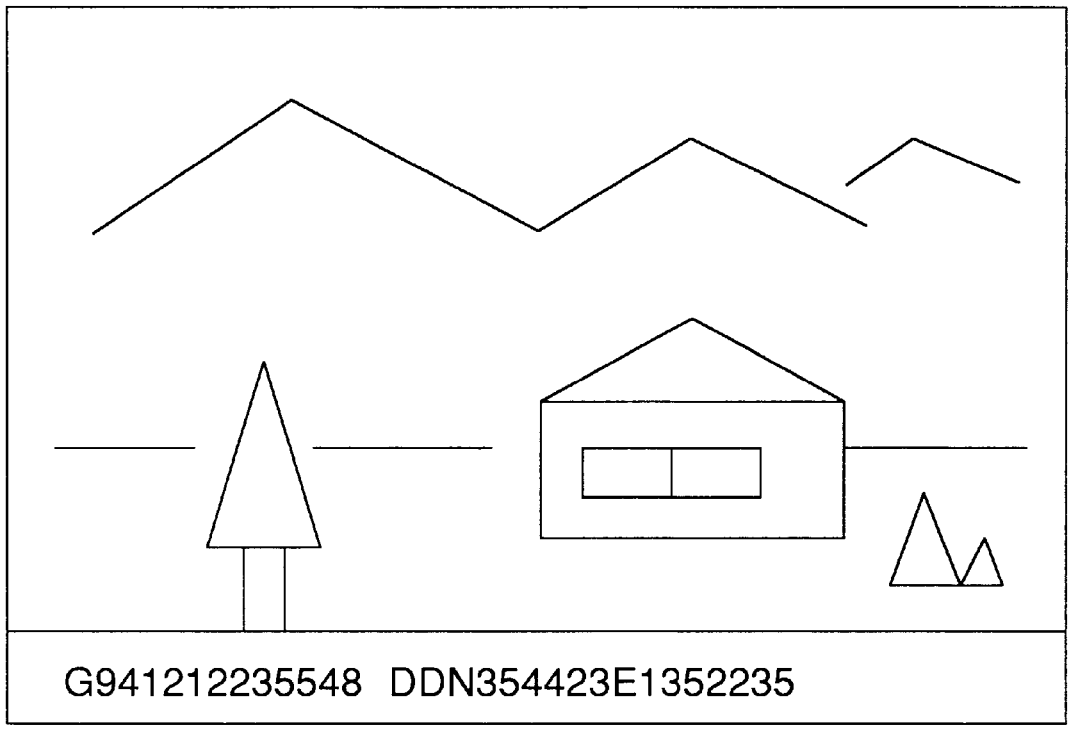
FIGS. 13-A and 13-B represent examples of images photographed by a camera in Example 1-3 based on the invention.

FIG. 13-A is a diagram showing an example of images photographed in the present example. The photographed image is composed of an image area at the upper portion and a character information recording area at the lower portion. In the character information recording area, ① of data represents a year, a month, a day, an hour, a minute and a second, ② represents a latitude, and ③ represents a longitude. In the example, G which means data from GPS is recorded on the forefront position of year/month/day/hour/minute/second in ① of the data, and DD which means the data corrected by the signal for correcting GPS data and means receiving from telephone is recorded on the forefront position of the latitude in ② and of the longitude in ③.

FIG. 13-B is a diagram showing an example of display on display section 15. It shows the same contents as in the character information recording area of the photographed image shown in FIG. 13-A.

Incidentally, in the case of FIG. 13-A, when it is necessary to record, as further information, also data received from GPS before correction, it can be made possible easily if design changes are made so that memory positions are increased in control section 5 and character information are recorded with two lines.

In the example stated above, the description therein refers only to the occasion where image information and character information are recorded. However, the contents of the invention can be applied also to the occasion where images are photographed electronically and character information are inputted and recorded electronically, through RS232C interface, for example.

In the present example, for the purpose of discriminating the state of time and position information, the forefront position of each data is given alphabets or symbols for discriminating the type of the data. Therefore, the occasion of reception of information from GPS in the case of time and the occasion where the photographing position is designated can easily be discriminated. In the case of position information, it is possible to discriminate easily, as in the case of time, among simple GPS received data, data corrected by the signal for correcting GPS data and the occasion to latch and use data at the position where it is possible to receive being resigned for inaccuracy of position information in photographing at the location where reception is impossible.

In this case, when a display section for displaying character information is provided and a means for displaying character information with discrimination symbols for the aforesaid discrimination of character information is provided, it is possible to confirm the type of character information displayed.

When the contents of the character information for the aforesaid discrimination are GPS reception time and time in each country in the case of time information, and are a geodetic system, position accuracy and photographing conditions in the case of position information, the time information can be made clear and photographing conditions can be made clear.

In the example stated above, photographing position information, time information as well as symbols for discriminating the types of the above information (for example, discrimination among GPS time, Greenwich time, or time of each country, in the case of time information) are given as character information to be recorded on a film in the course of photographing. Due to this, time information for photographing and photographing places can be discriminated, and thereby it is possible to convert easily a certain time information to time information of other types.

Example 1-4

As Example 1-4 for attaining the first object, a means for enabling a GPS receiver to receive regardless of the photographing direction or the photographing attitude of a camera will be explained Namely, an antenna of the GPS receiver needs to receive electric waves from a satellite, direction sensor 32 is a sensor to sense terrestrial magnetism and thereby to measure the direction based on magnetic north serving as the reference, and inclination sensor 42 is a sensor to sense gravity and thereby to measure an angle based on the direction of gravity that serves as the reference and it is positioned to be almost in parallel with the surface of the ground in the normal way of using. It is therefore preferable that when a camera is rotated by 90 degrees or 270 degrees depending on the direction of the camera in photographing (scenery and a portrait of a person), these GPS receiver 2, direction sensor 32 and inclination sensor 42 can also be rotated simultaneously.

Figure 14:
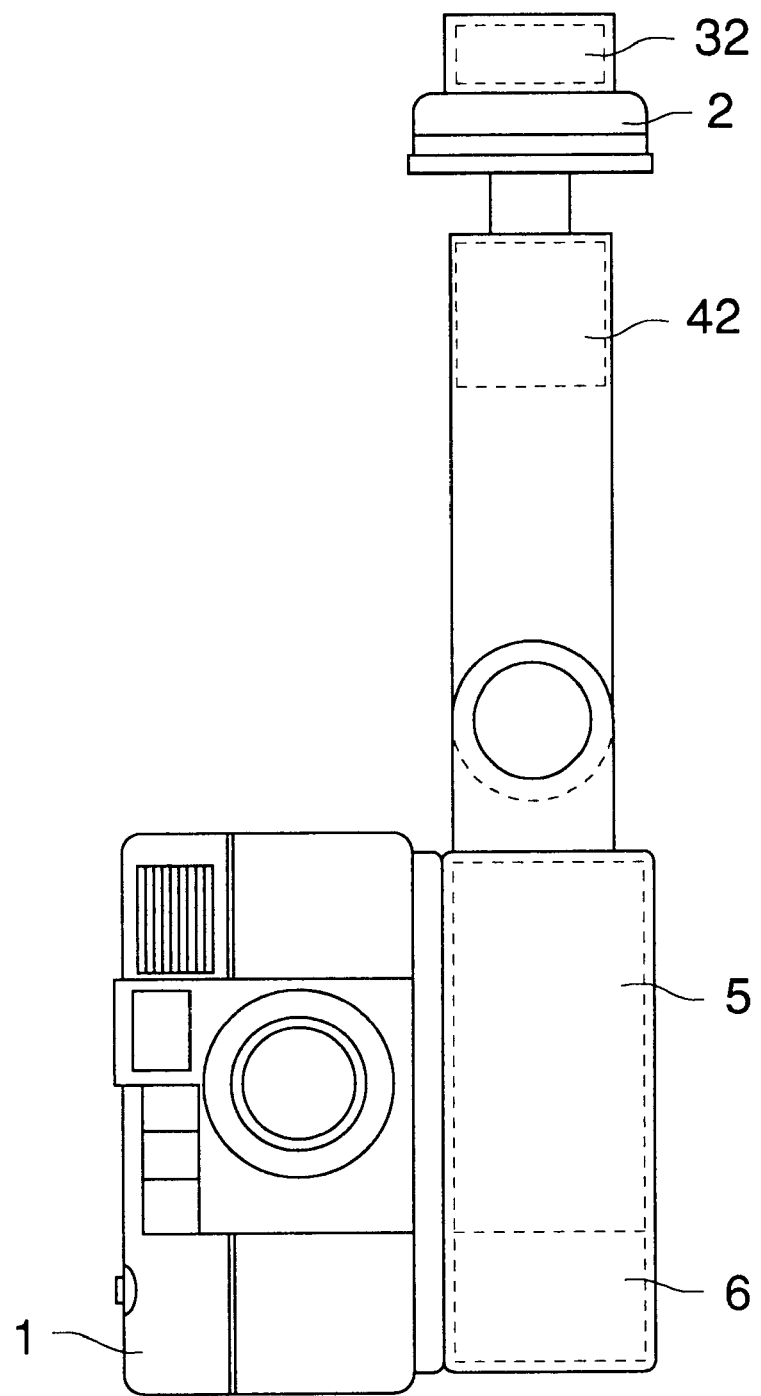
FIG. 14 is a sketch drawing where the photographing direction a camera in Example 1-4 based on the invention is a portrait.

While FIG. 8 shows an occasion wherein the photographing direction is matched with a scenery, FIG. 14 shows a sketch drawing of a camera in the case where the photographing direction is a portrait of a person. FIG. 14 shows the conditions wherein antenna 2 of GPS receiver 2, azimuth sensor 32 and inclination sensor 42 are rotated by 90 degrees.

When the photographing direction is changed from scenery (FIG. 15 (A)) to portrait (FIG. 15 (B)), antenna 2, azimuth sensor 32 and inclination sensor 42 are rotated by 90 degrees.

In this case, retaining ring R that retains the aforesaid plural sensors on a rotating section and screw S for affixing the retaining ring R on the rotating section are set.

When this screw S is not set, the aforesaid plural sensors rotate with antenna 2 positioned upward as a camera is rotated, and normal state can always be maintained.

When the photographing direction is changed from scenery (FIG. 15(c)) to a portrait (FIG. 15(D)), antenna 2, direction sensor 32 and inclination sensor 42 are rotated by 270 degrees, then, antenna 2 is directed to the sky, direction sensor 32 is positioned to be in parallel with magnetic north and inclination sensor 42 is made to be based on the reference of gravity.

When the photographing direction is changed from scenery (FIG. 16(A)) to a portrait (FIG. 16(B) and (C)), plural sensors including antenna 2, direction sensor 32, inclination sensor 42 and others are removed and attached again to grooves G (groove G1 and groove G2) provided on two sides of a camera to follow the change of the photographing direction, which is shown in FIG. 16. In the case of a portrait, the rotation is 90 degrees or 270 degrees depending on the direction of inserting the sensor into groove G.

Figure 17:
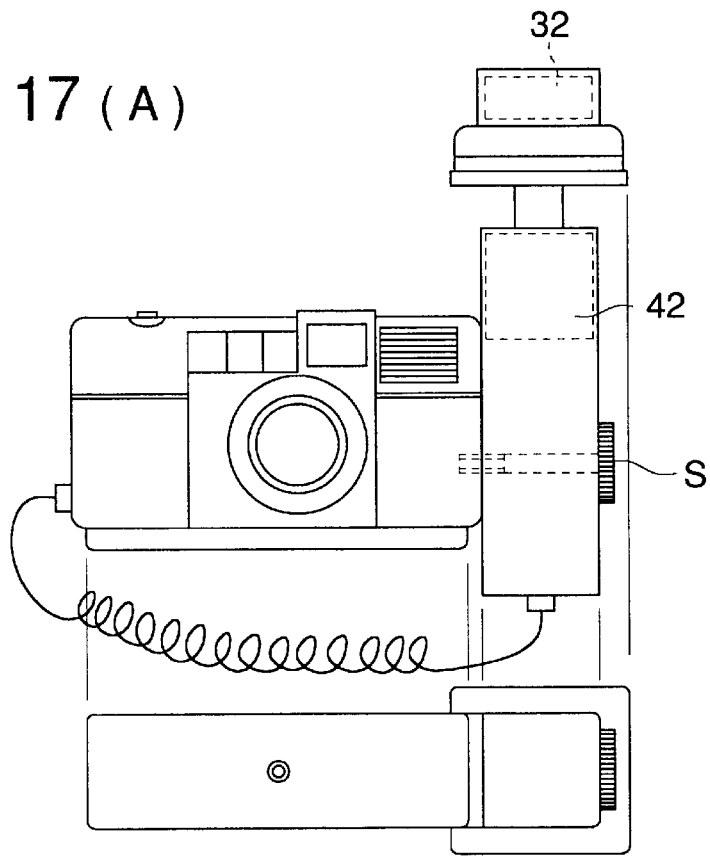
FIGS. 17-A–17-C represent sketch drawings of other situations of a camera in Example 1-4 based on the invention.
Figure 17:
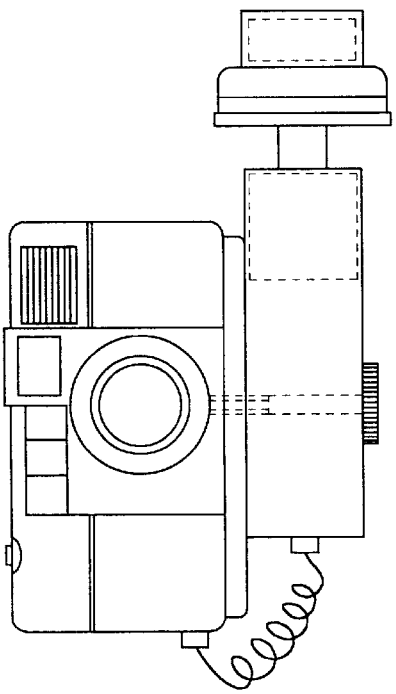
Figure 17:
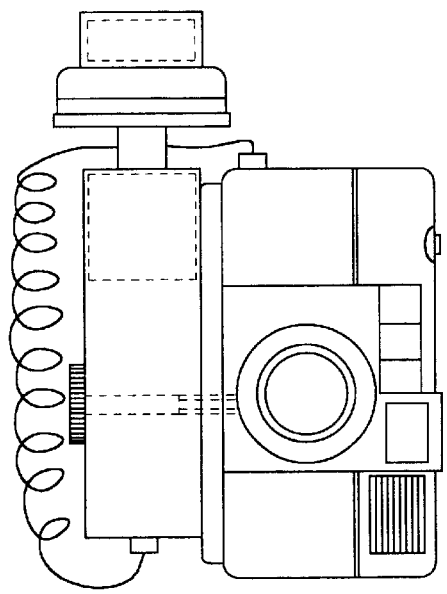

When the photographing direction is changed from scenery (FIG. 17(A)) to a portrait (FIG. 17(B) and (C)), plural sensors including antenna 2, direction sensor 32, inclination sensor 42 and others are removed and affixed again with set screw S to follow the change of the photographing direction, which is shown in FIG. 17. In the case of a portrait, the rotation is 90 degrees or 270 degrees depending on the direction in which the sensor is affixed with set screw S.

When a tripod screw is used for the set screw S, it is effective for fixing a camera.

As stated above, in a camera of the invention, various sensors whose sensitivity changes depending on the photographing direction are housed together in a member capable of being rotated by 90 degrees or 270 degrees against a camera so that they are directed to a certain direction constantly in the course of photographing. Thus, data can be taken in under the condition of high sensitivity of the sensor.

Figure 18:
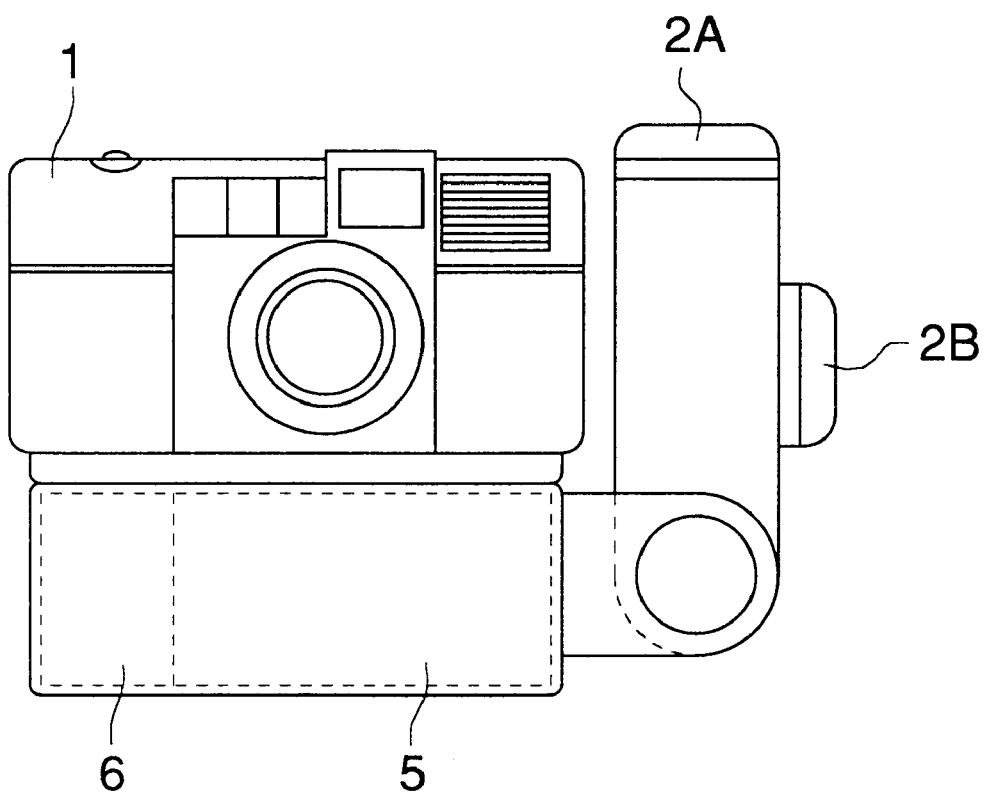
FIG. 18 represents a sketch drawing of other situation of a camera in Example 1-4 based on the invention.
Figure 19:
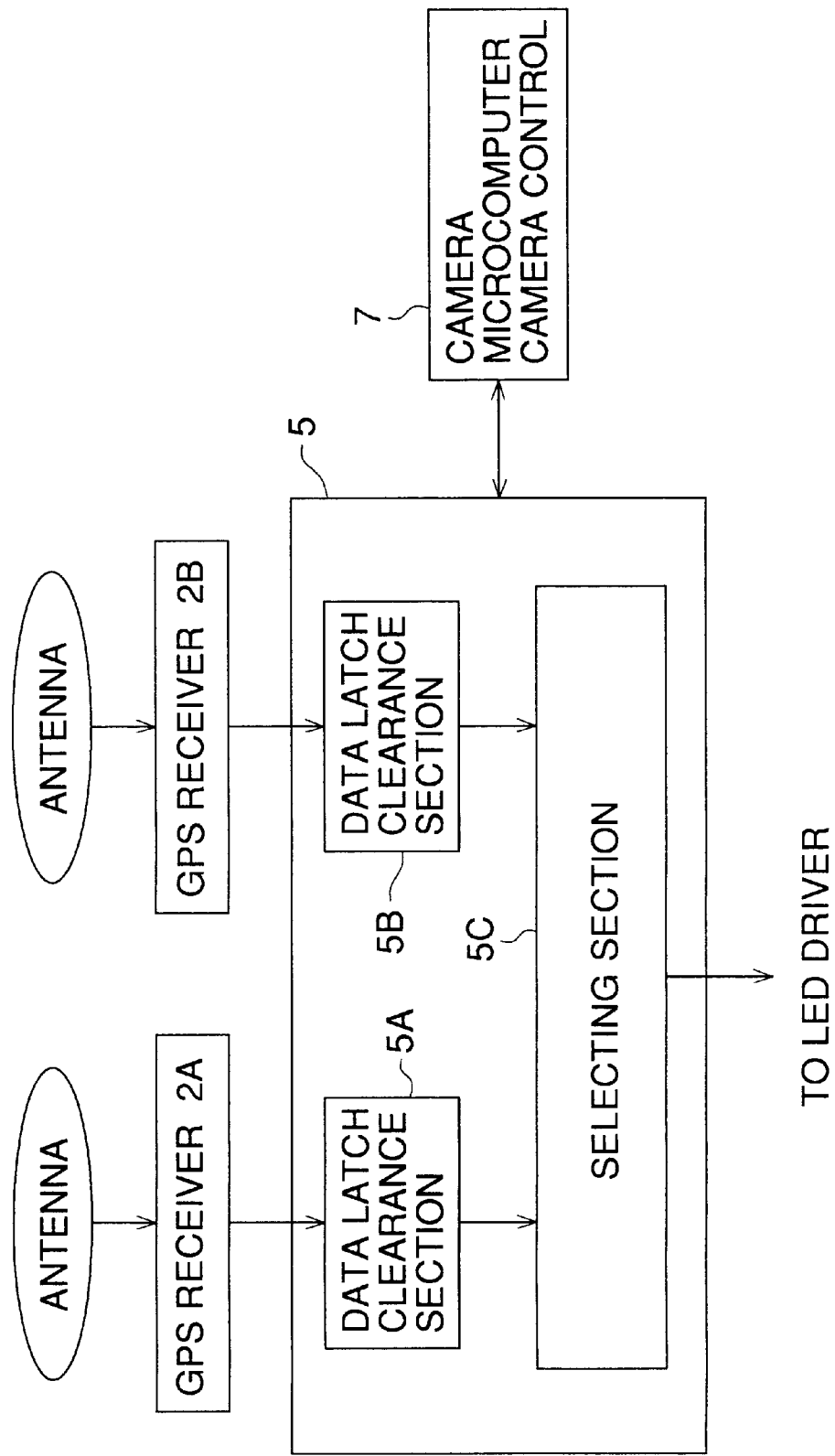
FIG. 19 is a block diagram of a control section of a camera in FIG. 18.

FIG. 18 shows an example wherein accurate position information can be obtained by a GPS receiver regardless of the photographing posture of a camera. As shown in the figure, two GPS receivers 2A and 2B are arranged so that their receiving directions cross at right angles. Therefore, when the posture of a camera is for photographing a scenery, the GPS receiver 2A is positioned to be horizontal, and when the posture of a camera is for photographing a person, the GPS receiver 2B is positioned to be horizontal, FIG. 19 is a block diagram showing the structure inside the control section 5 that processes signals from the GPS receivers 2A and 2B. Signals received at the GPS receiver 2A and those received at the GPS receiver 2B are processed respectively by data latch calculation sections 5A and 5B so that position information are calculated. This calculated position information of the GPS receiver 2A and that of the GPS receiver 2B are compared at a selection section so that position information having higher accuracy is selected and is stored in a memory of control section 5 as well as outputted to LED driver 10 to be written on a film. Due to this constitution, position information of the GPS receiver 2A is selected when the camera posture is for photographing a scenery, and position information of the GPS receiver 2B is selected when the camera posture is for photographing a person. Therefore, due to the constitution of the present example, it is not necessary to adjust the receiving direction by rotating the mounting portion for a GPS receiver according to the photographing posture of a camera, which makes an operation of a camera simple.

Example 1-5

Data printing will be explained as follows, as Example 1-5 attaining the first object of the invention. A film on which data are printed is transported in the following procedure.

Figure 20:
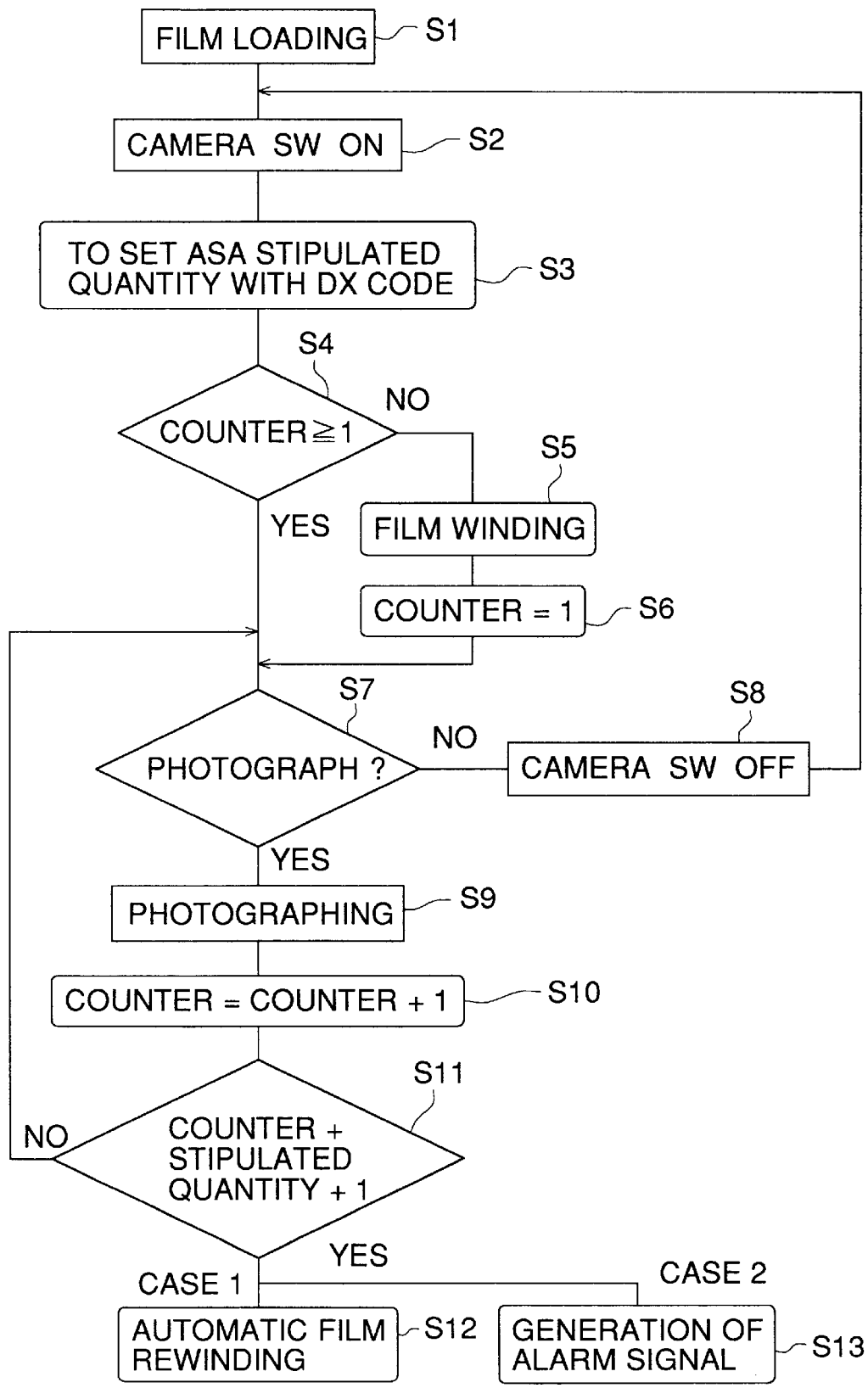
FIG. 20 is an operation flow chart of a camera in Example 1-5 based on the invention.

FIG. 20 is a flow chart showing operation procedures of camera microcomputer 7. An example in the figure represents a flow chart of operation procedures of a camera microcomputer of a part related to the invention in a camera of a type of taking up a film in the camera from an ordinary film cartridge.

When a film is loaded in camera main body 1 (S1) and power supply switch 12 of the camera is turned on (S2), the camera microcomputer 7 sets ASA speed and stipulated quantity from DX codes (S3). Then, the camera microcomputer 7 checks whether the counter is greater than 1 or not (S4). When the counter in the microcomputer is less than 1, this means that the film is not taken up. So, the film is taken up (S5) so that the counter may show 1.(S6).

Then, the photographing is checked whether it is continued or not (S7), and when the photographing is not continued, power supply switch (camera switch) 12 is turned off (S8). When the photographing is continued, shutter 8 is pressed to cover the second step (full-depth pressing) for photographing (S9). In photographing, a part of a film frame is shielded from light (a lower portion of a frame is shielded in FIG. 4), and when the film is taken up, frame information recorded in memory 16 is printed on the film by printing LED 11. The camera microcomputer 7 adds 1 to counter 14 for each photographing (S10). Next, the camera microcomputer 7 checks whether the counter shows the stipulated quantity +1 or not (S11). When the counter is less than the stipulated quantity +1, the sequence returns to step S7 to continue photographing. Thus, normal photographing can be done until the counter reaches the stipulated quantity +1.

When the counter arrives at the stipulated quantity +1, information can not be recorded fully though images can be photographed on the last frame. The reason for this is that the film is pulled and thereby the recording area can not reach the position of printing LED 11. In this case, therefore, the camera microcomputer 7 instructs the control section 5 so that the film may be rewound automatically. Due to this, the film is rewound automatically when the value of counter 14 showing the film frame number arrives at the stipulated quantity +1 (S12). This film automatic rewinding assures that all information can be recorded on the frame on which images are photographed (Case 1).

On the other hand, a photographer wishes to photograph up to the last frame if the information can not be recorded fully. In this case, there is used a means that indicates to the outside that the counter arrives at the stipulated quantity +1 (display of film counter flashes, buzzer sounds, or emission element flashes) (S13). The photographer can learn that information can not be recorded fully (Case 2). In this case, further photographing can be done if a photographer is resigned for imperfect recording of characters. Selection of Case 1 or Case 2 is a matter of design, and it is preferable that a selection switch for selecting either one of them is provided on a camera main body so that a photographer can select.

Figure 21:
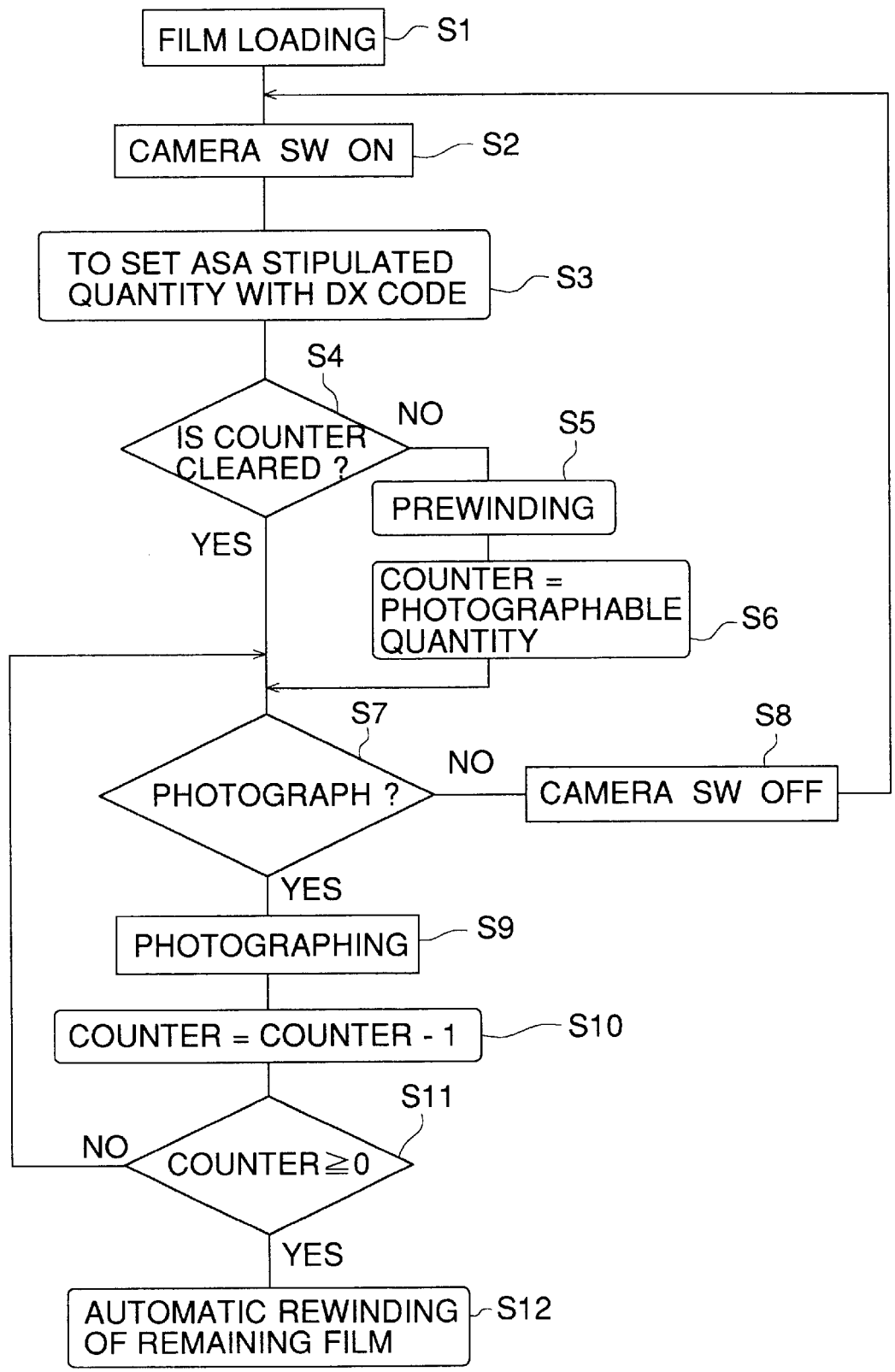
FIG. 21 is another operation flow chart of a camera in Example 1-5 based on the invention.

FIG. 21 is a flow chart showing operation procedures of a camera microcomputer of the invention in a camera of a type of prewinding (when a film in a cartridge is loaded in a camera, the film is taken out of the cartridge into the camera, and after each photographing, the film is rewound into the cartridge). When the film is loaded (S1), and power supply switch 12 of the camera is turned on (S2), camera microcomputer 7 sets ASA speed and stipulated quantity from DX codes (S3). Then, the microcomputer 7 check whether the counter is cleared or not (S4). When the counter is not cleared, film prewinding is performed so that the film is taken into the camera main body 1 (S5). The camera microcomputer 7 sets the number of exposures on the counter (S6)> In this case, the camera microcomputer 7 sets the number of exposures photographable by counting the number of perforations on the film, or writes the stipulated quantity from DX code in the counter.

Next, the camera microcomputer 7 checks whether photographing is conducted or not (S7), and when no photographing is conducted, it turns off power supply switch 12 (S8). When photographing, it photographs (S9), and deduct 1 from the counter (S10). Then, the camera microcomputer 7 checks whether the counter arrives at 0 or not (S11). When the counter is not 0, photographing is continued and 1 is deducted from the counter. In this case, a film is transported inside the camera, and printing LED 11 prints information stored in memory 13 on the edge of a film frame when the film is transported.

Thus, ordinary photographing is possible until the counter reaches 0, and when the counter reaches 0, the camera microcomputer 7 rewinds the remaining film into the cartridge automatically (S12). According to this example, information can be written surely as far as the number of exposures established in advance is concerned. And yet, according to this example, photographed images can be protected without being exposed to light even when a back lid of the camera main body 1 is opened accidentally, because photographed frames are housed in the cartridge.

Next, operations of an information writing section of the invention will be explained in detail as follows. Writing of various pieces of information on a film frame is conducted by printing LED 11 as stated above. Photographing is conducted under the condition that an area on which the image information is written is shielded from light, and information about the image is written on the image information writing area when the film is wound into the camera main body.

FIGS. 22-A and 22-B represent diagrams each showing an example of writing information on a film frame, wherein one frame is enlarged to be shown. FIG. 22-A shows an occasion of 5 dots in the direction of a line and 7 dots in the direction of a column, while, FIG. 22-B shows an occasion of 5 dots in the direction of a line and 8 dots in the direction of a column. In this case, the direction of film advancement is defined to be a line (sub-scanning direction) and the direction perpendicular to the aforesaid direction is defined to be a column (main scanning direction). In the case of 5 dots×7 dots, 29 dots are used for 5 characters under the condition that a 1-dot space is given between two characters as shown in FIG. 22-A. If all characters are expressed by 5 dots×7 dots as in the foregoing, the number of characters to be written on a film frame is naturally limited.

Now, let it be considered that characters are compressed to be written. For example, if it is possible to record on a basis of one character per one column, 15 characters can be recorded under the condition that a 1-dot space is given between two characters. In this case, one column can cover up to $2^6=64$ characters, and it is necessary to determine characters for dot column in advance. When recording camera number "12345678" with one character one dot column display, it becomes like B in FIG. 22-A.

In the case of an ordinary recording system, the number of character to be recorded is limited though the recorded information can be recognized visually, which is an advantageous point. Therefore, an ordinary character recording and a compression character recording can be mixed for recording as shown in the figure. In this case, it is necessary to discriminate a starting point of compressed characters. For that purpose, the discrimination symbols like those in A portion in FIG. 22-A can be recorded. In this case, for the information which is required urgent recognition from the printed paper, ordinary recording is conducted. While for the information which does not require urgent recognition, compression recording is conducted. Whereby it is possible to record much information without reducing information to be recorded on frames.

When making the character code popular, the number of dots in a column is made to be 8 so that it may correspond to JIS code as shown in (b). Since JIS division code is composed of division code of 94 lines and section code of 94 columns, when each of them is made to correspond to one dot column, it is possible to display one character with 2-dot columns. C and D in Fig. (b) represent dot columns, and two columns of C and D correspond to one character. When such system is employed, characters in a huge amount can be subjected to compression recording, which is convenient for displaying Chinese characters. An area E in the figure shows an example wherein "Mochizuki" is recorded as a name of a photographer. This display method corresponds to JIS codes. Incidentally, even in this case, it is necessary to record discrimination symbols as shown on F portion for discriminating from other display areas. Incidentally, it is not necessary to use 3 columns and 4 columns shown in the example respectively for discrimination symbol areas A and F stated above, and columns in less amount are acceptable.

In the present example, due to provision of a means to rewind a film automatically when a film counter for recording the number of exposures reaches the stipulated quantity +1 of the film, no photographing is performed on a frame immediately after the stipulated quantity because the film is rewound automatically when the stipulated quantity is shown, and therefore no information is recorded on the frame immediately after the stipulated quantity. Namely, information without character missing can be recorded on all frames.

In this case, by providing a means to generate signals when the aforesaid film counter shows the stipulated quantity +1, it is possible to inform a photographer that information can not be recorded perfectly on the following frame. Therefore, when a photographer recognizes that signal as an alarm, the photographer discontinues photographing, thus, no information is recorded on the frame immediately after the stipulated quantity. Namely, information without character missing can be recorded on all frames. Incidentally, the photographer can select whether he photographs on the frame immediately after the stipulated quantity or not, because he sometimes wishes to photograph even if the information is imperfect.

Further, under the condition that a means for prewinding a film is provided, when prewinding a film from a cartridge on a take-up shaft, the photographable number is counted, and ordinary photographing is started from the state of prewinding in which images are recorded on a film in the direction from the greater frame number to the smaller frame number. Therefore, photographed films can be protected because they are housed in the cartridge even when a back lid of the camera is opened accidentally. Further, when this prewinding system is employed, all photographed frames can be provided surely with information recorded, which is convenient. Namely, information without character missing can be recorded on all frames.

In a camera with a function to record information wherein characters are recorded by many point emission elements columns in the main scanning direction, when one column composed of plural dots in the main scanning direction is caused to correspond to one character for recording, the character data are compressed to be recorded. Therefore, it is possible to increase greatly an amount of character information to be recorded with the number of dots in one column, although dot columns become indistinct in meaning visually. As a result, it is possible to increase an amount of information which can be recorded in a frame.

In this case, when numerous columns each being composed of plural dots in the main scanning direction are caused to correspond to one character for recording, it is possible to record all character information including complicated characters such as Chinese characters, although the character information become indistinct in meaning visually.

Further, when a record of ordinary marking characters and a record wherein a column composed of plural dots in the main scanning direction is caused to correspond to a character are made to be mixed for recording, it is possible to increase an amount of information to be recorded on a frame, by recording information required urgently in an ordinary recording and recording information which are not required urgently in compression recording.

In addition, when a prescribed symbol for discriminating a recording method is recorded between a record of ordinary marking characters and a record wherein a column composed of plural dots in the main scanning direction is caused to correspond to a character, it is possible to discriminate a boundary between different methods of recording.

A method of printing data on a film will be explained next.

Cameras shown in FIGS. 4 and 11 are of constitution wherein a portion under a line on a data display section is shielded. Therefore, characters in this portion are not affected by a light quantity of photographed images, and can be recognized easily accordingly.

As a method for printing these characters and images on a light-shielded portion, following four methods are considered. The first method is applied on the occasion of one line of characters as shown in FIG. 23 wherein a light-shielding plate that shields a character-printing portion from light for photographing is provided on the side of light for photographing for film F, and LED with necessary number of dots and lens L are used to be constituted so that the LED with necessary number of dots may be caused to emit light, at constant intervals when film F is transported, to be formed on the surface of film F through lens L to be recorded.

Figure 24:
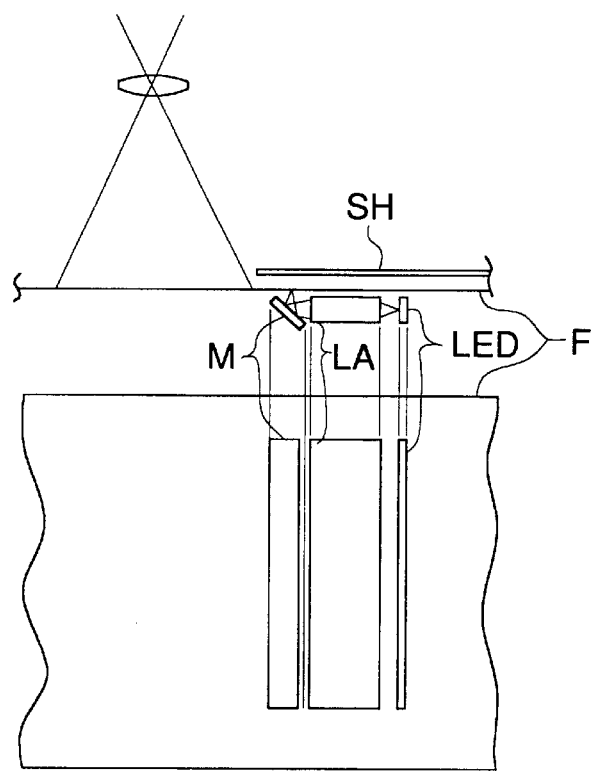
FIG. 24 is another example of a method of photographing with a camera in Example 1-5 based on the invention.

The second method is applied on the occasion of recording data on a large area as shown in FIG. 24 wherein LEDs are provided at necessary intervals to cover the entire width for printing on film F shielded by light-shielding plate SH, to be formed on film F through array LA composed of one or plural lenses and reflection mirror M one line by one line so that they are recorded in the course of film transport.

Figure 23:
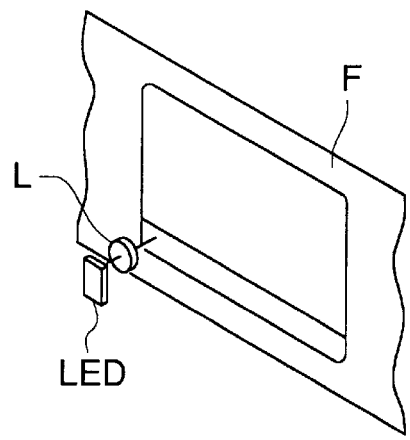
FIG. 23 is an example of a method of photographing with a camera in Example 1-5 based on the invention.
Figure 25:
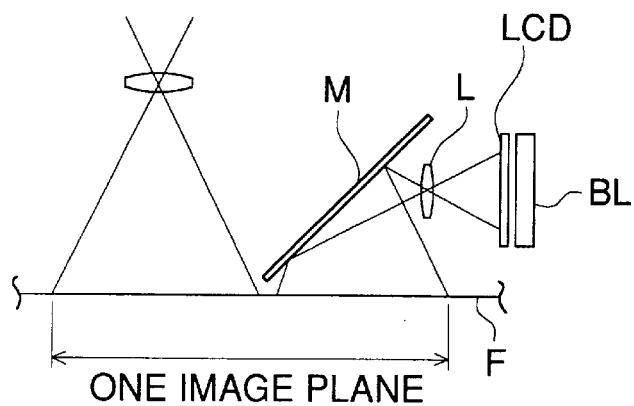
FIG. 25 is still another example of a method of photographing with a camera in Example 1-5 based on the invention.

The third method is applied on the occasion of recording data on a large area similar to that in FIG. 23 as shown in FIG. 25 wherein a necessary image plane for writing is prepared on liquid crystal surface LCD (data image display device 13) to be illuminated by back light BL and thereby to be printed on film F through lens L and reflection mirror M that serves also as a light-shielding member.

Figure 26:
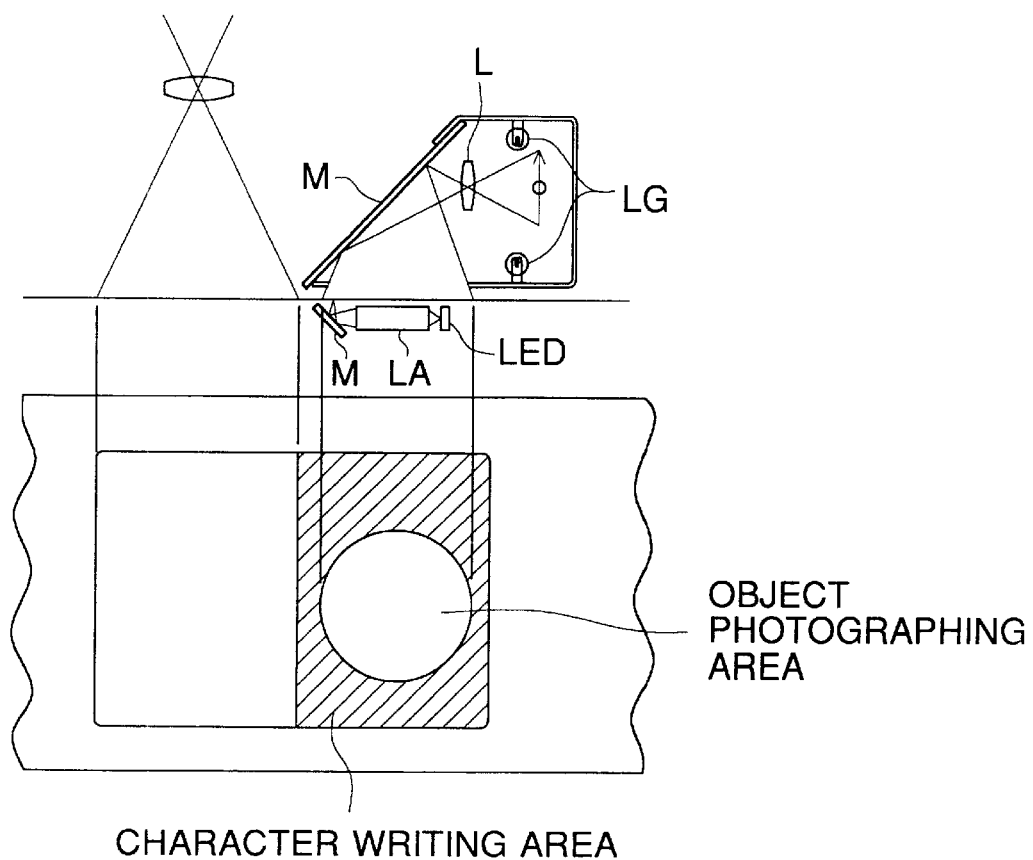
FIG. 26 is still another example of a method of photographing with a camera in Example 1-5 based on the invention.

The fourth method is shown in FIG. 26 wherein it is possible to print the actual item by the use of an optics system composed of illuminating light LG which is different from that for the photographing system, lens L and reflection mirror M serving also as a light-shielding member.

Figure 30:
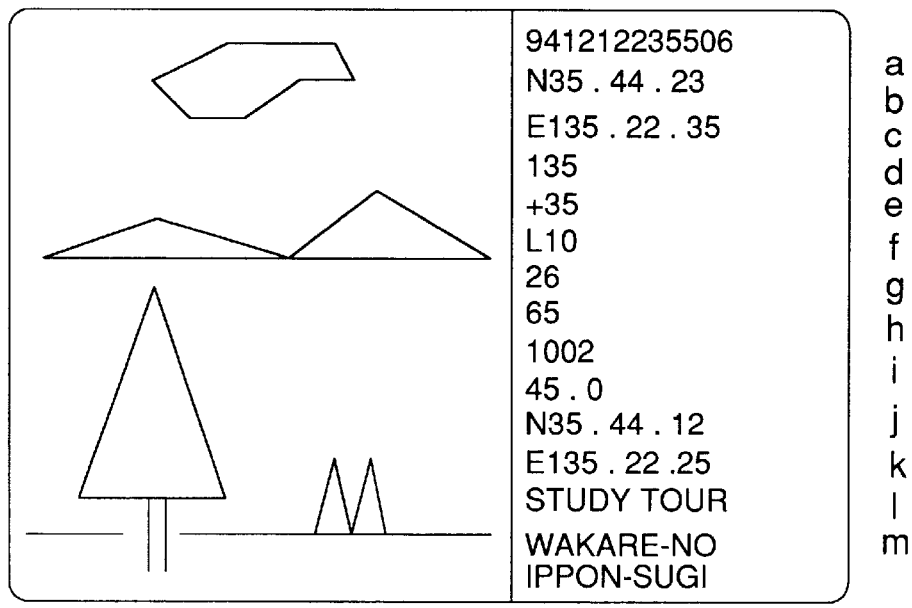
FIG. 30 is a diagram showing an example of a photographed image.

In this case, an image portion is printed simultaneously with photographing, while characters are recorded by LED, lens array LA and reflection mirror M in the course of film transport similarly to that explained in FIG. 30. Thus, it is possible to record also other images on the area where various pieces of information are recorded.

With regard to this light-shielding, it is possible to give the light-shielding capability at a certain level, even if it is not 100%, by changing the design, because recorded characters have only to be read on the image plane.

As stated above, when a camera of the invention is used for photographing, a portion where various pieces of information are recorded is shielded from light from a lens. Therefore, characters and other images recorded on that portion are not affected by light quantity of photographed images, and thereby are recognized easily.

Example 1-6

Figure 27:
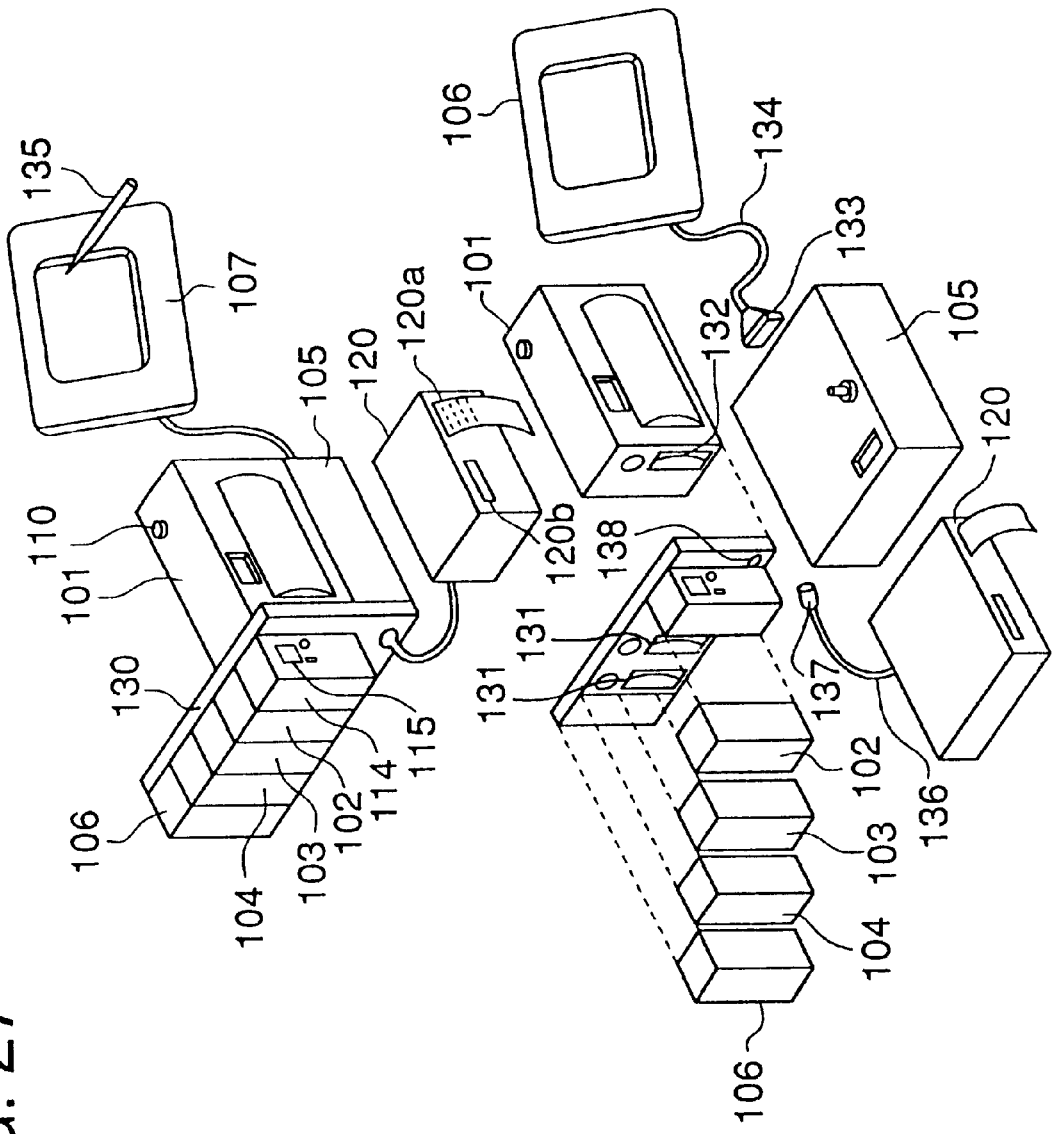
FIG. 27 is a diagram showing an example of a structural appearance of a camera in Example 1-6.
Figure 28:
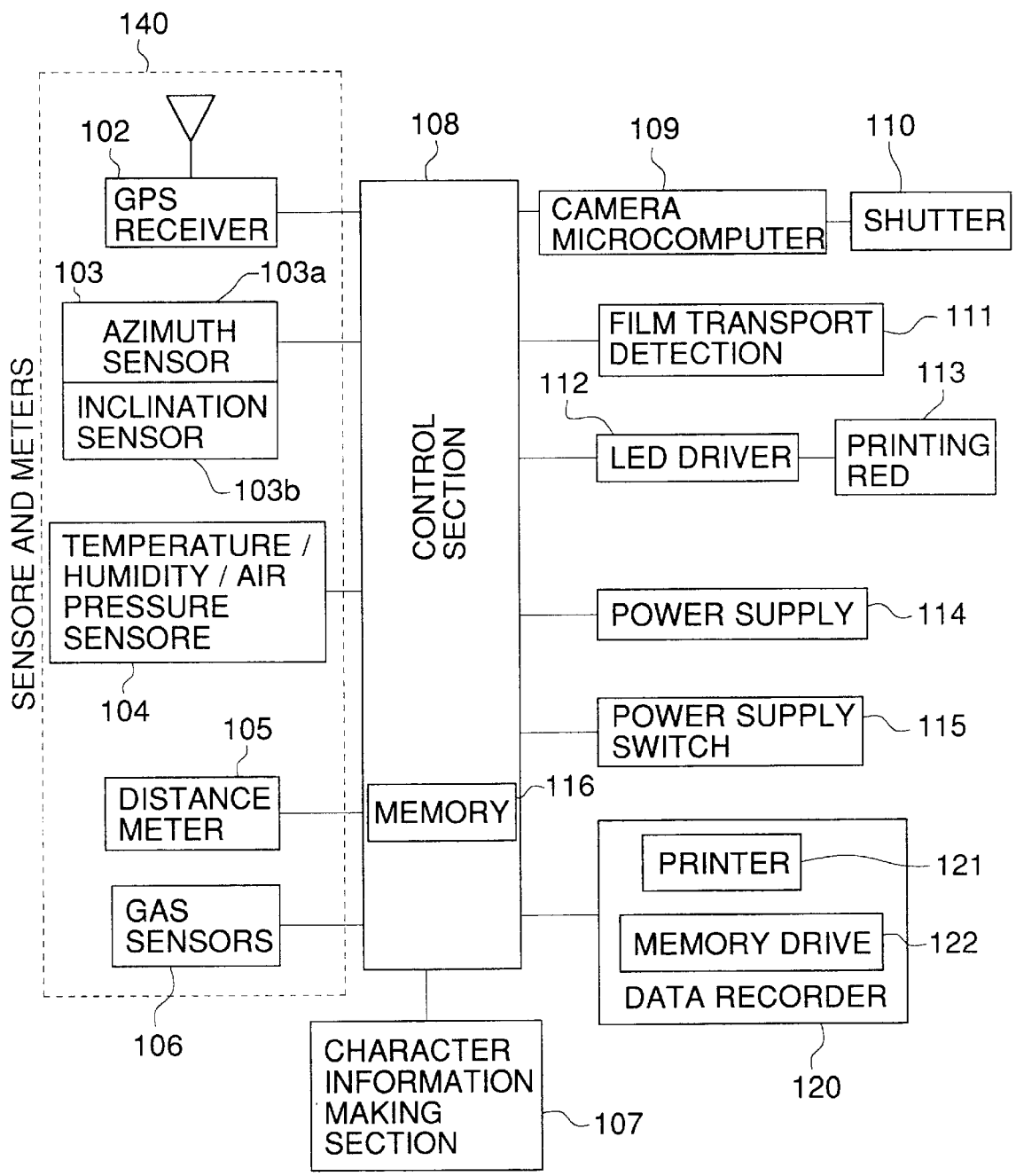
FIG. 28 is a structural block diagram of Example 1-6.

FIG. 27 is a diagram showing an example of a structural appearance of Example 1-6, and FIG. 28 is a structural block diagram of the structure in FIG. 27. In these figures, 101 is a camera main body, 102 is a GPS receiver that detects a position, 103 is an azimuth/inclination sensor that detects azimuth and inclination and it is composed of azimuth sensor 103a detecting azimuth in the form of an angle from the magnetic north and inclination sensor 103b detecting an inclination angle of a camera. The numeral 104 is a temperature/humidity/air pressure sensor that measures a temperature, a humidity and an air pressure at the photographing location. The numeral 105 is a distance meter measuring a distance from a camera to an object, 107 represents gas sensors detecting various gases at a photographing position, and 107 is a character information making section that inputs character information.

The numeral 40 represents sensors and meters including GPS receiver 2, azimuth/inclination sensor 103, temperature/humidity/air pressure sensor 104, distance meter 5 and gas sensor 106. As character information making section 107, it is possible to use various character information inputting apparatuses such as a word processor and/or a personal computer in addition to ones of a type of inputting characters with pen 135 through hand-writing shown in FIG. 27.

Camera main body 101 is arranged to be placed on distance meter 105, and camera main body 101, GPS receiver 102, azimuth/inclination sensor 103, temperature/humidity/air pressure sensor 104, and gas sensors 106 are arranged to be connected with camera main body 101 through connecting section 130. On the connecting section 130, there are provided connectors 131 which are connected to various sensors 102, 103, 104 and 106, while camera main body 101 is also provided with connector 132 through which the camera main body 101 is connected to connecting section 130. On the other hand, character information making section 107 is connected to cable 134 and is further connected with distance meter 105 through connector 133 provided on the tip of the cable 134. Thus, the character information making section 107 is connected with camera main body 101 through distance meter 105. The camera main body 101 connected to the connecting section 130 and various units are affixed on the connecting section 130 with screws (not shown) after connector connection. As stated above, a camera of the invention is of a structure wherein various measuring sensors 103, 104, 105 and 106 or GPS receiver 102 and character information making section 107 can be connected to the camera main body when necessary, and it is of a type of the so-called system camera. Namely, in the structure, only necessary ones among various measuring sensors 103, 104, 105 and 106, GPS receiver 102 and character information making section 107 shown in the figure can be connected to the camera main body (the figure shows the state wherein all units are connected to the camera main body 101).

The numeral 108 is a control section that controls entire operations, 109 is a camera microcomputer that controls operations of a camera and 110 is a shutter. The numeral 111 is a film transport detection section that detects an amount of film advancement when transporting a film loaded in a camera, 112 an LED driver that drives an LED, 113 is a printing LED that prints various information on a frame position of a film while the film is being transported, 114 is power supply that supplies power to a circuit, and 115 is a power supply switch. As power supply 114, a battery, for example, is used. The power supply 114 is connected with the connecting section 130 through a connector in the same manner as in various measuring sensors. The numeral 116 is a memory for storing various information provided in the control section 108.

The numeral 120 is a data recorder that serves as a data recording unit for recording various data and is connected with camera main body 101 through connecting section 130. The data recorder 120 is connected with connector 137 provided on the tip of cable 136 and with connector 138 provided on the connecting section 130. Inside the data recorder 120, there is included memory drive 122 that drives printer 121 and a floppy disc. The symbol 120a represents a print paper ejecting port and 120b represents a floppy disc inserting port. Incidentally, each of the distance meter 105, the data recorder 120 and the character information making section 107 may be connected with the connecting section 130 either through a cord or through the radio system for sending and receiving data. Further, each of the various sensors 102, 103, 104 and 106 may be connected with the connecting section 130 either through a cord or through the radio system for sending and receiving data.

Operations of an apparatus structured in the manner stated above are as follows.

Figure 29:
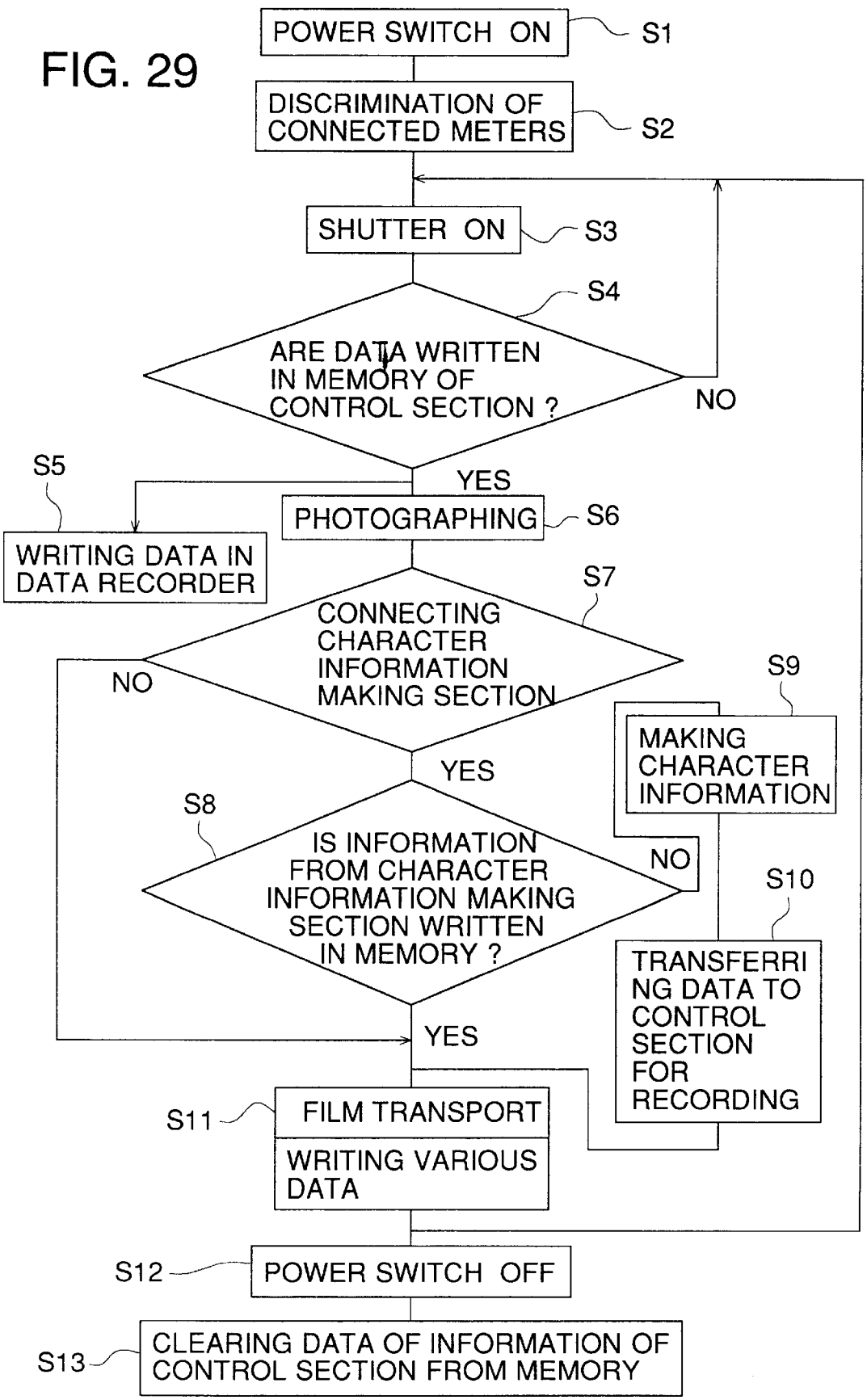
FIG. 29 is a flow chart showing operation procedures of Example 1-6.

FIG. 29 is a flow chart showing operation procedures of an example of the present example. First of all, before photographing, sensors and meters necessary as data (at least one of GPS receiver 102, azimuth/inclination sensor 103, temperature/humidity/air pressure sensor 104, distance meter 105 and gas sensors 106) and/or character information making section 107 are mounted. Then, powers supply switch 115 is turned on (S1). With this power supply that is turned on, power source is supplied to GPS receiver 102 and various measuring sensors so that each operation is started. In this case, various measuring sensors and character information making section 7 connected to a camera are discriminated through ID code (S2). As a discriminating method, following methods, for example, are used.

Various measuring sensors and/or character information making section 107 have sensor discriminating signals (ID code). As an ID code, 4-bit, for example, is used. It is possible to discriminate with 4-bit the measuring sensors in $16 (=2^4)$ types. Signal lines of 4-bit are coded to discriminate various measuring sensors. For example, in the case of FIG. 28, 4 discriminating signal lines are used, and under the assumption that "0000" is a discriminating signal of GPS receiver 102, when control section 108 receives this discriminating signal, it is possible to receive position information by recognizing that signals from a measuring sensor shown with "0000" are latitude/longitude information. Thus, under an arrangement of discriminating signals that "0001" is for azimuth sensor 103a, "0010", is for inclination sensor 103b, "0011" is for temperature/humidity/air pressure sensor 104, "0100" is for distance meter 105, "0101" is for gas sensor 106 and "0110" is for character information making section 107, it is possible for control section 108 to discriminate various sensors and character information making section 107.

Incidentally, since a discrimination ID code is of 4-bit, there still is a room for usable discrimination code, and further sensors can be added. OR, each of the temperature/humidity/air pressure sensor 104 may be provided with 3 pieces of ID codes. Further, when a plurality of gases are detected, various gas sensors 106 may be provided with plural ID codes covering various kinds of gases.

It is so arranged that recording areas for recording each data corresponding to each discrimination can be set by control section 108, and when each information is detected, it is recorded on a prescribed position of memory 116.

Shutter 110 of a camera in the invention is of a type capable of performing 2-step switching operations, and when the shutter is pressed, the state for photographing is confirmed in the first step, and a photographing mode is set in the second step. When the shutter 110 is pressed to cover the first step in the course of photographing (S3), the control section 108 checks whether various measurement data are written on a prescribed position of memory 116 or not (S4). When various data are not written, the control section 108 controls to prevent a camera from moving to photographing operations. This assures that character information is recorded surely on photographed frame images.

The control section 108 controls in the manner that shutter 110 can advance to the second step when these various data are recorded on a prescribed position of memory 116 so that photographing operations (S6) and operations of writing data with trigger signals on data recorder 20 (S5) can be conducted in parallel.

In the course of photographing, an area where various data for a frame and character information are written on is shielded from light. In this case, when the character information making section 107 is connected, two occasions are considered. In one occasion, an object to be photographed is determined for each number of a frame to be exposed, wherein character information to be recorded on each frame is prepared in advance and is stored in memory 116, and when photographing for each frame, that storage portion is read in succession and is recorded on a prescribed position of memory 116. In the other occasion, after photographing, information for that photographed image is prepared by character information making section 107 and that information is needed to be recorded, wherein character information is prepared by character information making section 107 after photographing and is transferred to control section 108 to be recorded in memory 116.

Then the control section 108 checks first with IC code whether the character information making section 107 is connected with a camera main body or not (S7), and when it is connected, the control section 108 checks information from the character information making section 107 is written in memory 116 or not (S8). When the information from the character information making section 107 is not written in memory 116, character information is prepared by character information making section 107 (S9), and then data is transferred to the control section 108 to be written in memory 116 (S10). When the character information making section 107 is not connected in step S7 and when information from the character information making section 107 is written in memory 116 in step S8, the sequence advances to Step S11.

After confirming that various data have been written in memory 116 and character information has been written in memory 116, the control section 108 conducts film transport and writing of various data on each frame (S11). In the case of film transport in this case, an amount of film transport is detected by film transport detection section 111, and printing LED 113 is driven by LED driver 112 at intervals of the amount of film transport set in advance to emit light to write characters on a film.

As a method for detecting an amount of film transport, there is considered a method wherein an encoder is attached to a shaft of a sprocket, and light emitting timing of LED is determined by control section 108 based on the output of the encoder so that driving signals of LED driver 112 may be sent. When writing various information such as characters, in this case, the speed of a film used can be set automatically or manually so that an amount of LED luminescence from LED driver 112 may be adjusted (this part is not shown in the figure, in particular).

In parallel with this photographing, output data of each measuring sensor is recorded on data recorder 120 by trigger signals outputted from control section 108. The control section 108 has recognized character information to be written together with frame images, and various character information (including measurement data) which are not written together with frame images are read from memory 116 to be recorded by data recorder 120. As a recording system of the data recorder 120, there is employed a method wherein character information is printed out by printer 121, or a method to write with memory drive 122 in a floppy disc, a hard disc or a photoelectro-magnetic disc.

When photographing is continued, the operations mentioned above are repeated, and when photographing is terminated, power supply switch 115 is turned off (S12). In this case, all data written in memory 116 of control section 108 are cleared (S13).

In the invention, since it is possible to install measuring sensors for measuring necessary physical information on camera main body 101 when necessary, it is not necessary to install unnecessary functions and carry them. Since a part of these measuring functions can be recorded together with image information, and remaining information can be recorded on a data recording device provided separately, information especially necessary only can be written on frame images and other information can be recorded on a separate data recording device. Therefore, it is convenient because necessary information can be recorded separately even when a broad area on frame images to be written on is not prepared. In this case, it is necessary to confirm the correspondence between frame images and various information recorded on data recorder 120. Therefore, when writing the contents of memory 116 in the aforesaid step S5 with a parameter of a frame number, for example, this frame number is also recorded simultaneously. Owing to this, it is possible to make frame images photographed by camera main body 101 and various data and character information for the frame images to correspond each other. Incidentally, a parameter used for the correspondence between the frame images and data recorded on data recorder 120 is not limited to the frame number, and other parameter, such as photographing time may also be used.

In the explanation above, an occasion to write data on data recorder 120 in parallel with photographing was explained. The invention, however, is not limited to this. When a shutter signal in photographing is used as trigger signal, it is not necessary to make a special trigger signal, which is convenient.

FIG. 4 is a diagram showing an example of a photographed image. A frame image of the invention is composed of an image recording portion and a character recording portion as shown in the figure. Images are indicated on the left-hand side and data are indicated on the right-hand side. It is arranged so that a portion on the right of the figure partitioned by the line at left of a character recording portion on the figure is shielded from light in the course of photographing (images are formed on only an image recording area). A symbol "a" on the recorded data represents a year, a month, a day, an hour and a minute, "b" is latitude, "c" is longitude, "d" is azimuth of a camera indicated with an angle from the magnetic north, "e" is an elevation angle of a camera, "f" is a rotation angle of a camera around a lens axis (L is left-hand rotation and R is right-hand rotation), "g" is temperature, "h" is humidity, "i" is air pressure, "j" is a distance to an object to be photographed, "k" is latitude of an object, "l" is longitude of an object, and "m" is other character information from character information making section 107. In this figure, an image portion and a character portion are separated in the direction of film transport. However, they can be arranged vertically or even can be recorded on two steps.

As a method for printing data on a character recording portion, there is used a method wherein light-emitting portions of printing LED 113 are provided at necessary intervals to cover entire width for printing, for example, and one or plural lenses are used to record one line by one line in the course of film transport. As another method, it is also possible to use one wherein an image plane that needs to be written is prepared on a liquid crystal image plane, for example, which is illuminated to be photographed on a film.

Figure 31:
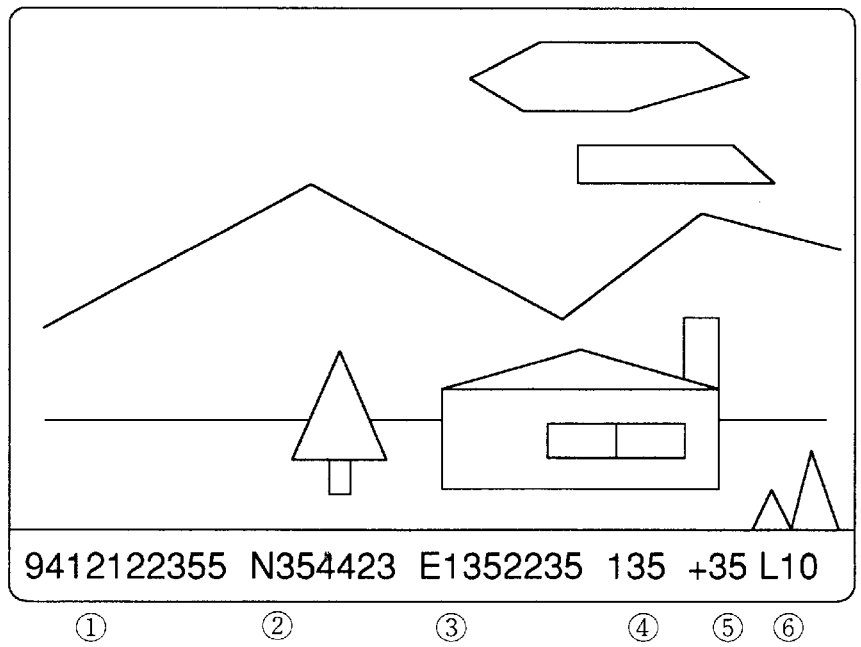
FIG. 31 is a diagram showing another example of a photographed image.

Incidentally, though an example shown in FIG. 30 is one wherein much data and character information are recorded on a character recording portion, it is considered that so much information do not need to be written on an image frame. For example; as shown in FIG. 31, images are shown on the upper portion of a frame and data are shown on the lower portion wherein ① represents a year, a month, a day, an hour and a minute, ② is latitude, ③ is longitude, ④ is azimuth of a camera indicated with an angle from the magnetic north, ⑥ is an elevation angle of a camera (L represents left-handed rotation and R represents right-handed rotation). Remaining data and character information may be recorded in data recorder 120 provided separately.

Figure 32:
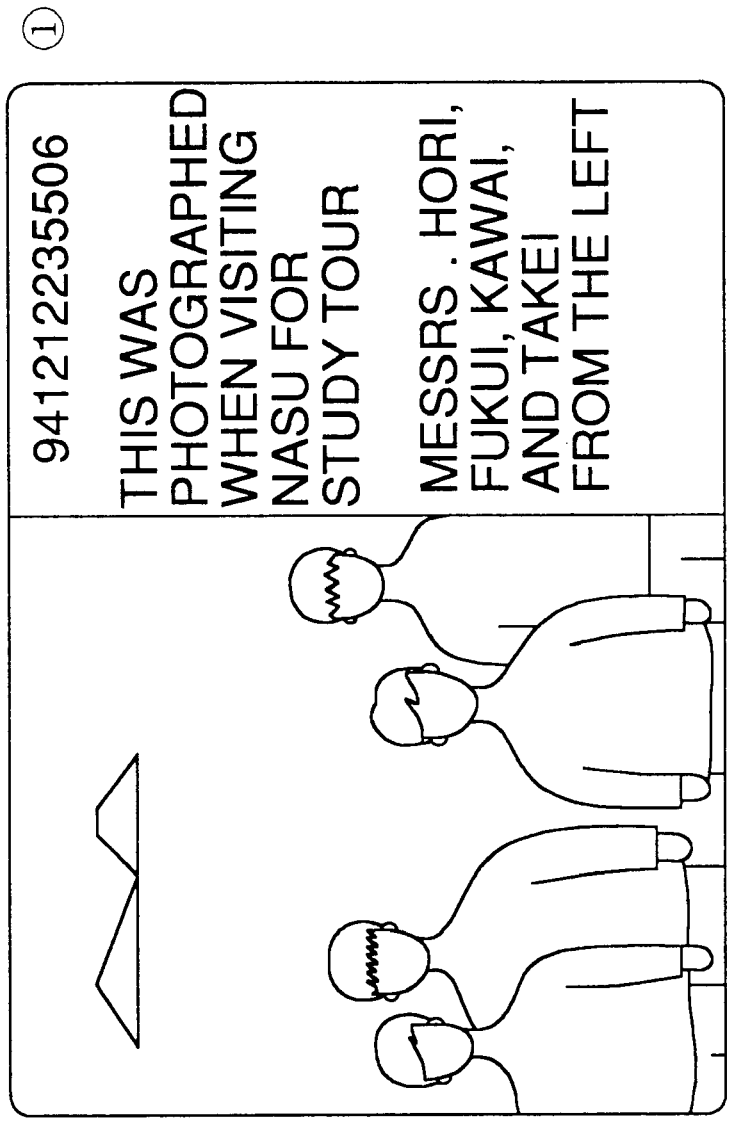
FIG. 32 is a diagram showing still another example of a photographed image.

FIG. 32 is a diagram showing another example of photographed images, and it shows photographed images made under the condition that character information making section 107 only is connected with camera main body 101. On a character recording portion, all portions other than those at photographing time in memory 116 are open to information from the character information making section 107. Owing to this, much character information can be recorded. Namely, with regard to the character information recording portion, a recording range under the condition of discrimination signal of "0110" is secured in control section 108. When discrimination information of other sensors are recognized, the recording system is changed to that shown in FIG. 30 and a range where character information can be recorded is restricted.

In the example described above, GPS receiver 102, azimuth/inclination sensor 103, temperature/humidity/air pressure sensors 104, distance meter 105 and gas sensor 106 are used as sensors to be connected with a camera main body. The invention, however, is not limited to these sensors, and other sensors, for example, those representing measurement of wind direction by means of an anemoscope, measurement of wind speed by means of an anemometer, measurement of insolation by means of an actinometer, measurement of sunshine by means of a heliograph, measurement of water temperature by means of a water temperature gauge, and measurement of earth temperature by means of an earth temperature meter, or sensors for measuring noise data, air pollution data and water quality data can be used, provided that they can measure other various physical amounts showing ambient conditions of the photographing location.

Figure 33:
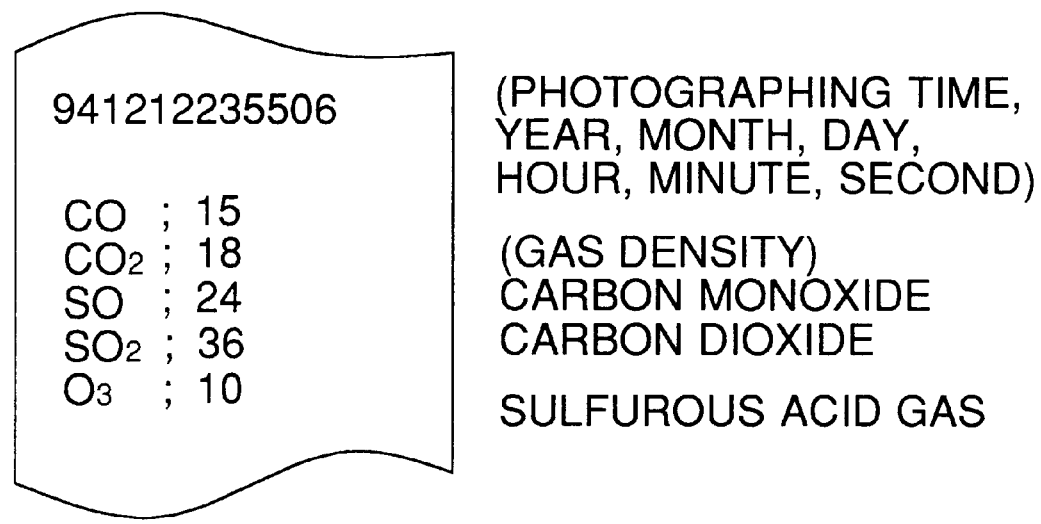
FIG. 33 is a diagram showing an example of output of data recorded in a data recorder generated from a printer.

FIG. 33 is a diagram showing an example wherein data recorded on data recorder 120 are outputted by printer 121. In this output example, the photographing time is used as photographed frame discrimination information (ID). Further, other data not recorded on photographed images shown in FIG. 4, namely, carbon monoxide, carbon dioxide, sulfurous acid gas and ozone are printed out.

In the aforementioned example, an example wherein data recording units 110 are connected to a camera main body to be used has been explained. However, the invention is not limited to this, and it is also acceptable that data recorders 120 as recording units mentioned above are provided separately from a camera main body, and a second measuring section for measuring at least one physical information is provided separately from a camera main body, and further, there is provided a means for recording measurement data of the second measuring section in the aforementioned data recording unit through trigger signals from control section 108 provided on the camera main body. In this case, data recording units do not need to be mounted on a camera main body through cables. Therefore, it is possible to make the portion on the camera main body to be compact in size, and yet various pieces of information can be recorded. In addition, easiness in carrying a camera can be improved.

In this case, if signals related to photographing caused by shutter operations on a part of the camera can be used, it is not necessary to prepare special trigger signals.

Figure 34:
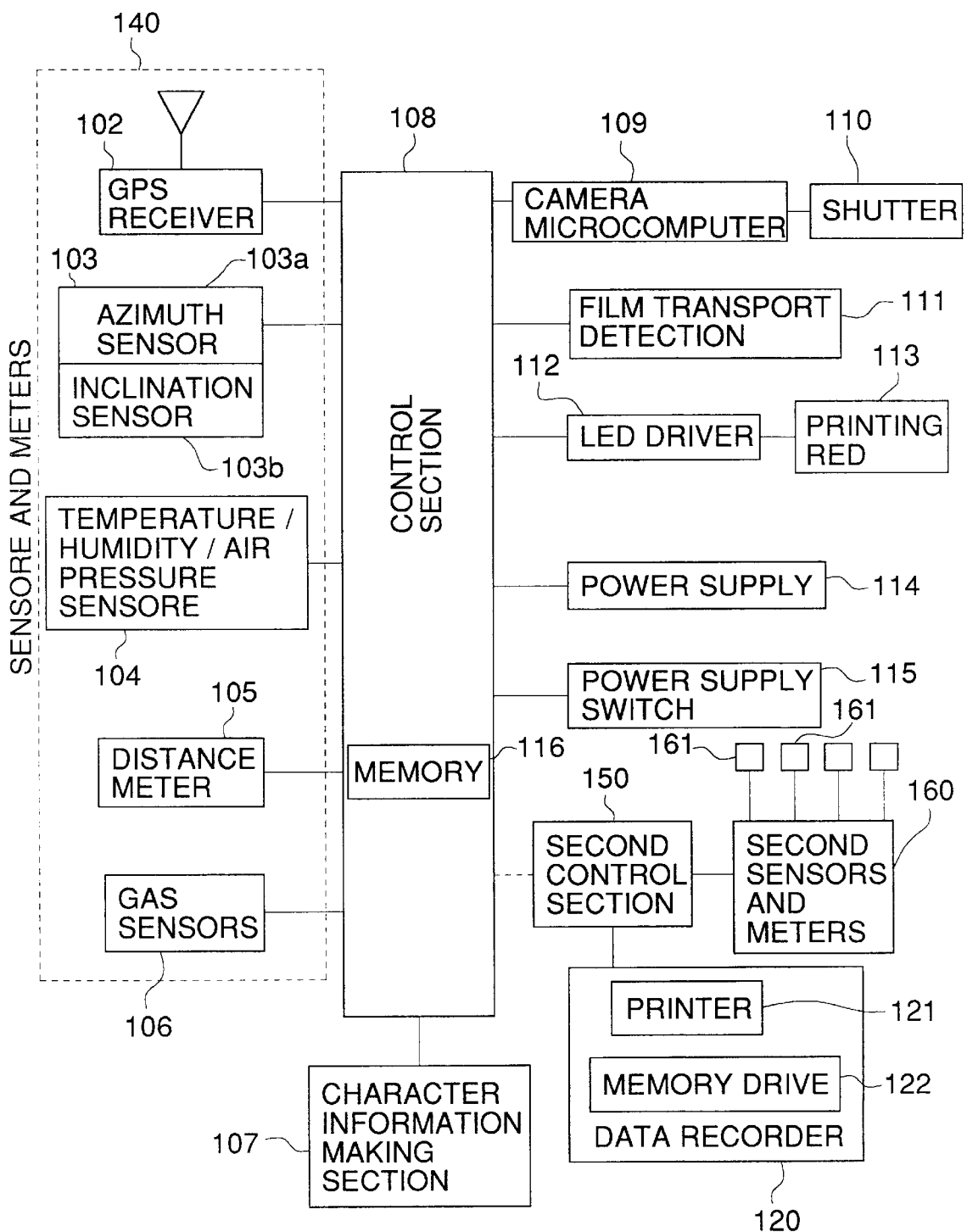
FIG. 34 is a structural block diagram showing an example of a variation of Example 1-6.

FIG. 34 is a structural block diagram showing a variation of Example 1-6. Items in FIG. 34 which are the same as those in FIG. 28 are given the same symbols. In this example, a second measuring section is provided separately from camera main body 101, and various physical information in ambient conditions for photographing are measured by the second measuring section 160 provided separately, so that various information are recorded on data recorder 120 concurrently with photographing.

In the figure, the numeral 160 represents a second measuring section provided separately from a camera main body. To the second measuring section 160, there are connected plural sensors 161 in various kinds. Physical information to be measured by these various sensors relates to at least one of measurement of wind direction by means of an anemoscope, measurement of wind speed by means of an anemometer, measurement of insolation by means of an actinometer, measurement of sunshine by means of a heliograph, measurement of water temperature by means of a water temperature gauge, measurement of earth temperature by means of an earth temperature meter, measurement of noise by means of a noise meter, measurement of air pollution by means of an air pollution meter and measurement of water quality by means of a water quality meter.

The numeral 150 represents a second control section that is connected to the measuring section 160 and controls data collection and writing of the collected data on a data recording unit. The numeral 120 is a data recorder connected to the second control section 150 as a data recording unit, and it includes therein printer 121 and memory drive 122, for example. The printer 121 prints measurement data on a recording sheet, and the memory drive 122 writes measurement data on a floppy disc, a hard disc or a photo-electromagnetic disc. When the data recorder 120 is moved to the second measuring section 160, the structure on a part of the camera main body 101 can be simple and it can be made compact, resulting in easiness in carrying of a camera.

Figure 35:
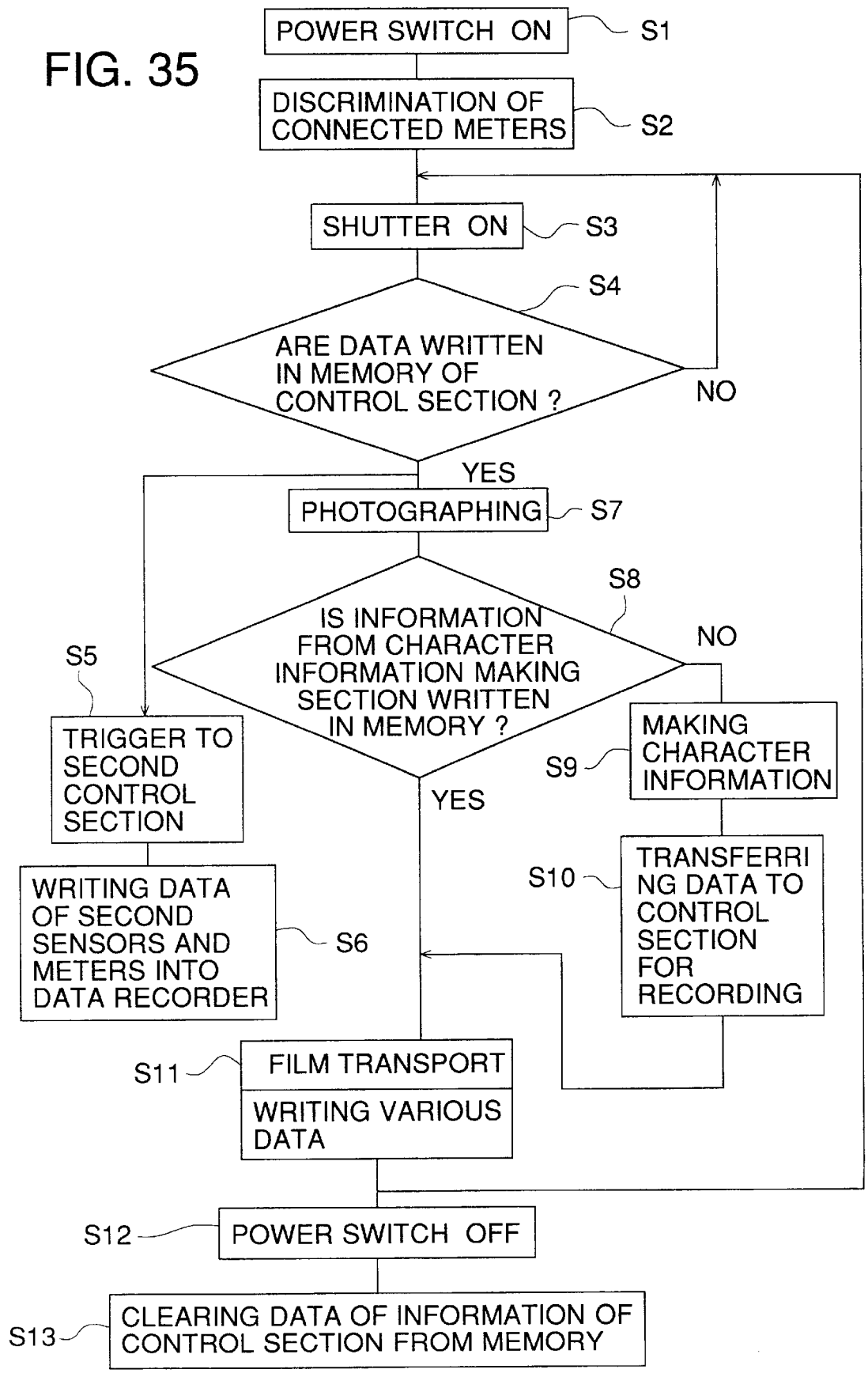
FIG. 35 is a flow chart showing operation procedures of an example of a variation of Example 1-6.

Operations of the apparatus structured in the aforesaid manner will be explained as follows, referring to a flow chart shown in FIG. 35. Procedures from step S1 to step S4 are the same as those shown in FIG. 29. When various data are written in memory 116 of control section 108, trigger signals and photographed frame discrimination numbers are sent to the second control section 150 through the radio system (S5), concurrently with photographing (S7). The second control section 150 measures physical information as those mentioned above through operations which are independent of a portion at a camera main body, using various sensors 161. Measured physical information enters the second control section 150 and is stored in an internal storage section.

Upon receiving trigger signals, the second control section 150 writes in data recorder 120 the measured data which are the aforesaid various physical information measured by various sensors 161 and stored in the internal storage section, together with frame discrimination numbers (S6). Due to this, frame images photographed on a part of the camera main body and data written in the data recorder 122 can be corresponded each other through frame discrimination numbers. In place of the frame discrimination numbers, photographing time can be used as stated above. Incidentally, in this case, if GPS position data, azimuth data and inclination data all measured on a part of a camera main body are sent in addition to the aforesaid frame discrimination numbers, when sending trigger signals from first control section 108 to the second control section 150 through the radio system, all data in photographing environment can be recorded in the data recorder 120.

The sequence from step S7 to step S13 on a part of the camera main body is the same as that from step S6 to step S12 in FIG. 29. Therefore, its explanation is omitted here. In this manner, the second invention makes it possible to measure more diversified data in photographing environment with the second measuring section provided separately from the part of a camera main body.

Explanation has been made above concerning the occasion wherein trigger signals are sent to the second measuring section 160 concurrently with photographing. The invention, however, is not limited to this. When shutter signals in photographing are used as the trigger signal, special trigger signals do not need to be prepared, which is convenient.

In the invention, as stated above, it is possible to photograph by connecting a camera with only sensors for measuring data among those of photographing conditions and environmental conditions for photographing. Therefore, it is possible to avoid that a total camera size is made large by providing all sensors considered on a camera, and unnecessary functions are always carried. In addition, no matter how much information need to be recorded, most important character information and photographed frame discrimination information only are recorded on a part of a camera, and remaining information are recorded on a data recording unit together with photographed frame discrimination information. Therefore, it is possible to increase, as much as possible, information required to be recorded in relation to images.

Owing to that the sensor connected to a camera is discriminated on a part of the camera and a place where each data is to be recorded is established in advance, it is possible to identify the sensor for the data recorded at a place on a film. Therefore, it is not necessary to write a discrimination symbol (for example, a unit) for that data.

As stated in detail above, in the invention, a measuring section and/or a character information making section for measuring at least one physical information can be connected to and disconnected from a camera main body, and only a part of various information related to photographing is written on frame images, causing remaining information to be recorded on a data recording unit provided separately. Therefore, it is possible to add necessary measurement functions at need to record information, and to record a part of these measurement functions together with image information, causing remaining information to be recorded on the data recording unit provided separately.

In this case, the sensors and meters and/or character information making section are caused to have their own ID codes so that the connected sensors and meters and character information making section-may be discriminated on the camera side, and further, a storage section for recording information and character information measured in advance is provided. Thereby, various measured data can be discriminated and these measured information and character information can be preserved.

Further, when the aforementioned measuring section is provided with at least one of measurement functions including measurement of position, altitude and time by means of GPS receiver, measurement of azimuth, an elevation angle and a rotation angle around the center of a lens by means of an angle sensor, measurement of temperature by means of a temperature sensor, measurement of humidity by means of a humidity sensor, measurement of air pressure by means of an air pressure sensor and measurement of concentration of at least one kind of gas, and when the character information making section is provided with functions of a word processor and/or a personal computer, various kinds of measurement can be made possible and character information can be recorded.

When all storage sections except that for time are made to be capable of recording character data from the character information making section in the case that only the character information making section is connected, it is possible to record a large quantity of character information.

Further, if there is provided a means for recording on the aforesaid data recording unit the information same as photographed frame discrimination information recorded on the part of a camera together with other information, it is possible to make frame images recorded on a camera to correspond to various information to be recorded on the part of the data recording unit, which is convenient.

In addition, when the aforesaid data recording unit is provided separately from a camera main body, the second measuring section for measuring at least one of physical information is provided separately from a camera main body, and a means for recording measurement data of the second measuring section on the aforesaid data recording unit by means of trigger signals from a control section provided on a camera main body is provided, it is possible to make the part of a camera main body to be compact and various information can be recorded.

When the aforementioned trigger signals are those related to photographing caused by shutter operations on the part of a camera, it is not necessary to prepare trigger signals, in particular, which is convenient.

In the invention, by providing the second measuring section for measuring various physical information separately from a camera main body so that measurement data of the second measuring section may be recorded on the data recording unit, being interlocked with photographing operations of a camera, it is possible to obtain more various data related to photographing. Since it is not necessary to connect the second measuring section with the part of a camera, it is possible to make the camera main body to be compact and in a shape that is convenient for carrying.

As stated above, owing to the invention, it is possible to provide a camera with an information recording function wherein it is possible to record information and to record a part of the measuring function together with image information by adding necessary measuring function at need, and to record remaining information on a data recording unit provided separately.

Example 2-1

Figure 36:
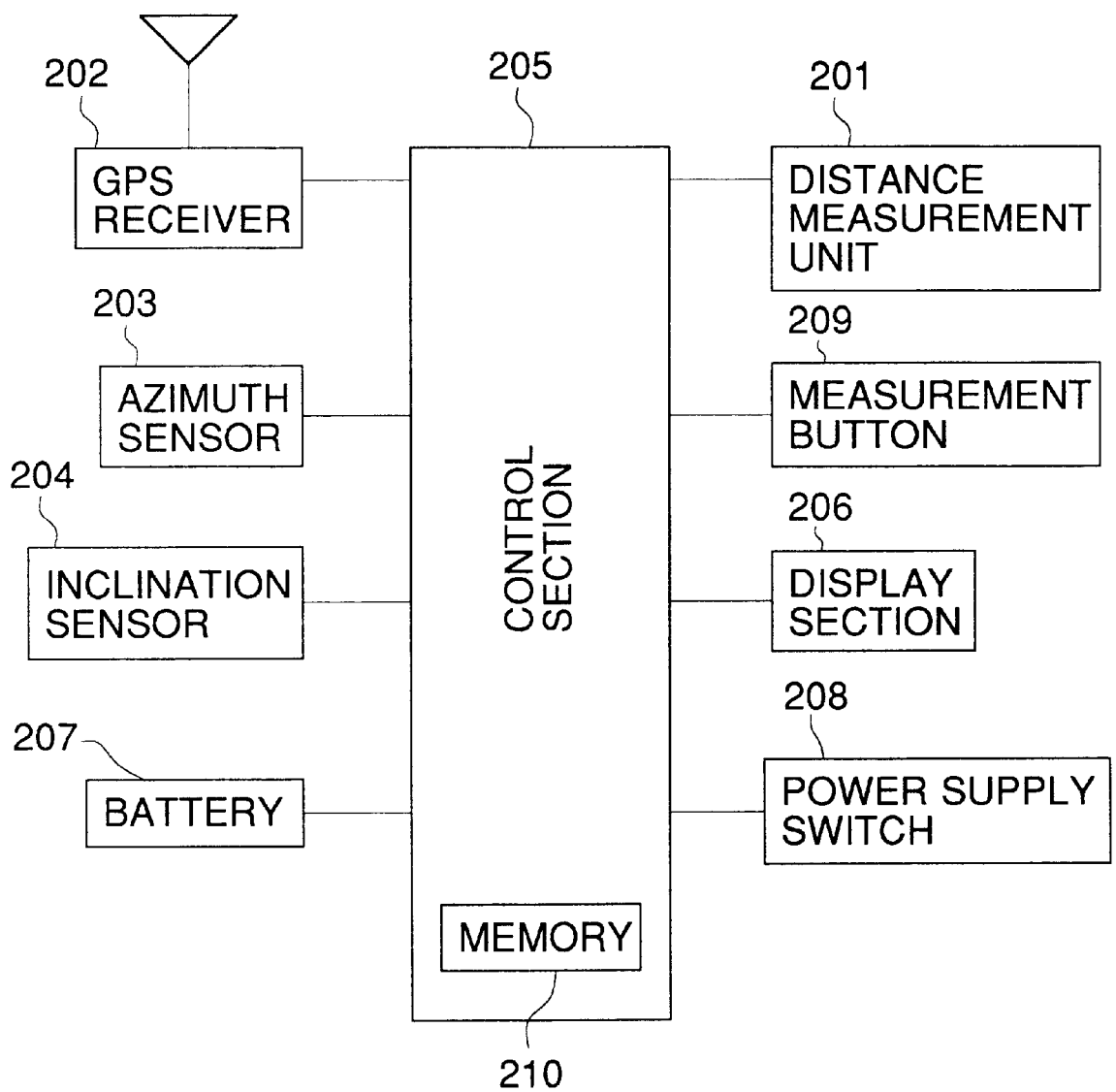
FIG. 36 is a structural block diagram showing Example 2-1.
Figure 37:
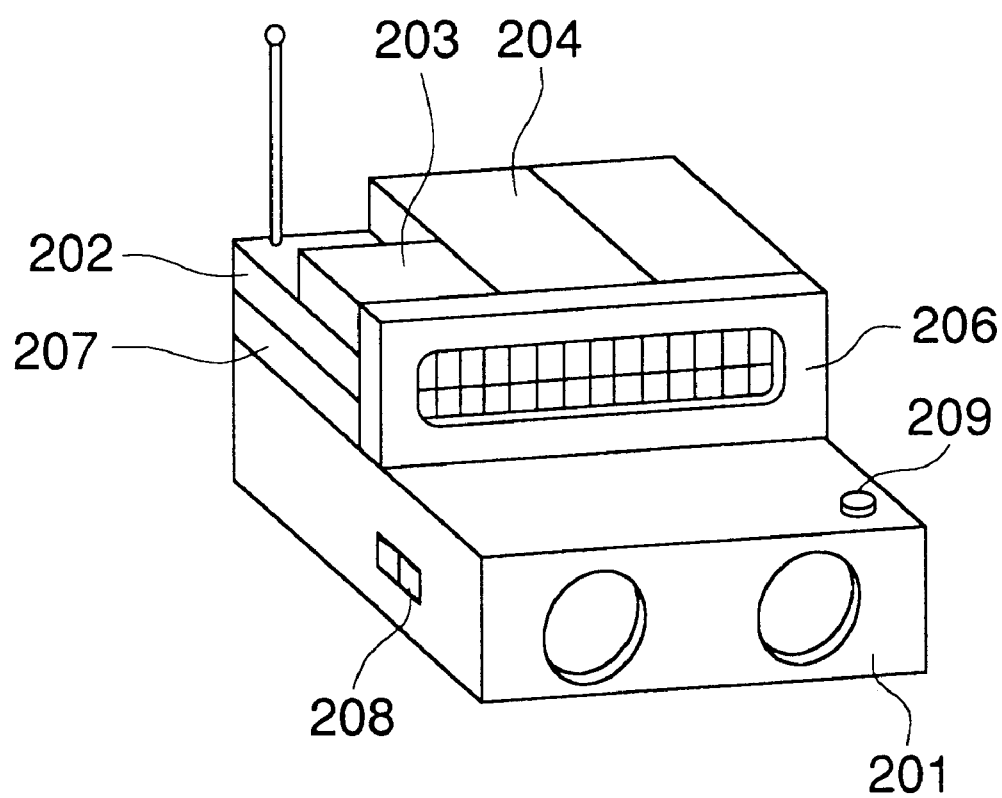
FIG. 37 is a diagram showing an example of a structural appearance of Example 2-1 of the invention.

FIG. 36 is a structural block diagram showing Example 2-1 for attaining the second object for specifying the position of an object, and FIG. 37 is a diagram showing an example of structural appearance. In the figure, the numeral 201 is a distance measuring section for measuring the distance from a measuring point to an object, the numeral 202 is a GPS receiver that detects the position of the measuring point, 203 is an azimuth sensor which detects an azimuth of a measuring instrument with an angle from magnetic north when the measuring instrument is directed to the object, and 204 is an inclination sensor which detects an elevation angle of a measuring instrument when it is directed to the object.

The numeral 205 is a control section having operating functions for controlling operations of an entire apparatus, 206 is a display section displaying various information, 207 is a battery actuating an apparatus, 208 is a power supply switch, 209 is a measurement button instructing the start of measurement, and 10 is a memory for storing various information provided in control section 205. Operations of the apparatus thus structured will be explained as follows.

Figure 38:
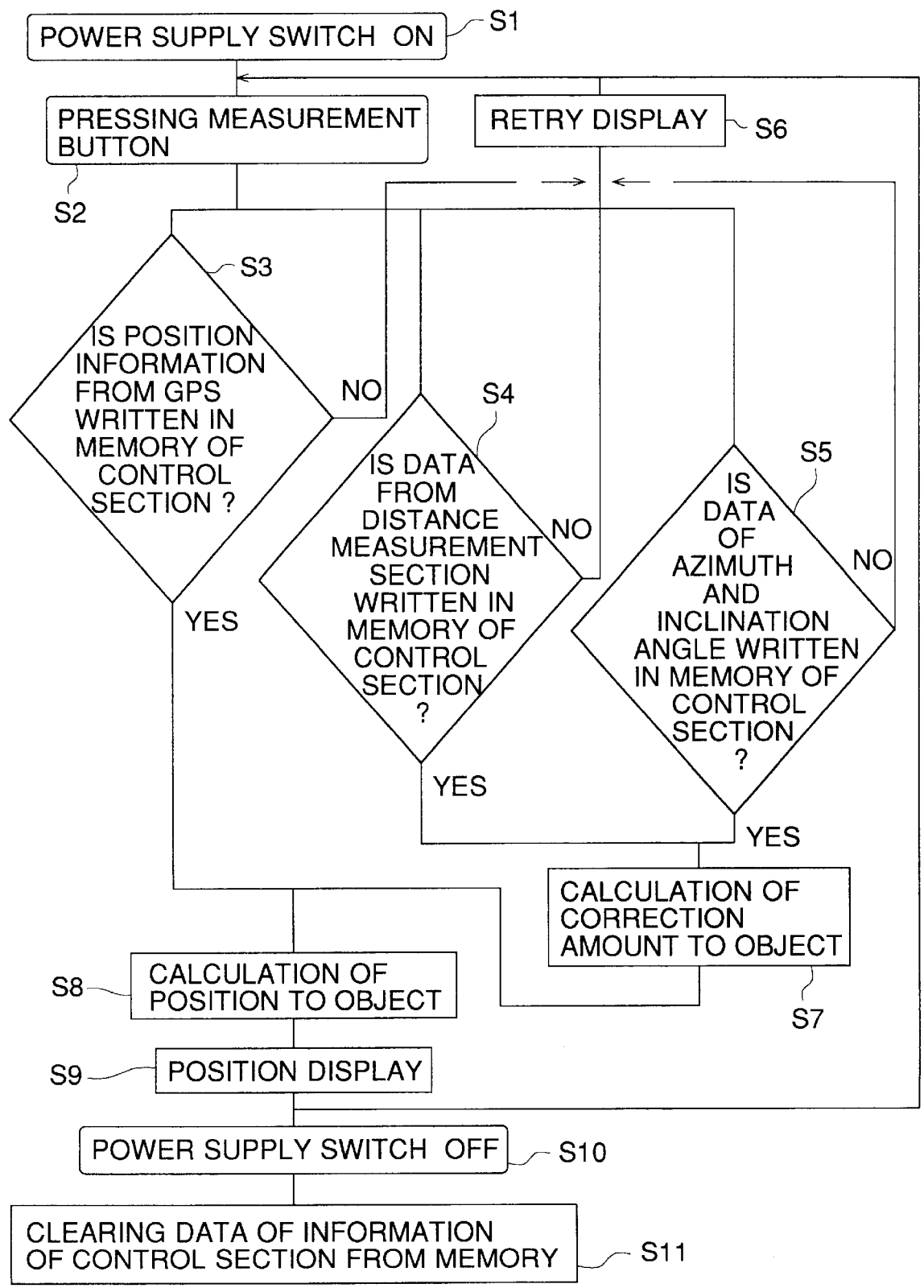
FIG. 38 is a flow chart showing operation procedures of Example 2-1 of the invention.

FIG. 38 is a flow chart showing operation procedures. When power supply switch 8 is pressed (S1) first, there is supplied power source to distance measuring section 201, GPS receiver 202, azimuth sensor 203, inclination sensor 204 and display section 206 so that each operation may be started. When measurement button 209 is pressed (S2) next, the apparatus starts its operations and the distance measuring section 201, a GPS receiver that detects the position of the measuring point, 203 is an azimuth sensor which detects an azimuth of a measuring instrument with an angle from magnetic north when the measuring instrument is directed to the object, and 204 is an inclination sensor which detects an elevation angle of a measuring instrument when it is directed to the object.

When measuring the distance to an object, a device shown in FIG. 37 is held by both hands just like an opera glass is held, so that an object is caught in a visual field. As a principle of measuring the distance, there is used a method wherein a laser range finder is used and a laser beam is emitted from distance measuring section 201 to an object and a period of time required for the beam to return to the distance measuring section 201 after being reflected on the object is measured to obtain the distance. Under the condition that power supply is turned ON, the distance is always ready to be measured, and when the object is viewed through the range finder in the same manner as in an opera glass and measurement button is pressed while overlapping the center of a cross in a visual field on the object, the distance is measured. The results of the measurement are written in memory 10.

Figure 39:
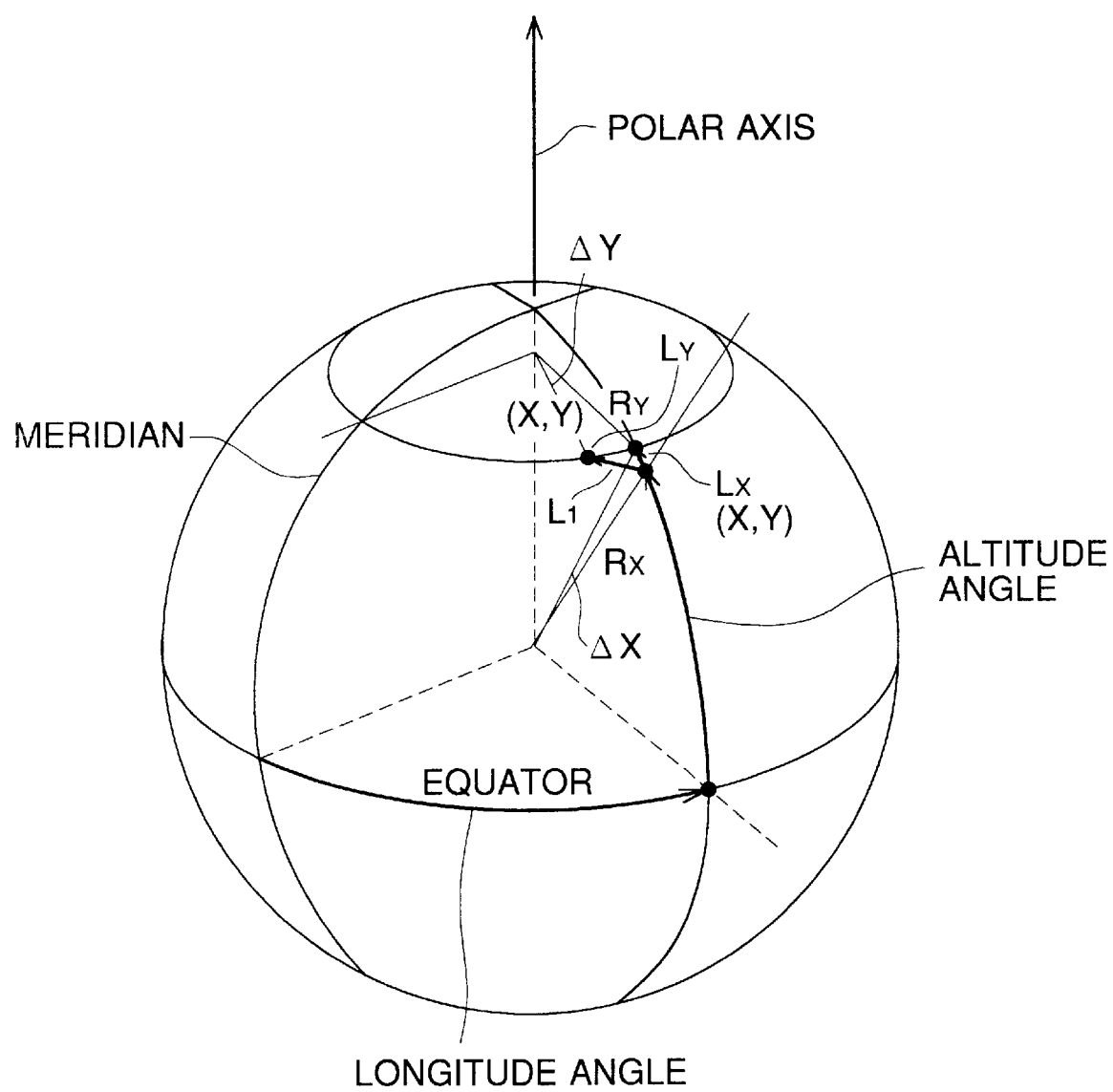
FIG. 39 is an illustration of a method for calculating an objective position.

FIG. 39 is an illustration of a method for calculating the position of an object. Symbols shown in the expressions are the same as those shown in FIG. 39. When L represents the distance to an object, $\theta$ represents azimuth (angle from the magnetic north) and d represents elevation angle of an apparatus, the position of the object (longitude x, latitude y) is obtained from position data (latitude X, longitude Y) from GPS.

Horizontal distance to an object: L1=L×cos $\alpha$
Latitude component of distance: $L_x$=L1×cos $\theta$
Longitude component of distance: $L_y$=L1×sin $\theta$
Radius of the earth on latitude X: $R_x$ Change of latitude $L_x$: $\Delta X=(L_x/R_x)\times(360/?)$ (1)

Radius in latitude direction at latitude X+$\Delta$X: $R_y=R_x\times\cos$ (X+$\Delta$)

Change of latitude $L_y$: $\Delta Y=(L_y/R_y)\times(360/?)$ (2)

From expressions (1) and (2), amount of correction $\Delta$X and $\Delta$Y up to the object can be obtained. After the amount of correction $\Delta$X and $\Delta$Y up to the object are obtained by expressions (1) and (2), control section 5 obtains the position (latitude x, longitude y) of the object through the following expression.

Object position $(x, y)=(X+\Delta X, Y+\Delta Y)$ (3)

Though the above-mentioned position measuring method is not so good on the point of accuracy, it is necessary to take into consideration a radius of the earth depending on required accuracy. The results of calculation of expression (3) are written in memory 210.

Control section 205 checks whether position information from GPS has been written in memory 210 or not (S3). When the position information has not been written, the control section 205 makes display section 206 to perform the display of retry (S6) to urge another measurement. In addition, the control section 205 checks whether data of the distance up to an object measured by distance measuring section 201 have been written in memory 210 or not (S4). When the distance data are not written in, the control section 205 makes display section 206 to perform the display of retry (S6) to urge another measurement. Further, the control section 105 checks whether data of azimuth and inclination angle have been written in memory 210 or not (S5). When the data of azimuth and inclination angle have been written in, the control section 205 makes display section 206 to perform the display of retry (S6) to urge another measurement. All of them mentioned above are for recording each information without fail.

When all of the measurement results mentioned above have been written in memory 210, the control section 205 obtains, based on these data of the measurement results, the correction values $\Delta$X and $\Delta$Y up to the object, through calculation (S7). The expressions for the calculation are those shown with (1) and (2) above. After determination of the correction values, the control section 205 calculates the position of the object, using expression (3) (S8), and displays the obtained position information on the display section 206 (S9).

When continuing the measurement, the aforesaid operations are repeated, and when completing the measurement, power supply switch 208 is turned off (S10). In this case, all data written in memory 210 in the control section 205 are cleared (S11). If the data need to be stored as data, it is necessary to consider that a non-volatile memory is provided inside or that the data are recorded in an IC card or a floppy disk. Or, it is also possible to cope with this matter by connecting a printer at need for outputting characters.

In the example mentioned above, a laser length measuring machine of a light wave type is used in distance measuring section 201. The invention, however, is not limited to this example, and it is possible to employ a distance measuring instrument of an active type or of a passive type.

Figure 40:
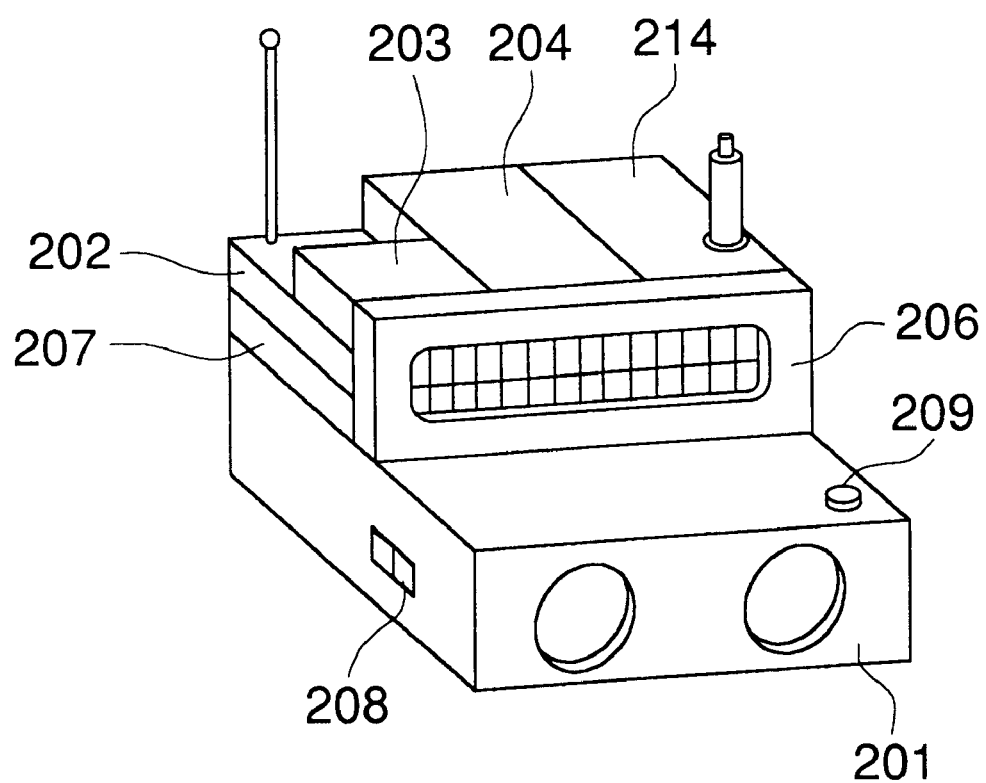
FIG. 40 is a diagram showing an example of a structural appearance of other example of the invention of Example 2-1.

FIG. 40 is a diagram showing an example of structural appearance of a variation of Example 2-1. Items in FIG. 40 which are the same as those in FIG. 37 are given the same symbols. In this example, second GPS receiver 214 is provided, and data from the first GPS receiver 202 are corrected by data received by the second GPS receiver 214 so that the position of higher accuracy can be specified. In terms of circuit diagrams, the second GPS receiver 214 is added to the circuit shown in FIG. 1 (circuit diagrams are not illustrated).

Figure 41:
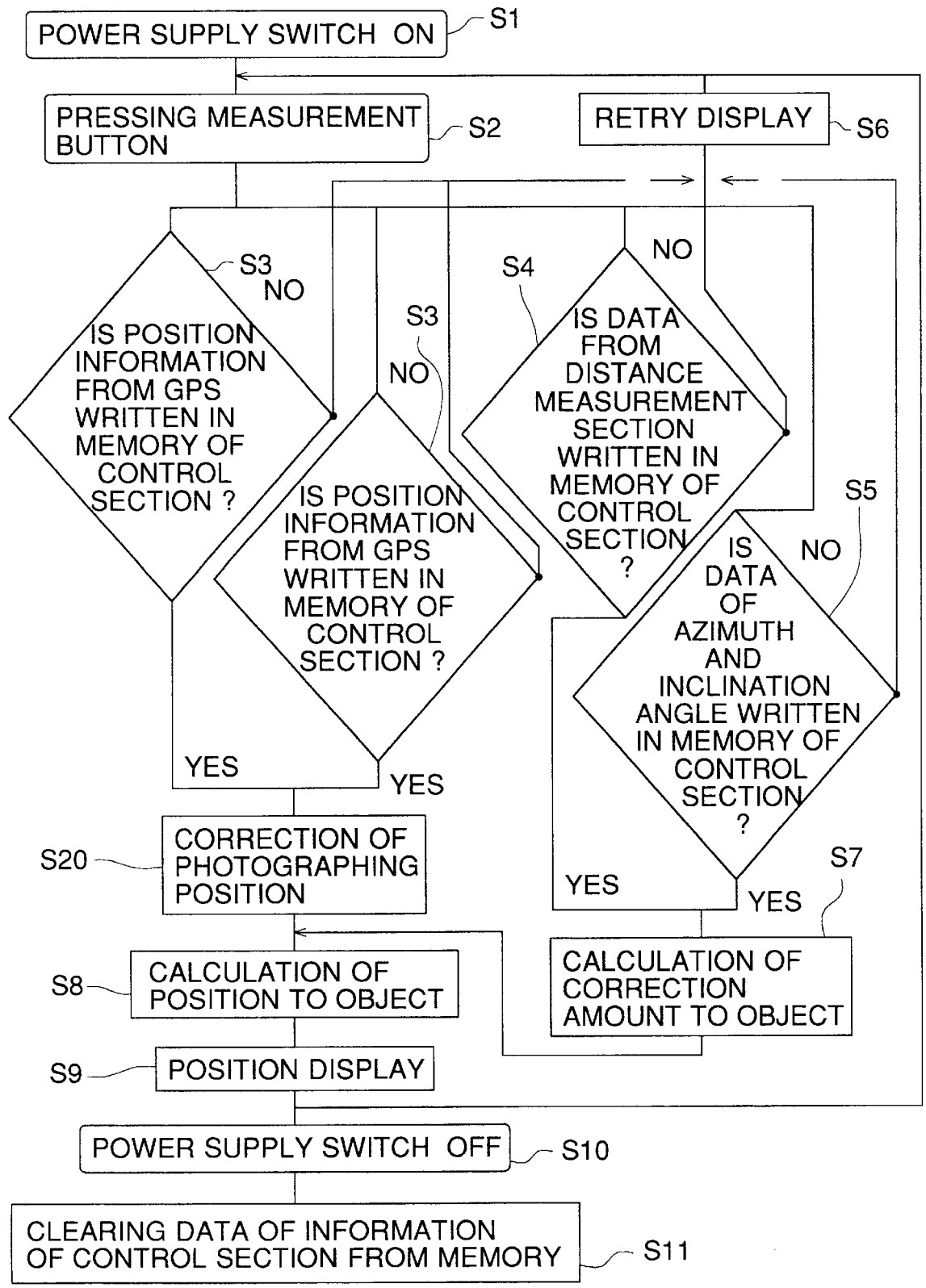
FIG. 41 is a flow chart showing operation procedures of other example of the invention of Example 2-1.

FIG. 41 is a flow chart showing work procedures in the occasion mentioned above. The same step portions as in the flow chart in FIG. 3 are given the same step numbers. In this procedure, a portion to be corrected by data from the second GPS receiver is added at the location of position specification, in addition to FIG. 3. First of all, step (S3') for checking whether position information from the second GPS receiver 214 is written in a memory of the control section or not is added, and step S 20 for correcting the position measured by the first GPS receiver 202 by position data of the second GPS receiver 214 is inserted after S3 and S3' of the check sequence. Owing to this, the position to be measured can be obtained more accurately. Therefore, it is possible to obtain more accurately the position information obtained through correction of an object.

Figure 42:
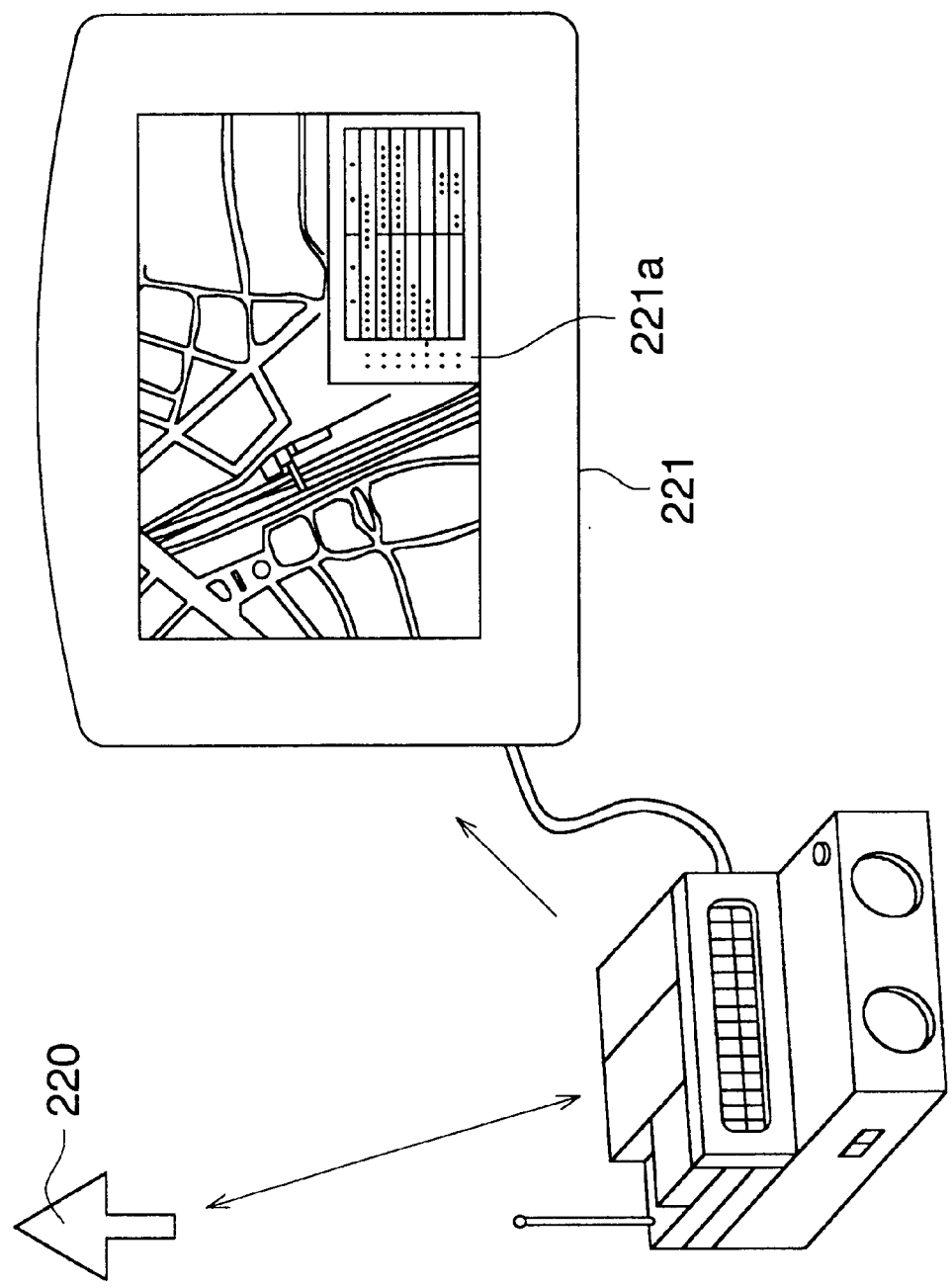
FIG. 42 is a diagram showing an example of a structural appearance of other example of the invention of Example 2-1.

FIG. 42 is a diagram showing an example of structural appearance of a variation of Example 2-1. In this example, there is provided in the apparatus an external output section (not shown) which is for taking out the display data, so that the display data may be outputted on an external device. Namely, a distance to object 220 is measured by a position measuring instrument shown in the figure to specify the position of the object, and from the calculated latitude data and longitude data, the position of object 220 and/or measurement point is displayed with certain symbols (points or marks) on a display section of external equipment 221 (for example, a personal computer) connected to the position measuring instrument. Due to this, the position of the object or the measurement point can be cleared on a map, making it possible to confirm the position more concretely. In this example, each measurement data 221a is also displayed on a map indicated on a display section of personal computer 221. Details of each measurement data are shown in FIG. 43 wherein the measurement point and the object are separated to be shown.

Figure 44:
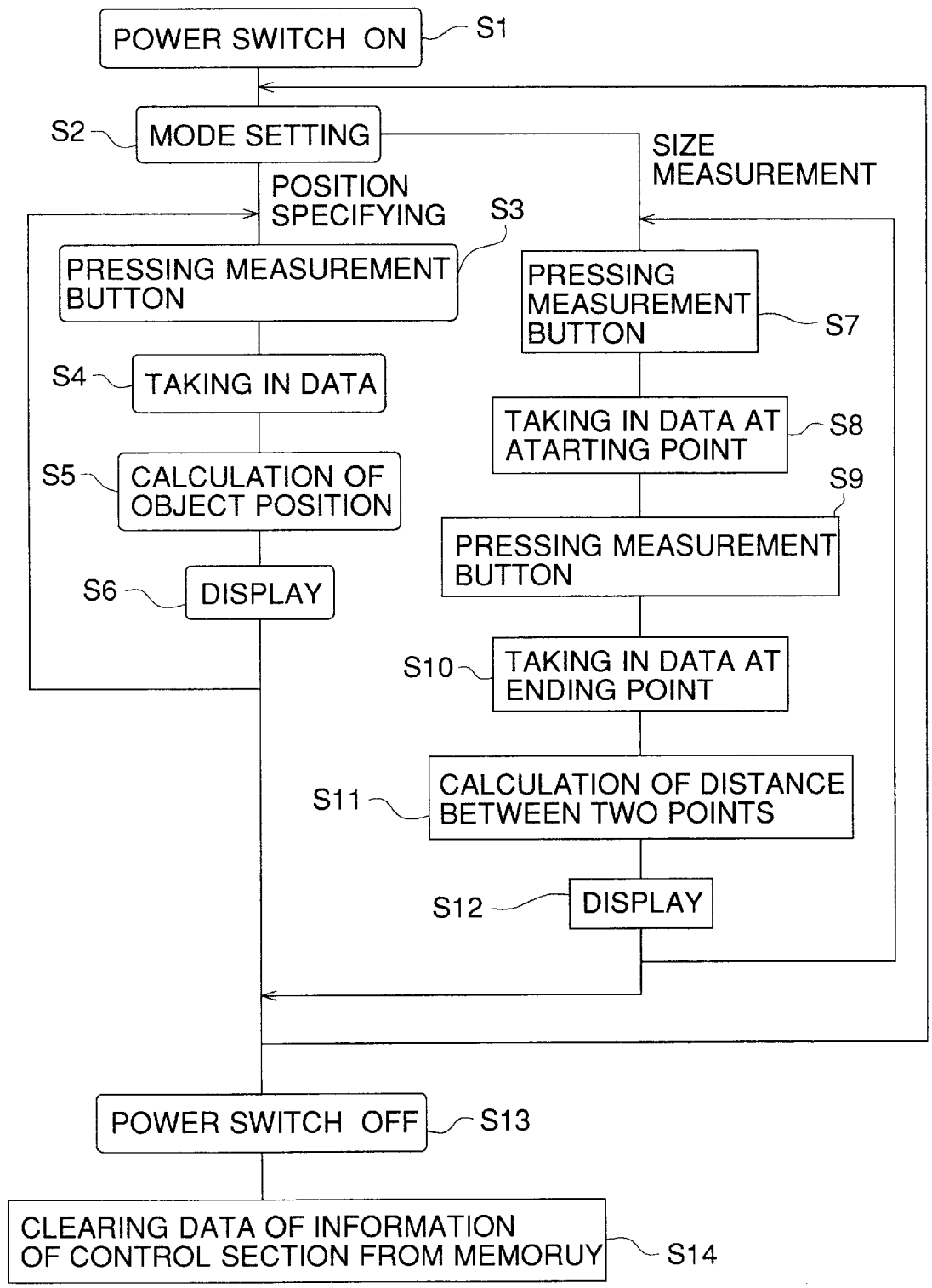
FIG. 44 is a flow chart showing operation procedures of other example of the invention of Example 2-1.

FIG. 44 is a flow chart showing operation procedures of a variation of Example 2-1. In this example, a mode for measuring the size of an object is added, in addition to the mode for specifying the object position mentioned above. In this case, a mode is switched to a measurement mode wherein a measurement button is pressed twice while aiming with a cross in a view-finder of the position measurement instrument at each point between two points to measure the distance, azimuth and inclination angle at two points of the object, so that the distance (height and width) between the two points can be measured and displayed.

First of all, power supply switch 208 is turned on (S1) so that the apparatus starts its operations. After turning on power supply, a mode setting is to be done. In the mode setting, either a normal position specifying mode or a size measuring mode is to be selected by a mode setting switch (not shown) provided on the apparatus.

In the case of the position specifying mode, when measurement button 209 is pressed (S3), the apparatus takes in various data such as GPS information, azimuth, inclination and distance to an object (S4), calculates the position of the object based on the data taken in (S5), and displays the results of the calculation on display section 206 (S6).

In the case of the size measurement mode, when measurement button 209 is pressed while aiming at the starting point (S7), the control section 205 takes in each data of the starting point (S8). Next, when the measurement button 209 is pressed again while aiming at the ending point (S9), the control section 205 takes in each data of the ending point (S10). Then, the control section 205 calculates the distance between the two points based on the data of the two points (starting point and ending point) thus taken in (S11), and displays the calculation results on display section 206 (S12). Owing to this example, it is possible to obtain more information. The measurement operations mentioned above are continued as far as they are needed.

After completion of the measurement, power supply switch 208 is turned off (S13), and each information stored in memory 210 is cleared (S14).

In the example shown in FIG. 42 mentioned above, position information is outputted to the external personal computer through the external output terminal of the apparatus and thereby the symbols of the measurement position are displayed on a map displayed on the personal computer. The invention, however, is not limited to this. It is also possible to store map information in a memory in an apparatus, to provide a display section capable of displaying map information, and to display symbols of the measurement position on the displayed map.

Figure 45:
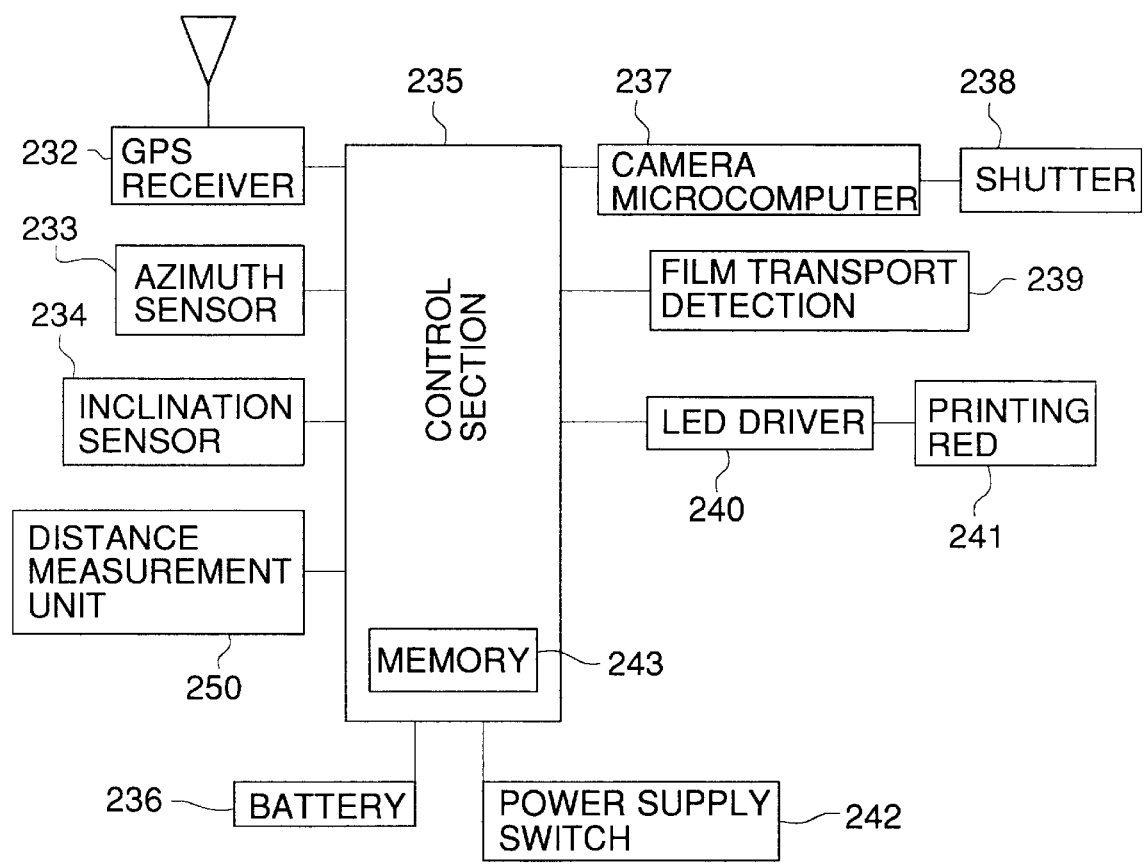
FIG. 45 is a structural block diagram showing Example 2-2.
Figure 46:
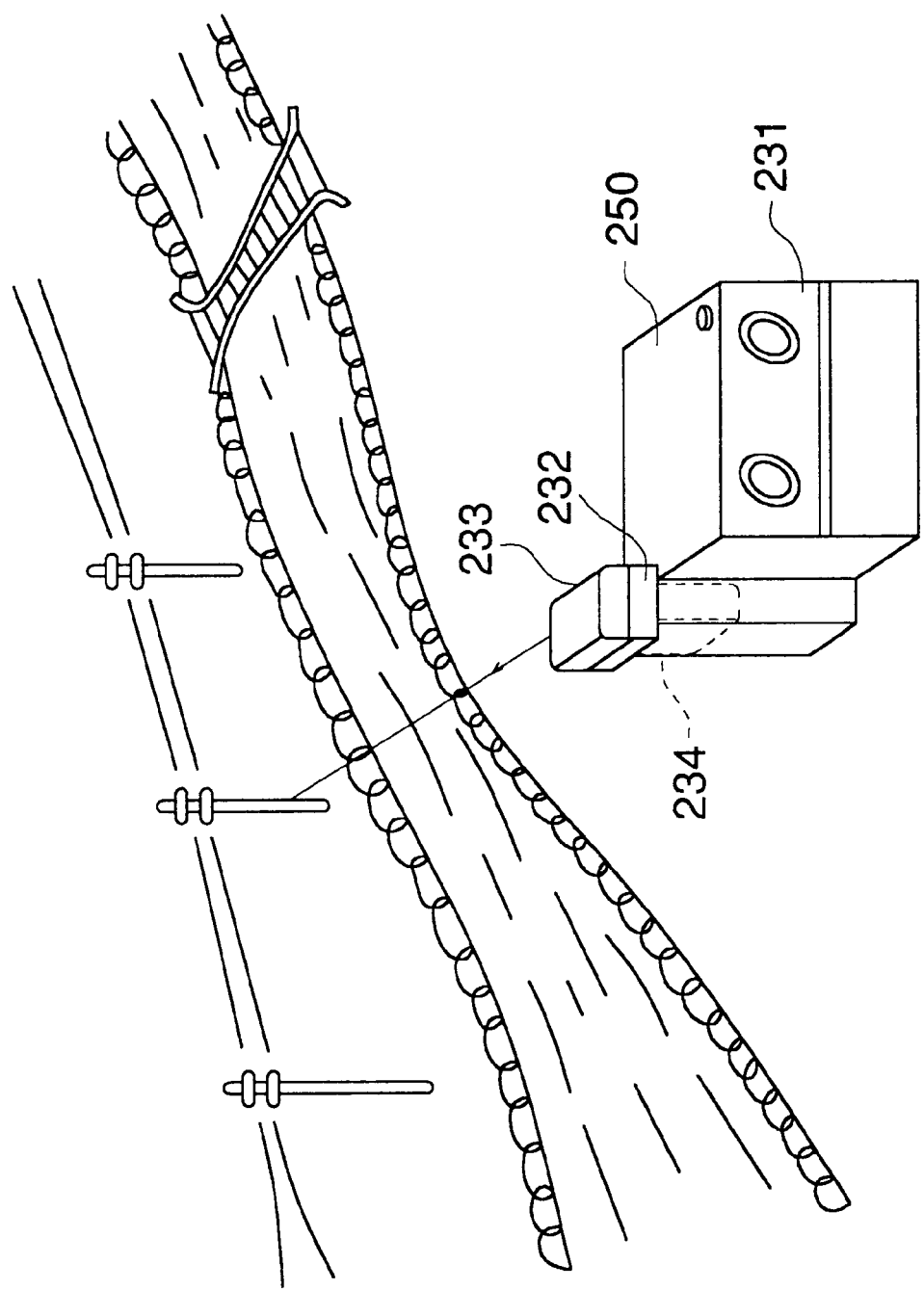
FIG. 46 is a schematic illustration of the invention of Example 2-2.

FIG. 45 is a structural block diagram showing Example 2-2 for attaining the second object of the invention, while FIG. 46 is a schematic illustration of the invention. In the example shown in the figure, a position measurement device in Example 2-1 is incorporated in a camera equipped with an information recording function. In these figures, the numeral 231 is a camera main body, 232 is a GPS receiver for detecting positions, 233 is an azimuth sensor that detects azimuth of a camera with an angle from the magnetic north when the camera is directed to an object, and 34 is an inclination sensor that detects an elevation angle of a camera when the camera is directed to an object. As is apparent from FIG. 46, the GPS receiver 232, the azimuth sensor 233 and the inclination sensor 234 are attached outside the camera main body 231. The inclination sensor 234 measures inclinations in two directions including one in an elevation angle of the camera and the other in a rotation angle around a lens axis, and detects all photographing directions of the camera together with the azimuth sensor 233. With regard to the horizontal direction, it is considered desirable to make the magnetic north to be a reference, and therefore, the azimuth sensor 233 is used.

The numeral 250 is a distance measurement unit which is used in Example 2-1 and measures the distance to an object. As the distance measurement unit 250, there is used a laser range finder, for example, wherein a laser beam is emitted from the measuring section and a period of time required for the laser beam to return after being reflected on an object is measured for obtaining the distance. Under the condition that power supply is turned on, the distance is always ready to be measured, and when the object is viewed through the range finder in the same manner as in an opera glass and a switch is pressed while overlapping the center of a cross in a visual field on the object, the distance is measured. The numeral 235 is a control section which controls all operations of a camera, 236 is a battery to supply power to circuits, 237 is a camera microcomputer that controls operations of a camera section, and 238 is a shutter.

The numeral 239 is a film transport detection section that detects an amount of advancement of a film when a film loaded in a camera is transported. The numeral 240 is an LED driver that drives an LED, 241 is a printing LED that prints various information on a frame position of a film while the film is transported, 242 is a power supply switch and 243 is a memory for storing various pieces of information provided in the control section 205. Operations of the apparatus structured as stated above will be explained as follows.

Figure 47:
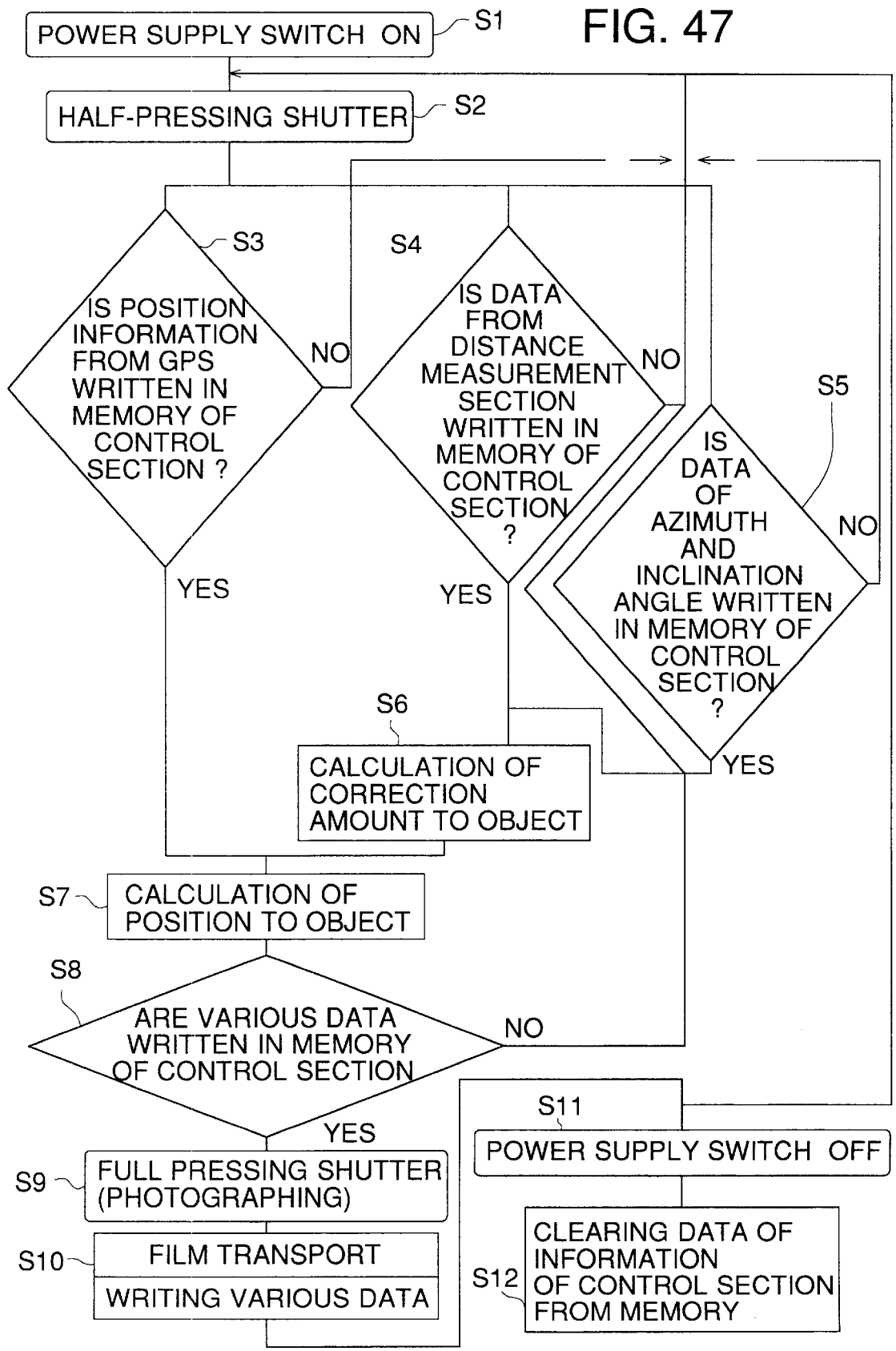
FIG. 47 is a flow chart showing operation procedures of the invention of Example 2-2.

FIG. 47 is a flow chart showing operation procedures in Example 2-2. Power supply switch 242 provided on a camera main body is turned on before photographing (S1). With this power supply turned on, power source is supplied to GPS receiver 232, azimuth sensor 233, inclination sensor 234 and to distance measurement unit 250 so that each operation may be started. When these sensors detect information, control section 235 records these information in memory 243.

Shutter 238 of a camera in the present example is of a double acting type capable of performing 2-step switching operations wherein conditions are confirmed when the shutter is pressed for the first half of its total stroke in the first step, and then a photographing mode is caused when the shutter is pressed fully for the second half of the stroke in the second step. Therefore, when the shutter 238 is half-pressed (S2) first, each sensor starts operating, and measurement results are stored in memory 243. When this half-pressing of the shutter 238 is confirmed, the control section 235 checks whether various measurement data are stored in memory 243 or not (S3, S4 and S5). When measurement data of each sensor are not stored in memory 243, the sequence returns to step S2 so that no operation is performed. This is for assuring that data are recorded on images photographed by a camera without fail.

After confirming that position information from GPS is written in memory 243, data of distance to an object measured by distance measurement unit 250 are stored, and measurement data of azimuth sensor 233 and of inclination sensor 234 are stored in memory 243, the control section 235 calculates a correction amount for distance to an object based on expressions (1) and (2) mentioned above (S6). After completion of the calculation for a correction amount for distance to an object, this correction amount is used for measurement position information for calculation of object position represented by expression (3) (S7).

Next, the control section checks whether various data are written in memory 243 or not (S8). When the data are not written in, the sequence returns to step S2 to conduct measurement again. This is for assuring the sure recording operations. After confirming that all data are stored in memory 243, the shutter 238 is pressed fully for photographing an object (S9). In this case, a character information recording area on a frame is shielded from light.

Next, the control section 235 conducts film transport and writing of various data on a frame (S10). In this case, when transporting a film, an amount of film transport is detected by film transport detection section 239, and printing LED 241 is caused by LED driver 240 to emit light at intervals of film transport amount established in advance so that characters are written on a film.

As a method for detecting an amount of film transport, there is considered a method, for example, in which an encoder is affixed on a shaft of a sprocket, and its output makes the control section 235 to confirm the light emitting timing of LED so that LED driver 240 may send driving signals. In this case, when various information such as characters are written in, the speed of a film used can be set either automatically or manually so that an amount of LED light emission from LED driver 240 may be adjusted (this portion is not shown in the figure, in particular).

When continuing photographing, the aforementioned operations are repeated, while when terminating it, power supply switch 242 is turned off (S11). In this case, all data written in memory 243 of the control section 235 are cleared (S12).

Figure 48:
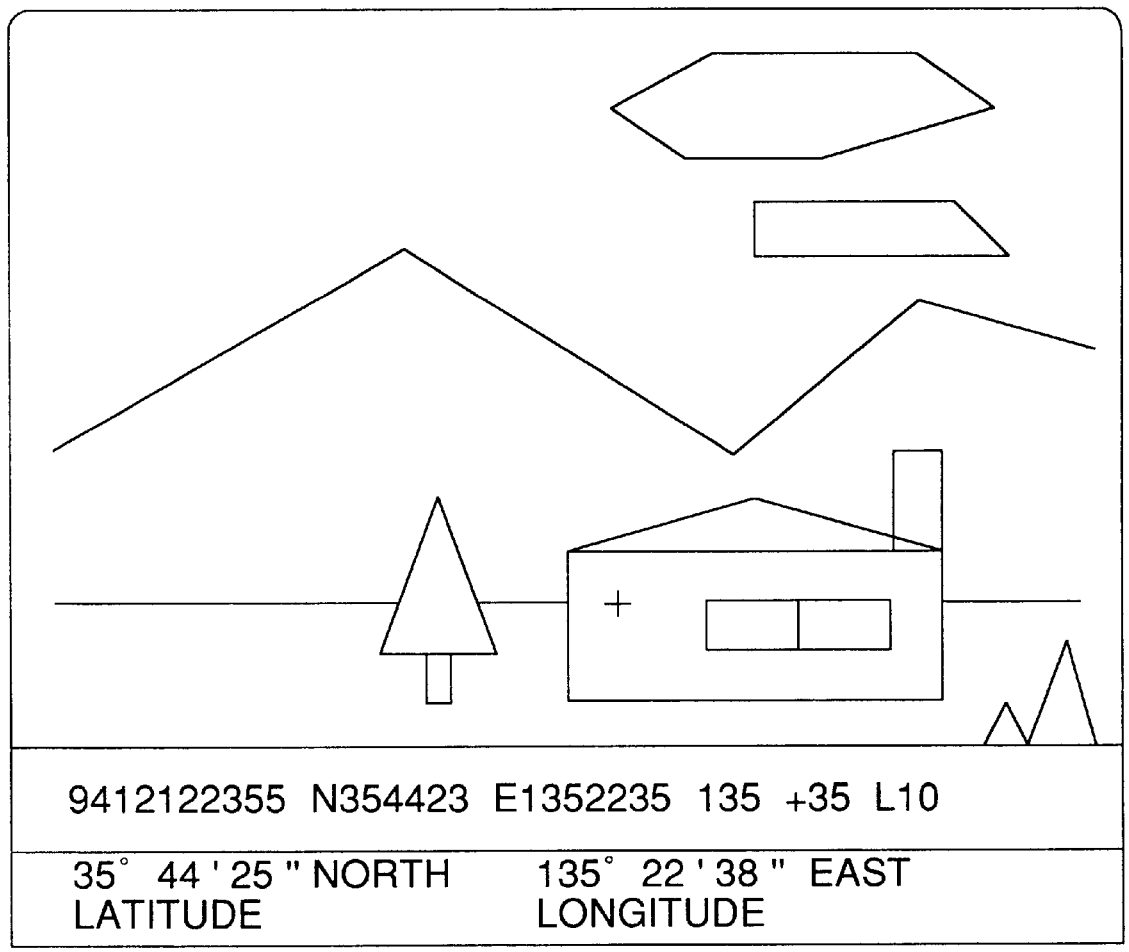
FIG. 48 is a diagram showing an example of a photographed image.

FIG. 48 is a diagram showing an example of photographed images in the invention. In this example, not only the position of an object to be measured but also position information of a measuring point are recorded. In the character information recording area, the upper portion thereof indicates a year, a month, a day and a minute (9412122355), latitude (N354423), longitude (E1352235), azimuth (135), an elevation angle of a camera (+35) and a rotation angle around a lens axis (L10) (L represents left-handed rotation). The lower portion thereof indicates position information of an object to be measured (shown in images with "+" mark) which is indicated with a latitude and a longitude.

When measuring the distance to an object with a camera, an optical axis of the camera and a central axis of a projection system of the distance measurement unit 250 are arranged to be coaxial. Owing to this, the distance to the object can be measured more accurately.

In the second example mentioned above, a laser length measuring machine of a light wave type is used as distance measurement unit 250. The invention, however, is not limited to this example, and other distance measuring instruments of an active type or of a passive type can be applied.

Figure 49:
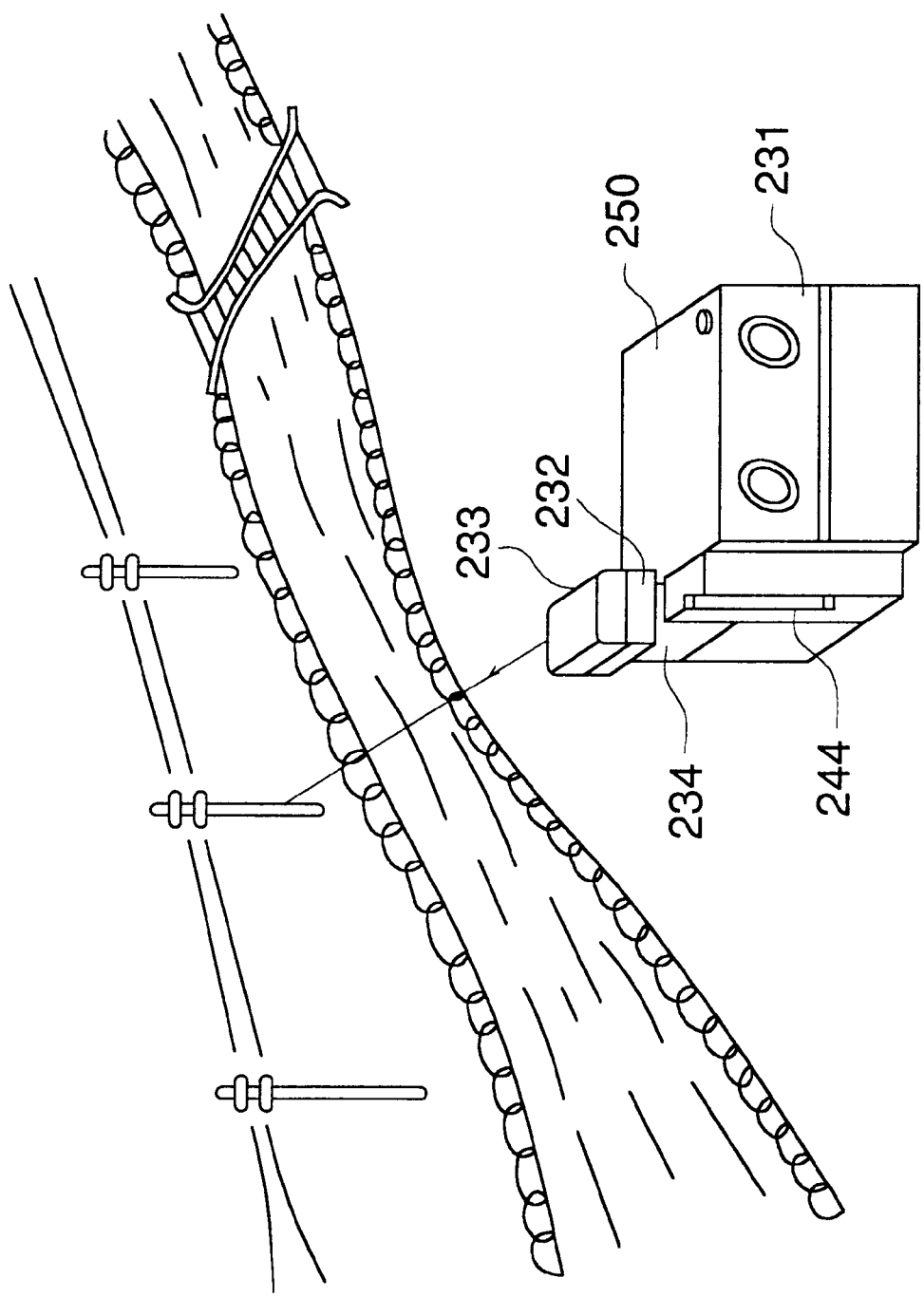
FIG. 49 is a another schematic illustration of the invention of Example 2-2.

FIG. 49 is a diagram showing an example of structural appearance of a variation of Example 2-2 of the invention. Items in the figure which are the same as those in FIG. 46 are given the same symbols. In this example, second GPS receiver 244 is provided to correct the data from the first GPS receiver 232 with the data received by the second GPS receiver 244 so that the position of higher accuracy may be specified. In terms of circuit diagrams, the second GPS receiver 244 is added to the circuit in FIG. 45 (circuit diagrams are not shown).

Figure 50:
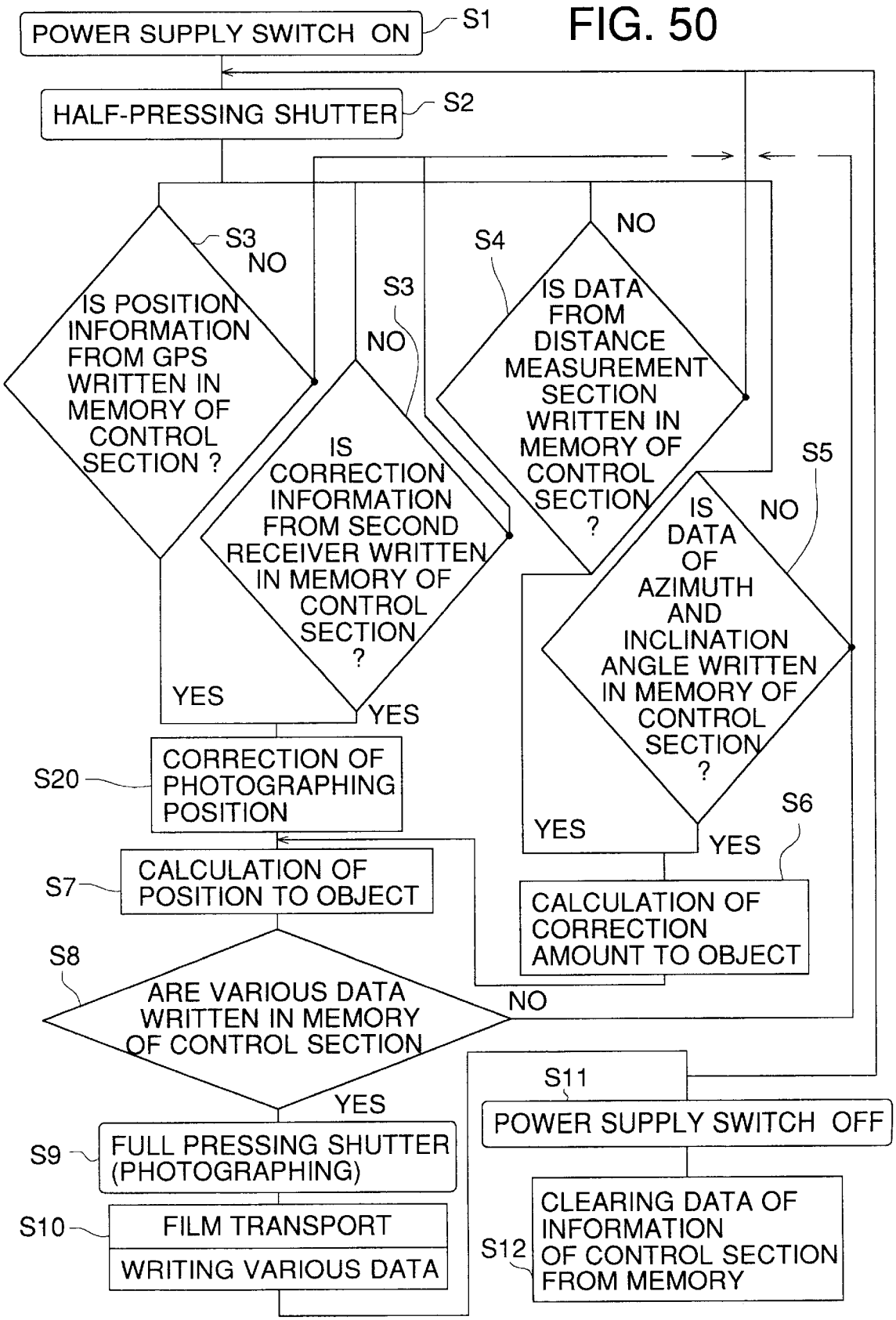
FIG. 50 is a flow chart showing operation procedures of other example of the invention of Example 2-2.

FIG. 50 is a flow chart showing operation procedures in the occasion mentioned above. The same step portions as in the flow chart in FIG. 47 are given the same step numbers. In this procedure, a portion to be corrected by data from the second GPS receiver is added at the location of position specification, in addition to FIG. 47. First of all, step (S3') for checking whether position information from the second GPS receiver 214 is written in a memory 243 of the control section or not is added, and step S 20 for correcting the position measured by the first GPS receiver 232 by position data of the second GPS receiver 244 is inserted after S3 and S3' of the check sequence. Owing to this, the position to be measured can be obtained more accurately. Therefore, it is possible to obtain more accurately the position information obtained through correction of an object.

Figure 51:
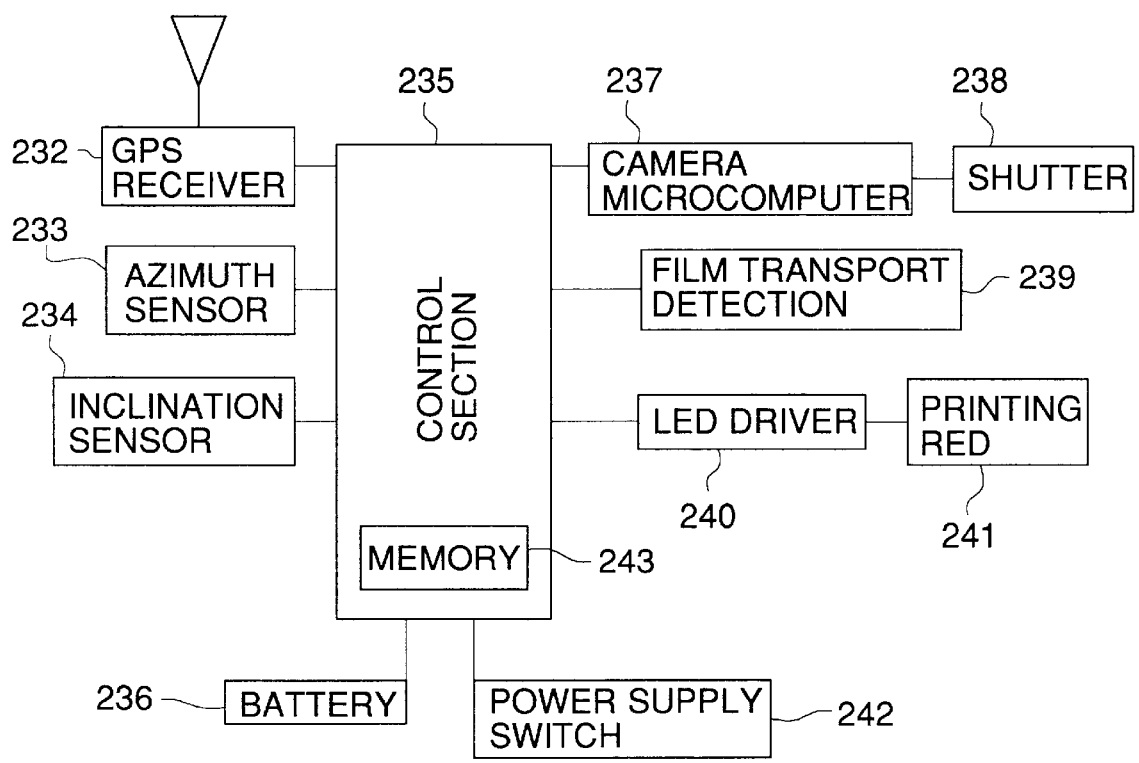
FIG. 51 is a structural block diagram showing Example 2-3.
Figure 52:
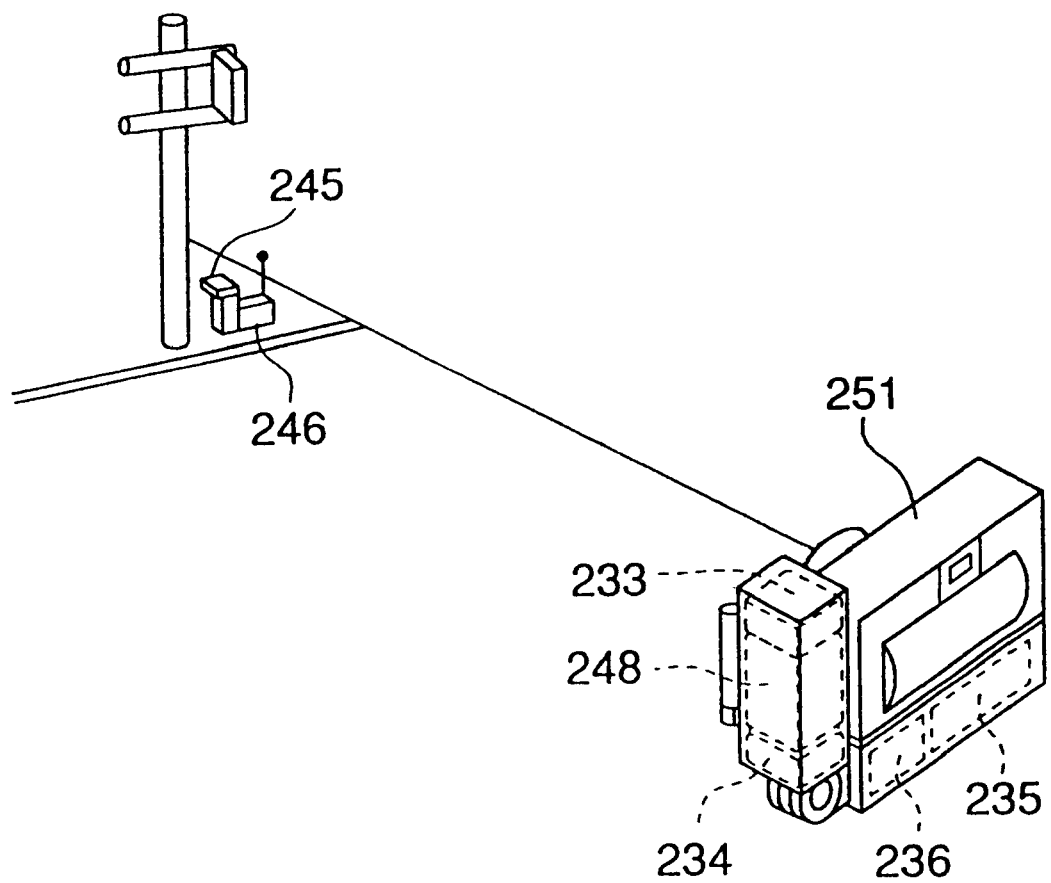
FIG. 52 is a schematic illustration of the invention of Example 2-3.

FIG. 51 is a structural block diagram showing the third example attaining the second object of the invention, and FIG. 52 is a schematic diagram of Example 2-3. In this example, the GPS receiver is provided separately from the camera main body. It is possible to make a camera main body small by providing a GPS receiver separately. Items in the figure which are the same as those in FIG. 45 are given the same symbols. In these figures, the numeral 251 is a camera main body, 248 is a receiver that receives position information sent from GPS receiver 245 provided outside separately, 233 is an azimuth sensor that detects the azimuth of a camera in a form of an angle from the magnetic north when the camera is directed to an object, and 234 is an inclination sensor that detects an inclination angle of a camera when the camera is directed to an object. As is apparent from FIG. 52, the receiver 248, the azimuth sensor 233 and the inclination sensor 234 are provided outside the camera main body 251. The inclination sensor 234 measures inclinations in two directions including one in an elevation angle of the camera and the other in a rotation angle around a lens axis, and detects all photographing directions of the camera together with the azimuth sensor 233. With regard to the horizontal direction, it is considered desirable to make the magnetic north to be a reference, and therefore, the azimuth sensor 233 is used.

The numeral 235 is a control section that controls all operations of a camera, 236 is a battery that supplies power to the circuit, 237 is a camera microcomputer that controls operations of a camera section and 238 is a shutter. The numeral 239 is a film transport detection section that detects an amount of advancement of a film when a film loaded in a camera is transported. The numeral 240 is an LED driver that drives an LED, 241 is a printing LED that prints various information on a frame position of a film while the film is transported, 242 is a power supply switch and 243 is a memory for storing various pieces of information provided in the control section 205. The numeral 245 is a GPS receiver arranged in the vicinity of an object (an electric-light pole, in this case), 246 is a transmitter that transmits, in a radio system, the position information measured by the GPS receiver 245 to the camera main body 251. Operations of the apparatus structured as stated above will be explained as follows.

Figure 53:
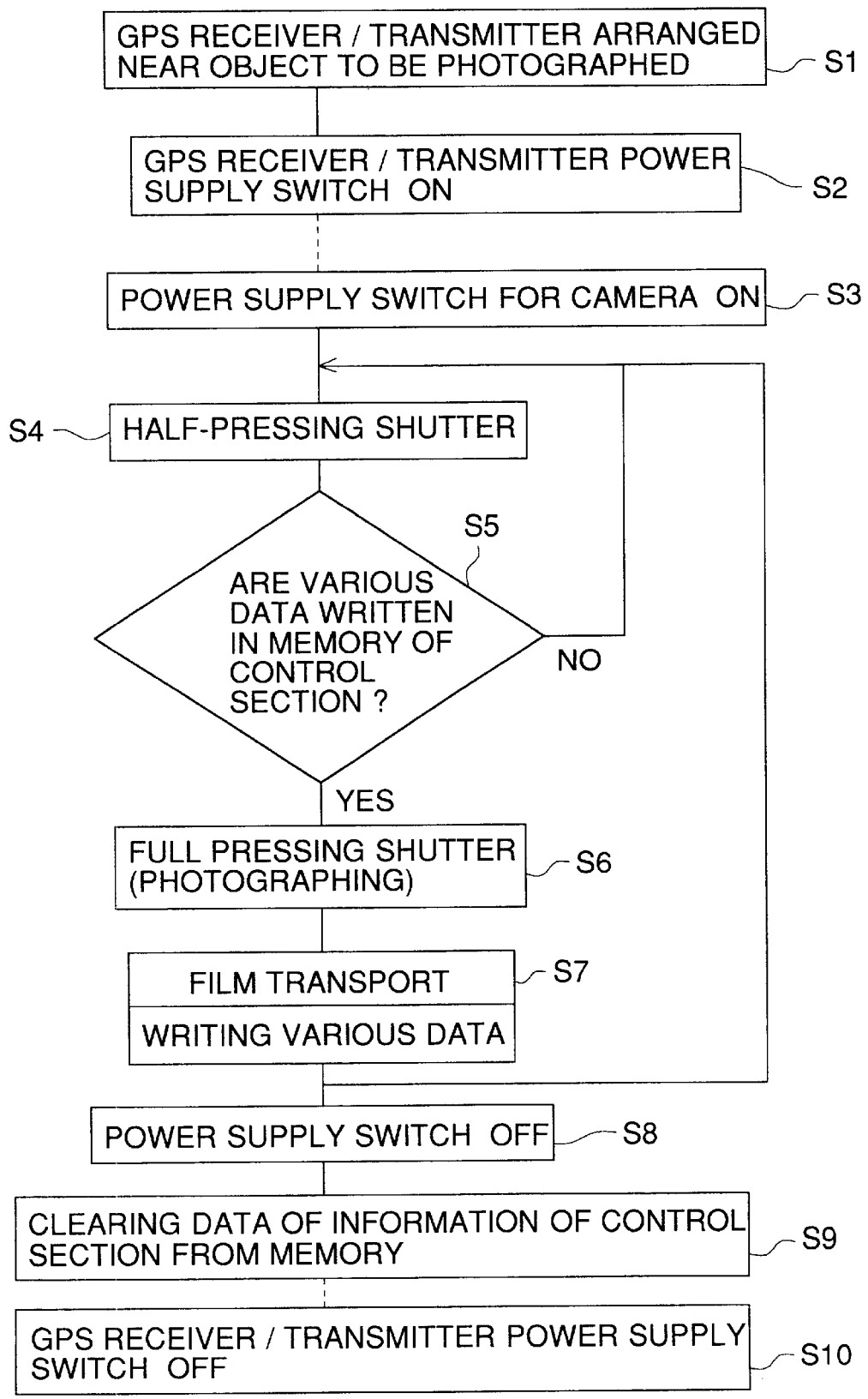
FIG. 53 is a flow chart showing operation procedures of the invention of Example 2-3.

FIG. 53 is a flow chart showing operation procedures in Example 2-3. First, GPS receiver 245 and transmitter 246 are arranged in the vicinity of an object to be photographed (S1). Next, power supply switch for these GPS receiver 245 and transmitter 246 is turned on (S2), and power supply switch 242 for a camera is turned on (S3). When these power sources are turned on, power source is supplied to the system shown in FIG. 52 so that each operation is started.

When camera 251 is directed to an object to aim that object, position information measured by GPS receiver 245 enters receiver 248 of a camera from transmitter 246, and position information of the object is stored in memory 243. Concurrently with this, output of both azimuth sensor 233 attached to camera 251 and inclination sensor 234 are stored in the memory 243. In this example, GPS information from an object is received as it is. Therefore, it is not necessary to do calculation for obtaining position information of an object from the measurement point through correction operation which is conducted in the first and second inventions.

Shutter 238 of a camera in the present example is of a double acting type capable of performing 2-step switching operations wherein conditions are confirmed when the shutter is pressed for the first half of its total stroke in the first step, and then a photographing mode is caused when the shutter is pressed fully for the second half of the stroke in the second step. When the shutter 208 is pressed to cover the first step (half-pressed) (S4), the control section 235 checks whether various data are stored in memory 243 or not (S5). When the various data are not stored in memory 243, the sequence returns to step S4 to conduct shutter operations again. This assures that various information are recorded on photographed images on a frame.

When these data are stored in memory 243 in control section 235, the shutter is pressed fully to cover the second step (full pressing) to move to photographing operations (S6). In this case, a character information recording area on a frame is shielded from light. When a film is advanced after photographing, an amount of film transport is detected by film transport detection section 239, and printing LED 241 is caused by LED driver 240 to emit light at intervals of film transport amount established in advance so that characters are written on a film (S7).

As a method for detecting an amount of film transport, there is a method in which an encoder is affixed on a shaft of a sprocket, and its output makes the control section to confirm the light emitting timing of LED so that driving signals of LED driver may be sent.

When continuing photographing, the aforementioned operations are repeated, while when terminating it, power supply switch 242 is turned off (S8). In this case, all data written in memory 243 of the control section 235 are cleared (S9).

When changing the object to be photographed, the position of a combination of the GPS receiver 245 and the transmitter 246 is changed and the above-mentioned operations are repeated. When terminating, a power supply switch for GPS receiver 245/transmitter 246 is turned off (S10).

The image photographed in the aforesaid manner is the same as that shown in FIG. 48. Namely, in addition to position information (latitude and longitude) of an object, an azimuth angle and an elevation angle of a camera are recorded.

In the examples mentioned above, there is no restriction in specifications of communication, namely, an electric wave, light and a sound wave can be used. In addition, it is a matter of course that connection through telecommunication lines is also available. Further, it is also possible to employ a method in the present example wherein a GPS receiver is provided on a camera in addition to the receiver 248 so that information of the photographing location can be measured and recorded in addition to position information of an object.

When this method is used, it is possible to record an approximate position information by receiving electric waves from a receiver positioned at a place where GPS electric waves can be received, in photographing at the place where GPS electric waves can not be received, though specifying of the object position only has been considered in the explanation above. For example, there may be considered some applications wherein in the case of underwater photographing, a receiver is positioned on a buoy and position information is brought to the camera under water through wire, or a receiver is affixed on a balloon in the forest and the balloon is sent up to an altitude where electric waves can be received and position information is sent to the camera through wire or through a radio system.

A method for recording position information on a frame of images is not limited to a printing method by means of an LED, and a method employing a system to record magnetically on a film having thereon a magnetic layer is also usable.

As stated in detail above, in Example 2-1, a GPS receiver that measures the position of a measuring location and a distance measuring unit that measures a distance from a measuring location to an object are provided, the position of a measuring location is measured by the GPS receiving section, then, a distance from a measuring location to an object is measured by the distance measuring unit, and after obtaining the distance to the object, position information of the measuring location is subjected to correction operation based on output of the aforesaid various sensors to specify the position of the object, and thereby the position of the object that is away from the GPS receiver can be specified. Since the position of an object itself can be specified in the invention, it is simple to correspond to a map, and when necessary, an altitude and a width of the object can be measured, which makes it possible to exploit a new application.

In this case, the distance measuring unit mentioned above can measure the distance to the object easily by measuring the distance from the measuring location to the object by means of light waves. This is especially effective when an object to be photographed is in the place which is not accessible by walking.

Further, it is possible to obtain position information which is more accurate, by arranging the second GPS receiving section further and by correcting the position information from the first GPS receiving section mentioned above with information from this second receiving section. When When various pieces of information are not recorded at a prescribed recording position of a built-in memory, a control section of an apparatus gives a built-in display section a command for standing by or for measuring again, so that each piece of information can be recorded surely.

By providing an external output section that is for taking out data for display so that various data can be displayed also on a separate display device in addition to that on a measuring apparatus, it is possible to display various data on a separate display section.

When map information used for displaying a map of a relevant area is stored in a memory, and a means for displaying the position of measuring location and/or the position of an object on a map displayed on the display section is provided, a measuring location or the like can be recognized on a displayed map, which is convenient.

Further, by measuring a distance, azimuth and an inclination angle about two points of an object and thereby by indicating a distance between the two points (height and width), it is possible to obtain more information.

In Example 2-2, a GPS receiver that measures the position of a measuring location and a distance measuring unit that measures a distance from a measuring location to an object are provided, and there is also provided a means for recording the results of calculating the position of an object to be photographed based on output data from the above-mentioned sensors as photographing position information. Thereby, it is possible to specify the position of the object to be photographed and to record it on images in a camera equipped with an information recording function. Thus, it is simple to correspond to a map, which makes it possible to exploit a new application.

In this case, the distance measuring unit mentioned above can measure the distance to the object easily by measuring the distance from the measuring location to the object by means of light waves. This is especially effective when an object to be photographed is in the place which is not accessible by walking.

By arranging an optical axis of the camera and a central axis of a projection system of the distance measurement unit to be coaxial, it is possible to obtain position information which is more accurate.

By arranging the control section of an apparatus so that a camera does not operate normally even when a shutter is pressed for photographing when various pieces of information are not recorded at a prescribed position of the built-in memory, it is possible to record information for certain.

Further, it is possible to obtain position information which is more accurate, by arranging the second GPS receiving section further and by correcting the position information from the first GPS receiver mentioned above with data from this second receiving section.

In Example 2-3 of the invention, there is provided a receiving section that receives, through a communication means, the position information transmitted from a GPS receiver positioned in the vicinity of an object to be photographed, and the position information received by the receiving section can be recorded together with images on images as photographing position information. Owing to this, the position information from the GPS receiver can be used as position information of the object to be photographed as it is, and it is possible to specify the position of the object to be photographed and to record it on images. In this case, it is simple to correspond to a map, and a new application can be exploited.

In this case, due to the communication means which is optical communication, information can be transmitted through no communication wire.

Further, due to the aforesaid communication means which is employ communication lines, information can be transmitted surely.

Further, due to the aforesaid communication means which is of a radio system, information can be transmitted through no communication wire.

As stated above, the present invention can offer firstly a position measuring apparatus capable of specifying the position of an object that is positioned to be away from a GPS receiver, and can offer secondly a camera equipped with an information recording function capable of specifying the position of an object to be photographed and to record it on images.

A filing device for photographic images with character information which is the third object of the invention will be explained as follows.

Example 3-1

Figures 54, 55:
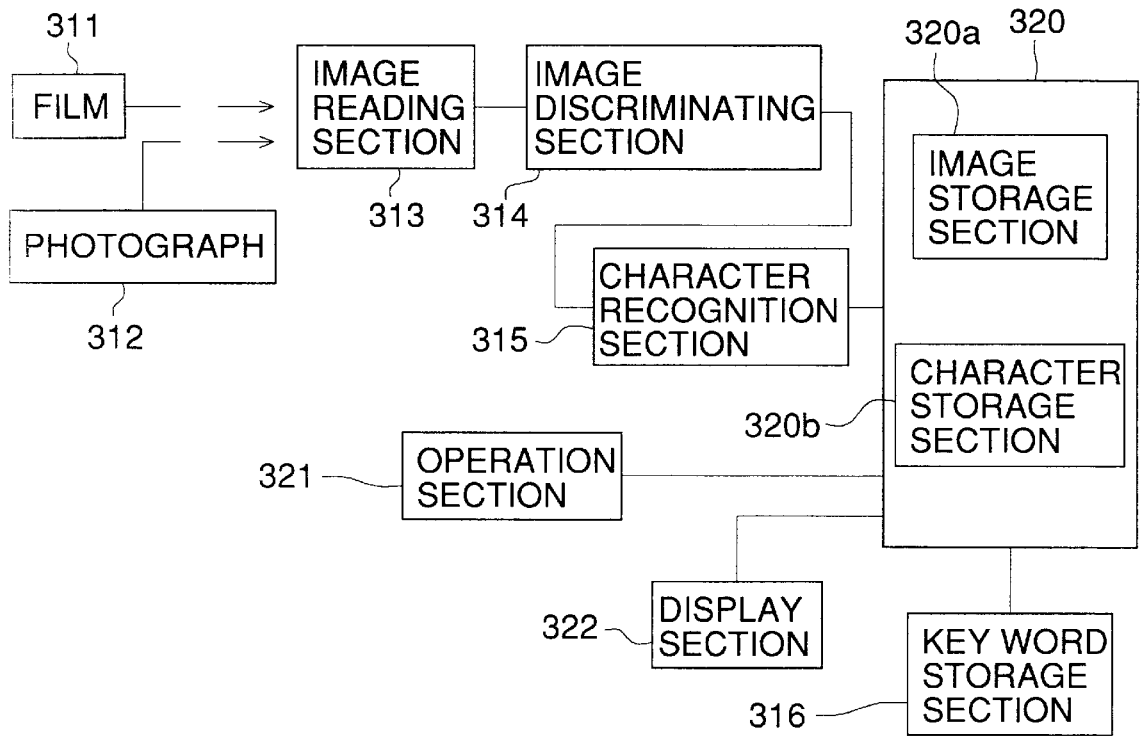
FIG. 54 is a structural block diagram showing Example 3-1.
FIG. 55 is a diagram showing an example of a conversion table.

FIG. 54 is a structural block diagram showing Example 3-1 of the invention. In the figure, the numeral 311 represents a film on which images and character information are recorded on each frame as shown in FIG. 13-A, and the numeral 312 is a photograph on which images and character information are recorded as shown in FIG. 13-B. The numeral 313 is an image reading section which reads image information from film 311 and/or photograph 312. As the image reading section 313, an image scanner employing CCD as an element is used.

The numeral 314 is an image discriminating section which discriminates an image portion only from the read images, 315 is a character recognition section which receives output from the image reading section 313 and the image discriminating section 314 and recognizes a character portion from the remaining area discriminated by the image discriminating section 314. The numeral 320 is a file for storing information recognized by the image discriminating section 314 and the character recognition section 315, and it is represented by a disk device, for example. The file 320 is equipped with a control section (not shown) and can perform necessary processing.

In the file 320, the numeral 320a is an image storage section for storing an image portion discriminated by the image discriminating section 314, and 320b is a character storage section for storing a character portion recognized by the character recognition section 315, These image storage section 320a and character storage section 320b are made to correspond each other for storage. The numeral 316 is a key word storage section which cuts a character group stored in the character storage section 320b into various data of time, latitude, longitude, azimuth and elevation angle, and stores them as a key word. The numeral 321 is an operation section for giving various retrieval information to the file 320, and its example is a key board. The numeral 322 is a display section that displays image information searched by the operation section 321. Operations of an apparatus structured as stated above will be explained as follows.

After processed film 311 or photograph 312 is loaded in the image reading section 313, the image reading section 313 starts reading images from the loaded film and/or photograph. In this case, a dot image is used as an image for reading, regardless of an image recording section and a character information recording section. The image discriminating section 314 discriminates an image portion only through a predetermined algorithm from image data read by the image reading section 313. On the other hand, the character recognition section 315 recognizes characters from a portion other than the image area discriminated by the image discriminating section 314. As a method for recognizing characters, a pattern recognition method, for example, is used.

Thus, image data discriminated by the image discriminating section 314 are stored in the image storage section 320a in the file 320, while, character data recognized by the character recognition section 315 are stored in the character storage section 320b in the file 320, In this case, images stored in the image storage section 320a are correlated, without fail, with character data stored in the character storage section 320b to be stored. Above operations are repeated for the number of cycles corresponding to the number of image frames recorded on the film 11 or of photographs. Thus, all images are stored on the file 320 in the state wherein image data are separated from character data. By storing under the state wherein image data are separated from character data, less space is required which is different from the storage of photographs on recording sheets, and photographs can be maintained easily.

Stored images can be subjected to retrieval by means of a key word. After storing image data and character data in the file 320, character as key words are inputted through the operation section 321. On the file 320, inputted character data are first checked whether they are stored in the character storage section 320b or not. When they are not stored, "No key word for the corresponding character" appears on display section 322, attracting an operator's attention. When they are stored, the file 320 reads out images related to the relevant character from the image storage section 320a so that it is displayed on the display section 322. In the case of plural images each having a key word of inputted character, their images are displayed in succession. After recognizing a necessary image, an operator can print images from an output device (not shown). In case of need, it is possible to print together with inputted key words, or with all key words related to the relevant images. Or, in the case of plural images related to inputted key words, it is also possible to index-print them by composing images having the same key word on one image plane.

In the explanation above, there is included an example where key words are stored in character storage section 320b in advance. However, the invention is not limited to this, and a key word can be given to each image at the later stage. In this case, when an appropriate key word is inputted through operation section 321, the file 320 registers the inputted character in character storage section 320b.

It is also possible to cut the key word (title) stored in character storage section 320b into data of the aforesaid various information (time, latitude, longitude, azimuth and elevation angle), and to store them newly in key word storage section 316 as a key word. With regard to the registration of the new key words, when character recognition is completed at character recognition section 315 and the characters are stored in character storage section 320b in the file 320, the file 320 recognizes inputted characters automatically and cuts them and stores them in key word storage section 316.

In that case, characters stored in the key word storage section 316 can also be used as a key word. For example, when the time, for example, among various information shown in FIG. 13-A is inputted through operation section 321, the filter 320 searches the key word storage section 316 and checks whether the same characters exist or not. When there are the same characters, the file 320 searches images (not always limited to one) related to the relevant character from image storage section 320a and causes it to be displayed on display section 322. When there is no same character, "No key word for the corresponding character" appears on display section 322, attracting an operator's attention.

In the invention, with regard to the key words mentioned above, it is possible to conduct automatic conversion from the read position information to location information and storage thereof and to conduct conversion from position information and time information to new key words for storing them as key words of the images. For example, it is possible to give a key word of Hakone from data of a position at 139°02'00" East Longitude and at 35°11'50" North Latitude, or to give a key word of Harumi from data of a position at 139°46'40" East Longitude and 35°38'56" North Latitude. Further, it is possible to add a key word of the electronics show held at that time by combining the foregoing with time of 9410081530 (Oct. 8, 1994). Use of the conversion table makes it possible to convert from a key word to a key word.

FIG. 55 is a diagram showing an example of the conversion table. For example, in the case of K1 Latitude and Q1 Longitude, a new key word of "Hakone" is given, and in the case of K2 Latitude and Q2 Longitude, a new key word of "Izu" is given. Such conversion table is provided in the file 320 or in key word storage section 316. When an operator inputs a key word of "Hakone" through operation section 321, the file 320 searches the inside of the file or key word storage section 316 and checks if the relevant character exits or not. When the relevant character exists, the file 320 reads out the image related to latitude and longitude corresponding to this word of "Hakone" from image storage section 320a and makes it to be displayed on display section 322. When one key word is made by combining plural key words, key words for image retrieval can be inputted more easily. Namely, up to that moment, an operator was required to input two key words of latitude and longitude showing "Hakone" for searching the image of "Hakone", but now, the operator has only to input "Hakone" for retrieval of the objective image.

Owing to the present example, it is easy to search the objective image by means of a key word of characters stored in the file and to maintain photographed photographs, when image information is read from photographic images and/or films composed of an image recording area and a character recording area and images are separated from characters to be stored in the file respectively.

In this case, by providing a means to use a recognized character group as a key word of the image, it is possible to make the retrieval of the objective image from the character group easy.

Further, by providing a means wherein the recognized character group is cut into pieces on the rule established in advance, and each piece is filed in the file together with photographs, it is possible to search the same image with various characters as key words.

Further, by providing a means wherein one key word is selected from combination of key words of two or more kinds and this key word is also filed together with photographs, it is possible to search the objective image more easily.

As stated above, the invention can provide a filing device for photographic images wherein maintenance and retrieval of photographed photographs are easy.

Example 3-2

Figure 56:
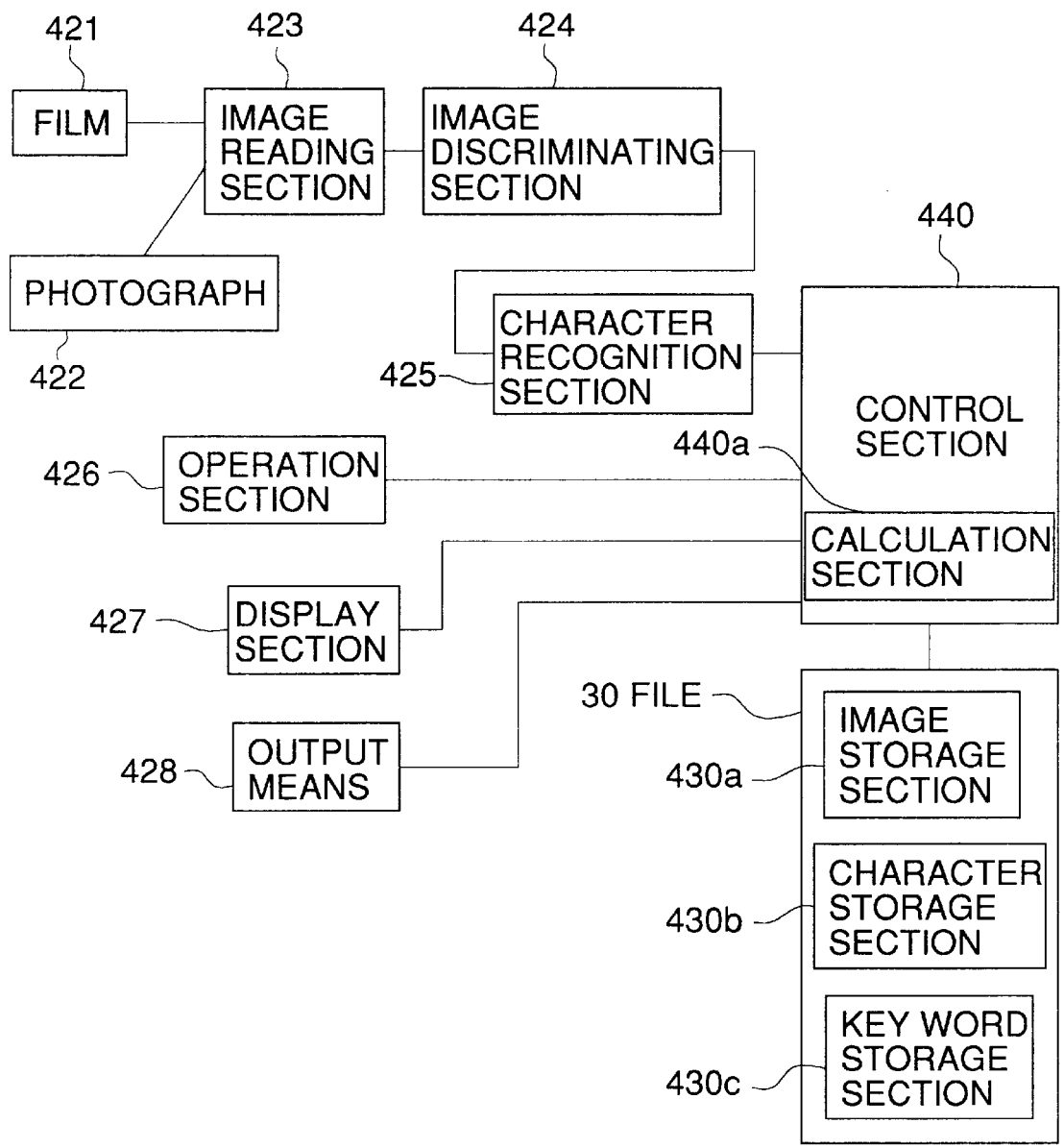
FIG. 56 is a structural block diagram showing Example 3-2.

FIG. 56 is a structural block diagram showing Example 3-2 of a filing device in the invention. In the present example, discrimination symbols showing the types of photographing time and position information are recorded by discrimination symbol setting section 417 in FIG. 8 on film 421 and/or photograph 422 as shown in FIG. 13-B. The numeral 423 is an image reading section to read image information from film 421 and/or photograph 422. As the image reading section 423, there is used an image scanner wherein CCD, for example, is used as an element.

The numeral 424 is an image discriminating section that receives output from the image reading section 423 and discriminates an image portion only from the read images, and the numeral 425 is a character recognition section that receives output from the image reading section 423 and the image discriminating section 424 and recognizes a character portion from the remaining area discriminated by the image discriminating section 424. The numeral 430 is a file for storing information recognized by the image discriminating section 424 and the character recognition section 425, and its example is a disk device, for example.

The numeral 440 is a control section that controls total operations, and 440a provided in the control section 440 is a calculation section which calculates, from position information, the time difference from the standard time of the photographing position when the type of time information is recognized from a discrimination symbol provided to the time information. The aforesaid file 430 is connected to the control section 440. The numeral 428 is an output means that is connected to the control section 440 and outputs filing information, and various outputting equipment including a dot printer, for example, can be used for the output means.

In the file 430, the numeral 430a is an image storage section that stores images discriminated by the image discriminating section 424, the numeral 430b is a character storage section that stores a character portion recognized by the character recognition section 425, and the numeral 430c is a key word storage section which cuts a character group stored in the character storage section into various data of time, latitude, longitude, azimuth and elevation angle, and stores them as key words, The image storage section 430a and the character storage section 430b are caused to correspond to each other for storage. The numeral 426 is an operation section that gives various retrieval information to control section 440, and a key board, for example, is used as the operation section. The numeral 427 is a display section displaying thereon image information searched through the operation section 426. Operations of the apparatus structured as stated above will be explained as follows.

Figure 57:
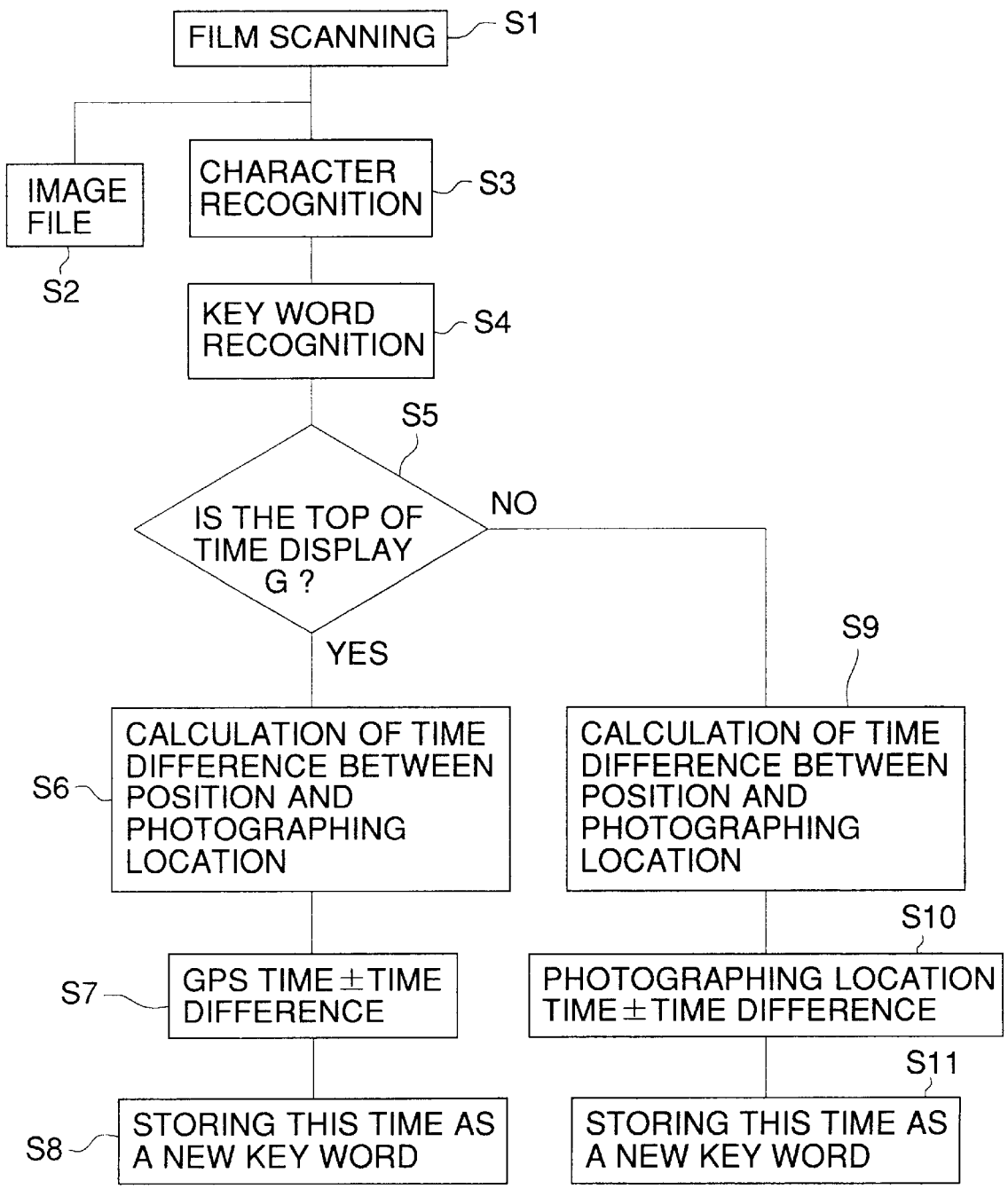
FIG. 57 is a flow chart showing operation procedures of the invention of Example 3-2.

FIG. 57 is a flow chart showing an example of operation procedures in Example 3-2. Explanation will be made as follows, referring to the flow chart. First of all, when developed film 421 or photograph 422 is mounted on image reading section 423, the image reading section 423 starts reading the mounted film and/or photograph (S1). In the case of a film, the film is read through film scanning. In this case, reading is conducted as an image in the form of a dot image, regardless of an image recording section or a character information recording section. Image discriminating section 424 discriminates, by means of a prescribed algorithm, an image portion only from the image data read by the image reading section 423, and stores it in image storage section 430a (S2). On the other hand, character recognition section 425 recognizes characters from the portion other than image areas discriminated by the image recognition section 424 (S3). As a character recognition method, a pattern recognition method, for example, can be used.

Image data thus discriminated by the image discriminating section 424 are stored in the image storage section 430a, while, character data recognized by the character recognition section 425 are stored in character storage section 430b in file 430. In this case, images stored in the image storage section 430a and characters stored in the character storage section 430b are stored to be related each other. Above operations are repeated for the number of times equivalent to the number of frame images recorded on film 421 or the number of photographs. Thus, all images are stored in file 430 in a manner that image data and character data are separated. Owing to that image data and character data are separated to be stored, space saving can be attained, which is different from the occasion where photographs on recording papers are stored, and photographs can be controlled easily.

In this case, it is possible to divide key word (title) stored in the character storage section 430b into various information data (time, latitude, longitude, azimuth and elevation angle), and to store them newly in key word storage section 430c as key words.

The invention will be explained as follow, focusing on the time among divided key words. Control section 440 recognizes each key word from the key word storage section 430c (S4). Then, it checks whether the top symbol in the display of time is G or not (S5). If the top symbol in the display of time is G, it means that GPS time has been recorded as stated above. In this case, calculation section 440a calculates the time difference of the photographing location from position information (latitude and longitude) (S6), and by adding this time difference to GPS time (S7), the time at the photographing location can be calculated. This time is stored in the key word storage section 430c as a new key word (S8). Even when establishment of the photographing location is forgotten before photographing, the time at the photographing location is automatically converted to a key word owing to this function, which is effective for putting files at the same photographing location in order.

When the top symbol in a display of time is indicated by an alphabet other than G, the time difference from position information (or an alphabetical information of a country name) to GPS time is calculated (S9), which is opposite to the previous example, then, GPS time is calculated from the time difference (S10) and that GPS time is stored in the key word storage section 430c as a new key word (S11). This key word is effective when it is necessary to put images photographed on a worldwide basis in order of a time series.

In the example stated above, image/character information are inputted from a film or a photograph. Even when images are photographed electronically and character information are inputted electronically, namely, through RS232C interface, for example, only difference is in the constitution for filing, and the contents of the invention thereafter can be applied.

As stated above, in the present example, both of GPS time and the time at the photographing location can be made a key word, whatever the recognized time information may be in processing after image reading. Therefore, not only putting in order at an arbitrary photographing location but also putting in order in terms of GPS time can easily be done.

In this case, when there is a time difference between the time calculated by the aforesaid calculation means and the time information stored, photographic images can be subjected to retrieval with that time difference as a key word, if there is provided a means to store that time difference in a storage portion as a key word.

Further, from a discrimination mark given to time information stored, when the time information stored is not the GPS time, all photographic images can be standardized with GPS time to be filed, through the GPS time calculated from time information stored by the aforementioned calculation means.

Figure 58:
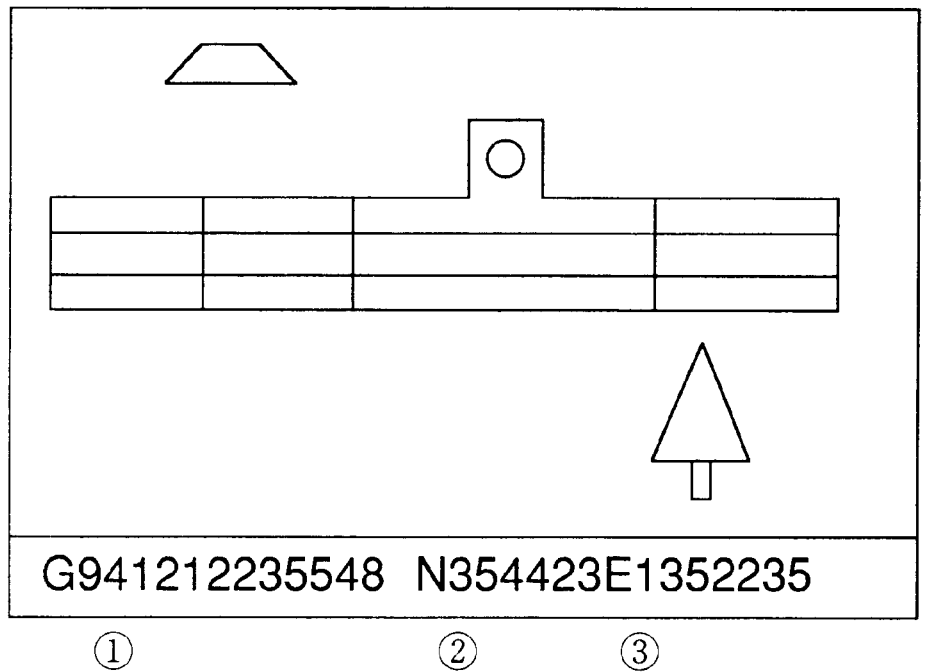
FIG. 58 is a diagram showing an example of a file image in the invention of Example 3-2.

FIG. 58 is a diagram showing an example of a photographed image to be filed in the present example. A line of characters is recorded on the bottom portion of the image, and ① shows a year, a month, a day, an hour, a minute and a second from the left, ② represents latitude and ③ represents longitude. G given before a year, a month, a day, an hour, a minute and a second in ① indicates that the displayed time is GPS time. With regard to other alphabets placed before the time, there is prepared in advance and used a correspondence table between alphabets and country names in which J, for example, indicates Japanese time and L, for example, represents Los Angeles time in the U.S.A.

Example 3-3

Figure 59:
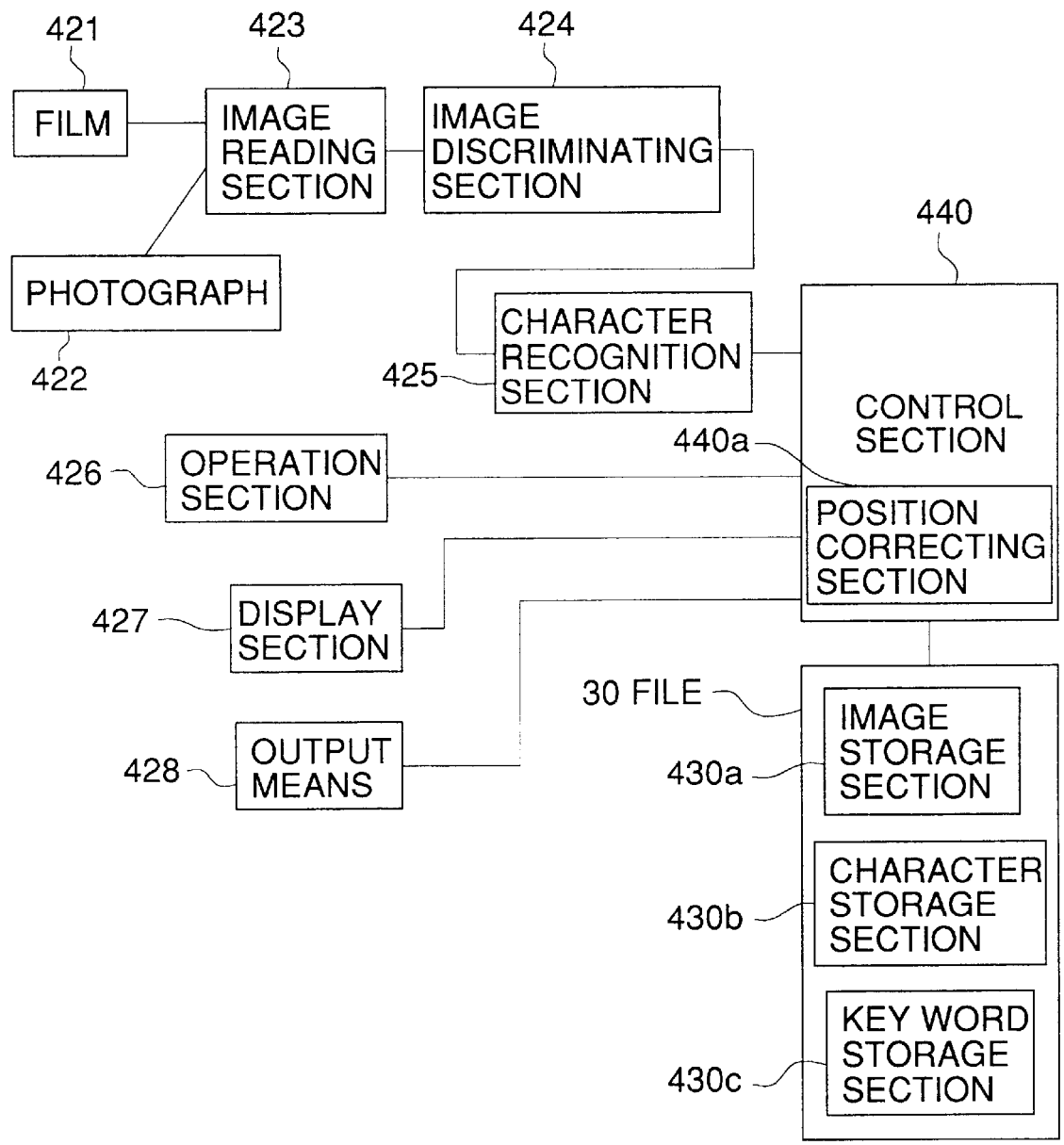
FIG. 59 is a structural block diagram showing Example 3-3.

FIG. 59 is a structural block diagram showing Example 3-3 of a filing device of the invention. Items in FIG. 59 which are the same as those in FIG. 56 are given the same symbols. This invention is the same as that in FIG. 56 except that position correction section 40b for obtaining accurate position information is provided in control section 440. When position information recorded together with images in the course of photographing is not corrected by data for correcting GPS data, the position correction section 440b corrects position information with data for correcting GPS recorded separately through confirmation of a checkup with time. Corrected position information is stored in key word storage section 430c after being given a discrimination mark determined in advance. Operations of the apparatus structured in the above-mentioned manner are as follows.

Figure 60:
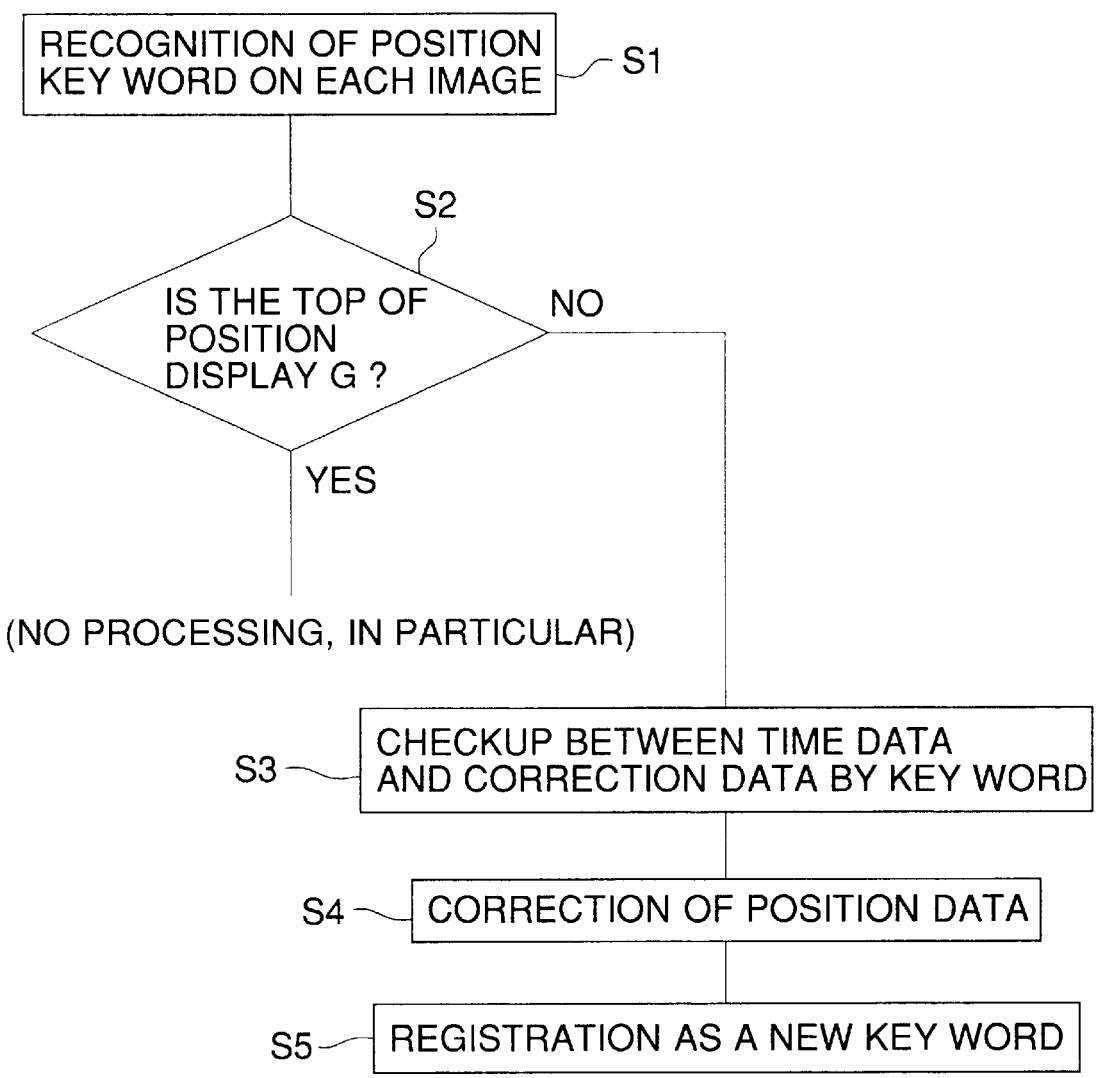
FIG. 60 is a flow chart showing operation procedures of the invention of Example 3-3.

FIG. 60 is a flow chart showing operation procedures of Example 3-3. Explanation will be made as follows, referring to this flow chart. A sequence wherein image information is read from developed film 421 or photograph 422, images and characters are discriminated, then characters are cut off from character information and are stored in image storage section 430a, character storage section 430b and key word storage section 430c as a new key word is the same as the invention in FIG. 56. In this particular case, explanation will be made on assumption that these data have already been stored in file 430.

Control section 440 traces position information on each image data filed and recognizes position key word (S1). Then, it checks whether the top of display of position information traced is an alphabet of D or not (S2). Discrimination mark D means an occasion of data corrected by signals for correcting GPS data, as described above. If D is given, the position information is at high accuracy already, and that data is not processed in particular, accordingly. If nothing is given, the control section 440 conducts a checkup between time data of key word and correction data for enhancing accuracy (S3). Then, position data is corrected by position correction section 440b (S4), and corrected position information is stored in key word storage section 430c as a key word (S5).

FIG. 61 is an illustration of position correction for enhancing accuracy of position information. Point A in the figure is a location where latitude and longitude are known accurately (for example, a triangulation point), and its latitude and longitude are assumed to be K1 and Q1 respectively. Let it be assumed that latitude based on reception data from GPS at point A is K1' and longitude is Q1'. The time in this case is assumed to be T1. Differences ΔK and ΔQ between reception data and reference position are as follows.

$$\Delta K = K1' - K1$$

$$\Delta Q = Q1' - Q1 \quad (1)$$

Incidentally, position information keeps being sent continually at a cycle of 1 second, for example, from GPS satellite. Therefore, when correction data obtained from expression (1) and its time are stored in a certain storage means (magnetic tape, floppy disc etc.), they can be used as data to correct GPS.

Next, let it be assumed that photographing is conducted at point B in the figure. Distance DL from point A to point B is assumed to be within about 200 km. Let it be assumed that reception data from GPS represents latitude K2 and longitude Q2 at point B. Position correction section 440b calculates actual position information by adding the aforesaid correction value at the time T1 (data for correcting GPS which is given in the form of a tape or a floppy disc as a batch data) to these reception data of K2 and Q2. This correction value needs to be one for the same time. Therefore, it is necessary to extract correction data at the same time from the correction data given to use them for calculation for correction. Accuracy of position data thus obtained can be enhanced from its conventional level of 100 m to the level of several meters. Position information thus obtained is given D on its top and is stored in file 430.

In the example stated above, image/character information are inputted from a film or a photograph. Even when images are photographed electronically and character information are inputted electronically, namely, through RS232C interface, for example, only difference is in the constitution for filing, and the contents of the invention thereafter can be applied.

In the third example, as stated above, it is possible to change position information that is at low accuracy in photographing to that at high accuracy by processing collectively with correction data for enhancing accuracy, and when this data is applied for other purposes, it is possible to enhance reliability of the data extremely.

FIG. 62-A is a diagram showing an example of an file image in the present example. In this example, a line of characters is recorded on the bottom portion of the image, and ① shows a year, a month, a day, an hour, a minute and a second from the left, ② represents latitude and ③ represents longitude. D given before ② latitude means that displayed latitude and longitude are data corrected by correction data to be improved in terms of accuracy.

FIG. 62-B is a diagram showing another example of an file image. It is the same as in FIG. 62-A that a line of characters is recorded on the bottom portion of the image, and ① shows a year, a month, a day, an hour, a minute and a second from the left, ② represents latitude and ③ represents longitude. However, a space is given before the latitude of ② which means that the data are ordinary ones from GPS.

In the present invention, when types of time information can be recognized from discrimination symbols given to the time information, and when a time difference at a photographing location can be calculated by a calculation means from photographing position information, it is possible to obtain different time information and to make the different time information to be key words regardless of the types of the recorded time information. For example, in the case of GPS time, time at the photographing location is calculated from position information and that time is stored as a new key word, while in the case of time at the photographing location, GPS time is calculated from position information on the contrary, and the GPS time is stored as a new key word.

In this case, when there is a time difference between the time calculated by the aforesaid calculation means and the stored time information, the time difference can be used as a key word for the retrieval of photographic images if there is provided a means which stores the time difference as a key word in a storage section.

Further, when discrimination symbols given to time information stored indicate that the stored time information is not GPS time, the aforesaid calculation means can unify all photographic images with GPS time and file them by calculating GPS time from time information stored.

In the invention, when position information is corrected, through collation with time, by the data for correcting GPS recorded separately, and when the corrected position information is given a discrimination symbol established in advance and stored in a storage section, in the case where the position information recorded together with images in the course of photographing has not been corrected by the data for correcting GPS data, it is possible to record the photographing position with high accuracy.

As stated above, the present invention can offer, as its first object, a camera with an information recording function wherein discrimination of photographed time information and photographing position is easy and conversion from a certain time information to time information of other types is easy, and can offer, as its second object, a filing device for photographic images wherein different time information can be made to be key words regardless of types of recorded time information, and position information of a photographing location can be recorded with high accuracy.

What is claimed is:

1. A camera having a first and second photographing attitude, said second photographing attitude being rotated substantially 90 degrees from the first photographing attitude, comprising:

an antenna for receiving an electric wave including position information from a satellite of a Global Positioning System, the antenna having a receiving direction along which the antenna receives the electric wave;

a receiving circuit for outputting a photographing position data upon receipt of the electric wave through the antenna;

a photographing means for photographing an image;

a recording means for recording the photographing position data together with the photographed image; and a positioning means to provide for positioning the antenna relatively to the camera at a first position for the first photographing attitude or at a second position for the second photographing attitude and for positioning the antenna to be substantially horizontal to the horizon so as to make the receiving of the electric wave through the antenna possible regardless of the first and second photographing attitudes of the camera.

2. The camera of claim 1, wherein the positioning means further changes the receiving direction by substantially 270 degrees.

3. The camera of claim 1, wherein the moving means holds the antenna separably.

4. The camera of claim 1, further comprising correction means for correcting the position information obtained from the satellite.

5. The camera of claim 4, wherein the correction means is a radio receiver.

6. The camera of claim 1, further comprising a direction sensor for measuring a photographing direction along which an image is photographed, wherein the direction sensor outputs a photographing direction data signal and the recording means records the photographing direction data signal together with the photographing position data.

7. The camera of claim 6, wherein the direction sensor senses terrestrial magnetism and measures the photographing direction based on magnetic north.

8. The camera of claim 6, wherein the direction sensor changes its direction in accordance with the photographing direction.

9. The camera of claim 1, further comprising an inclination sensor for measuring an inclination of the camera.

10. The camera of claim 9, wherein the inclination sensor senses a gravity and measures an inclined angle based on the direction of the gravity.

11. The camera of claim 1, further comprising a temperature sensor, a humidity sensor and an atmospheric pressure sensor.

12. The camera of claim 1, wherein the electric wave from the satellite further includes a time information and the receiving circuit outputs the time data upon receipt of the electric wave through the antenna.

13. The camera of claim 12, further comprising a clock means outputting time data, wherein the time data of the clock means is corrected based on the time information from the satellite.

14. The camera of claim 1, wherein the recording means records the photographing position data together with the photographed image on a photosensitive material.

15. The camera of claim 14, wherein the photosensitive material is exposed with an image light so that the photographed image is recorded on the photosensitive material, and wherein a portion of the photosensitive material on which the photographing position data is recorded is shielded from the image light.

16. The camera of claim 14, further comprising a direction sensor for measuring a photographing direction, wherein the direction sensor outputs a photographing direction data signal and the recording means records the photographing direction data signal on the photosensitive material.

17. The camera of claim 14, further comprising an inclination sensor for measuring an inclination of the camera, wherein the recording means records the inclination on the photosensitive material.

18. The camera of claim 14, further comprising a temperature sensor, a humidity sensor and an atmospheric pressure sensor, wherein the recording means records the temperature, the humidity, and the atmospheric pressure on the photosensitive material.

19. The camera of claim 13, wherein when the receiving circuit does not receive the time information from the satellite, the recording means records the time data outputted from the clock means.

20. The camera of claim 13, wherein the recording means records the corrected time data together with the photographing position data.

21. The camera of claim 14, wherein the recording means records the photographing position data on the photosensitive material when the photosensitive material is being conveyed.

22. The camera of claim 21, wherein the photosensitive material is a roll film having a given number of frames, and the camera further comprises a film counter to count a number of photographed frames, and wherein when the film counter counts the number of photographed frames by a number obtained by adding one to a preset number, the roll film is automatically rewound.

23. The camera of claim 21, wherein the camera further comprises a pre-wind means for winding all frames before conducting the photographing.

24. The camera of claim 1, wherein the first photographing attitude is a photographing attitude for scenery and the second photographing attitude is a photographing attitude for a portrait.

25. The camera of claim 1 wherein the positioning means moves the antenna relative to the photographic attitude of the camera.

26. The camera of claim 1 wherein the positioning means changes the receiving direction of the antenna by substantially 90 degrees relative to the photographing attitude of the camera.

27. A camera having a first and second photographing attitude, said second photographing attitude being rotated substantially 90 degrees from the first photographing attitude, comprising:

an antenna for receiving an electric wave including position information from a satellite of a Global Positioning System;

a receiving circuit for outputting photographing position data upon receipt of the electric wave through the antenna;

a photographing means for photographing an image;

a recording means for recording the photographing data together with the photographed image; and an enabling means for making the receiving of the electric wave through the antenna possible regardless of the first and second photographing attitudes of the camera, wherein the camera has at least two sets of antennas differing in the receiving direction and the enabling means selects one of the two sets of antennas in accordance with the photographing attitude of the camera.

28. A camera having a first and second photographing attitude, said second photographing attitude being rotated substantially 90 degrees from the first photographing attitude, comprising:

an antenna for receiving an electric wave including position information from a satellite of a Global Positioning System;

a receiving circuit for outputting photographing position data upon receipt of the electric wave through the antenna;

a photographing means for photographing an image;

a recording means for recording the photographing data together with the photographed image;

an enabling means for making the receiving of the electric wave through the antenna possible regardless of the first and second photographing attitudes of the camera; and correction means for correcting the position information from the satellite, wherein the correcting means is a gyrocompass for measuring a moving distance and a direction.

29. A camera having a first and second photographing attitude, said second photographing attitude being rotated substantially 90 degrees from the first photographing attitude, comprising:

an antenna for receiving an electric wave including position information from a satellite of a Global Positioning System, the antenna having a receiving direction along which the antenna receives the electric wave;

a receiving circuit for outputting a photographing position data upon receipt of the electric wave through the antenna;

a photographing means for photographing an image;

a recording means for recording the photographing position data together with the photographed image;

a first holding means for holding the antenna in a first predetermined position related to the first photographing attitude of the camera; and a second holding means for holding the antenna in a second predetermined position related to the second photographing attitude of the camera wherein said first holding means and said second holding means provide for positioning the antenna to be substantially horizontal to the horizon so as to make the receiving of the electric wave through the antenna possible regardless of the first and second photographing attitude of the camera.

* * * * *